United States Patent
Ernst, Jr. et al.

(10) Patent No.: US 7,124,027 B1
(45) Date of Patent: Oct. 17, 2006

(54) VEHICULAR COLLISION AVOIDANCE SYSTEM

(75) Inventors: Raymond P. Ernst, Jr., Canton, MI (US); Terry B. Wilson, Chandler, AZ (US)

(73) Assignee: Yazaki North America, Inc., Canton, MI (US)

( * ) Notice: Subject to any disclaimer, the term of this patent is extended or adjusted under 35 U.S.C. 154(b) by 343 days.

(21) Appl. No.: 10/193,512

(22) Filed: Jul. 11, 2002

(51) Int. Cl.
*G06F 17/10* (2006.01)

(52) U.S. Cl. ............. 701/301; 701/96; 340/435; 340/436; 340/438; 342/29

(58) Field of Classification Search .......... 701/1, 701/300, 301, 45, 96; 340/435, 436, 438; 342/29, 70, 72
See application file for complete search history.

(56) References Cited

U.S. PATENT DOCUMENTS

| | | | |
|---|---|---|---|
| 4,417,248 A * | 11/1983 | Mathews | 342/29 |
| 5,357,438 A | 10/1994 | Davidian | |
| 5,465,079 A | 11/1995 | Bouchard et al. | |
| 5,959,552 A * | 9/1999 | Cho | 340/903 |
| 5,979,586 A * | 11/1999 | Farmer et al. | 180/274 |
| 5,999,092 A | 12/1999 | Smith et al. | |
| 6,163,755 A * | 12/2000 | Peer et al. | 701/301 |
| 6,215,415 B1 | 4/2001 | Schroder | |
| 6,222,447 B1 | 4/2001 | Schofield et al. | |
| 6,232,874 B1 * | 5/2001 | Murphy | 340/426.19 |
| 6,420,996 B1 * | 7/2002 | Stopczynski et al. | 342/70 |
| 6,443,400 B1 | 9/2002 | Murata et al. | |
| 6,498,972 B1 * | 12/2002 | Rao et al. | 701/45 |
| 6,519,519 B1 * | 2/2003 | Stopczynski | 701/45 |
| 6,542,111 B1 * | 4/2003 | Wilson | 342/70 |
| 6,553,130 B1 * | 4/2003 | Lemelson et al. | 382/104 |
| 6,607,255 B1 * | 8/2003 | Bond et al. | 303/193 |
| 6,615,137 B1 | 9/2003 | Lutter et al. | |
| 6,624,747 B1 * | 9/2003 | Friederich et al. | 340/436 |
| 6,624,782 B1 * | 9/2003 | Jocoy et al. | 342/70 |
| 6,658,336 B1 * | 12/2003 | Browne et al. | 701/45 |
| 6,662,099 B1 | 12/2003 | Knaian et al. | |
| 6,670,910 B1 | 12/2003 | Delcheccolo et al. | |
| 2003/0004633 A1 * | 1/2003 | Russell et al. | 701/96 |
| 2003/0100982 A1 * | 5/2003 | Rao et al. | 701/45 |
| 2003/0139867 A1 * | 7/2003 | Browne et al. | 701/45 |
| 2003/0149530 A1 * | 8/2003 | Stopczynski | 701/301 |

* cited by examiner

*Primary Examiner*—Gertrude A. Jeanglaude
(74) *Attorney, Agent, or Firm*—Rader, Fishman & Grauer PLLC

(57) ABSTRACT

A collision avoidance system for use in a vehicle. The system facilitates the avoidance of other vehicles and other potential hazards or obstacles. A sensor subsystem is used to capture sensor data relating to one or more areas outside the vehicle. Sensor data is sent from the sensor subsystem to a threat assessment subsystem for generating a threat assessment from the sensor data. The threat assessment is then sent to a feedback subsystem so that if appropriate, a response is generated by the system. The response can take the form of a visual, audio, and/or haptic warning. The response can also take the form of changes with respect to the vehicle itself, such as an automatic reduction in speed. The system can incorporate user-based attributes, vehicle-based attributes, and environment-based attributes in evaluating potential threats and contemplating system responses to those threats. A wide variety of different heuristics can be applied by the system. The system can be configured to minimize nuisance alarms and accommodate distinctions between users based on user preferences, user history, and other factors.

63 Claims, 24 Drawing Sheets

Note: trackData[ ] belongs to the "Object Tracker"

VEHICULAR COLLISION AVOIDANCE SYSTEM

BACKGROUND OF THE INVENTION

This invention relates generally to collision avoidance systems for use in vehicles. More specifically, the invention relates to collision avoidance systems that utilize external vehicle sensors to capture data that is analyzed in order to identify potential collisions in sufficient time to facilitate avoidance of the potential collision.

People are more mobile than ever before. The number of cars and trucks (collectively "automobiles") on the road appear to increase with each passing day. Moreover, the ongoing transportation explosion is not limited automobiles. A wide variety of different vehicles such as automobiles, motorcycles, satellites, planes, trains, boats, forklifts, mobile industrial and construction equipment, and other transportation devices (collectively "vehicles") are used to move people and cargo from place to place. While there are many advantages to our increasingly mobile society, there are also costs associated with the ability to move. Accidents are one such cost. It would be desirable to reduce the number of accidents and/or severity of such accidents through the use of automated systems configured to identify potential hazards so that potential collisions could be avoided or mitigated. However, collision avoidance systems in the existing art suffer from several material limitations.

The diversity of human users presents many difficulties to the one-size-fits-all collision avoidance systems of the existing art. Every user of a vehicle is unique in one or more respects. People have different: braking preferences, reaction times, levels of alertness, levels of experience with the particular vehicle, vehicle use histories, risk tolerances, and a litany of other distinguishing attributes. It would be desirable for a collision avoidance system to incorporate user-based attributes in determining how the collision avoidance system reacts to a particular situation outside of the vehicle.

Similarly, attributes of the vehicle itself (e.g. vehicle-based attributes) can also present significant difficulties to a one-size-fits-all collision avoidance system. A large truck will require more time to stop than a small compact car. A large boat or train will require a substantially greater period of time than the large truck. It would be desirable for a collision avoidance system to incorporate vehicle-based attributes in determining how the collision avoidance system reacts to a particular situation while remaining a broad-based system than can be incorporated into a wide variety of objects.

User acceptance of collision avoidance systems provide a significant obstacle to the effectiveness of such systems. Warnings to users are only useful if users listen to the warnings. A system that generates an unacceptable rate of false alarms or nuisance alarms is not likely to be desired by consumers, or incorporated into the products of manufacturers. Thus, it would be desirable that concerns regarding the adverse effects of nuisance alarms and/or false alarms be effectively incorporated into the decision as to whether the system should identify a particular situation as a cause for concern. It would be desirable for a collision avoidance system to anticipate the reality that a user may already have initiated corrective action by the time that a system detects the potential threat. It would also be desirable for heuristics to be developed that effectively distinguish between a nuisance alarm and an alarm that would be valued by the user.

SUMMARY OF INVENTION

The invention is a collision avoidance system for use in a vehicle. The system uses a sensor subsystem to capture and/or process sensor data relating to potential collisions and/or hazards. The sensor data can then be sent to a threat assessment subsystem to assess the sensor data with respect to potential collisions and/or hazards. Processing results from the threat assessment subsystem can then be sent to a feedback subsystem. The feedback subsystem determines what response, if any, the system will invoke in response to the information initially captured by the sensor subsystem. The feedback subsystem can generate visual, audio, and/or haptic warnings. The feedback subsystem can also modify the behavior of the vehicle itself. For example, the speed of the vehicle could be automatically lowered.

In some preferred embodiments of the invention, the threat assessment subsystem and/or feedback subsystem incorporate attributes relating to the internal environment of the vehicle ("internal attribute") in performing their functions. For example, a vehicle-based attribute such as maneuverability, breaking speed, or other characteristic can be used in addition to the sensor data in assessing threats or providing feedback.

In other preferred embodiments of the invention, user-based attributes can be incorporated into the process of the threat assessment subsystem and/or feedback subsystem. User-based attributes can be determined by the express choices of the user (a selection-based attribute), historical information about a user (a history-based attribute), or the physical condition of the user (a condition-based attribute). Examples of user-based attributes include risk sensitivity (a selection-based attribute), breaking preferences (a history-based attribute), alertness (a condition-based attribute). In a preferred embodiment of the invention, a "smart card" (any device capable of interfacing with the collision avoidance system) provides user-based attributes to the system.

The threat assessment subsystem and/or feedback subsystem can implement a wide variety of different heuristics in order to perform their processing. For example, with respect to avoiding rear-end crashes between two moving vehicles, the threat assessment subsystem's heuristics ("threat assessment heuristics") should attempt to minimize the relative velocities of the two vehicles if the following or rear vehicle is overtaking the leading vehicle. The feedback system can also incorporate a wide variety of different heuristics ("feedback heuristics").

Both threat assessment heuristics and feedback heuristics should attempt to not merely analyze the physical sensor readings, but should also attempt to interpret such data in the context of how users behave. For example, the feedback subsystem can be configured to issue a warning to a user when the user's avoidance of an accident would require a level of breaking in excess of the user's preferred breaking level. Another example of configuring the system to avoid nuisance warnings is to incorporate the concept of a user response time when deciding whether feedback is to be provided to the user. In a preferred embodiment, the system places significant attention on determining what system feedback a user would find useful, in contrast to invoking nuisance alarms.

The foregoing and other advantages and features of the invention will be more apparent from the following description when taken in connection with the accompanying drawings.

DETAILED DESCRIPTION OF A PREFERRED EMBODIMENT

I. Introduction and Environmental View

Figure 1:
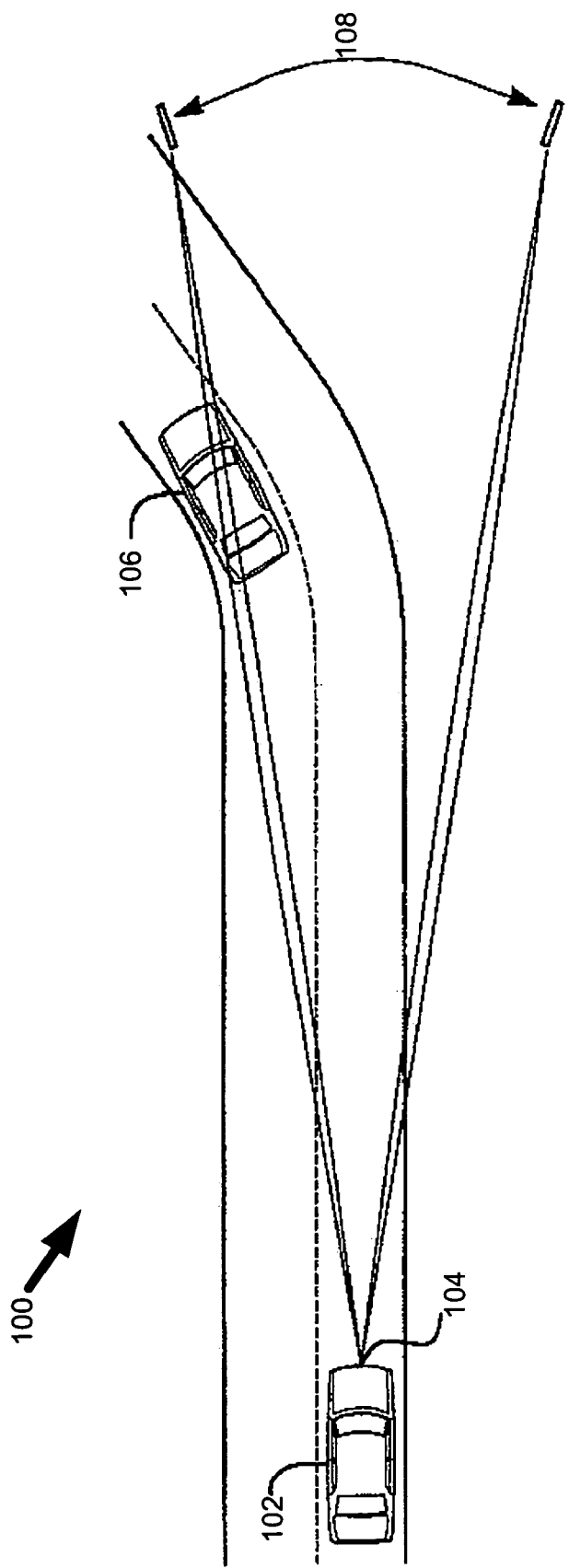
FIG. 1 is an illustration of one example of an environmental view of the invention.

FIG. 1 illustrates one example of an embodiment of a sensor processing system 100. The system 100 can be incorporated into any computational device capable of running a computer program. The underlying logic implemented by the system 100 can be incorporated into the computation device software, hardware, or a combination of software and hardware.

The system 100 is used from the perspective of a vehicle 102. In a preferred embodiment of the invention, the vehicle 102 is an automobile such as a car or truck. However, the system 100 can be used by a wide variety of different vehicles 102 including boats, submarines, planes, gliders, spacecraft, trains, motorcycles, bicycles, golf carts, scooters, robots, forklifts (and other types of mobile industrial equipment), and potentially any mobile transportation device (collectively "vehicle"). The system 100 uses a sensor 104 on the host vehicle 102 (the "host vehicle" 102 or simply "vehicle" 102) to detect a foreign object (e.g. a target object) outside of the host vehicle 102 that could pose a potential threat to the host vehicle 102.

In the example illustrated in the Figure, the target object 106 is an oncoming vehicle 106 (e.g. a "lead vehicle"). However, the system 100 is capable of detecting a wide variety of different target objects 106, including both moving and non-moving objects. The size of the target object 106 is limited only by the type of sensor 104 used by the system 100. The system 100 is high flexible, and can incorporate one or more of a wide variety of different sensor types. Virtually any type of sensor can be utilized by the system 100.

The particular embodiment illustrated in the Figure is a forward-looking radar processing system 100. In a forward-looking sensor embodiment of the system 100, the vehicle 102 has a sensor 104 pointing forward from the vehicle 102. In such an embodiment, sensor data is obtained from a sensor area 108 in front of the vehicle 102. Alternative embodiments of the system 100 need not be forward-looking. Alternative embodiments of the system 100 may investigate multiple directions with multiple sensors.

If the system 100 determines that the target object 106 is a threat to the vehicle 102, the system 100 can respond in the appropriate manner. Feedback of the system 100 typically takes one or more of the following forms: (1) a visual, audio, and/or haptic warning; and/or (2) a change in the behavior of the vehicle itself, such as a decrease in speed. The various responses that the system 100 can invoke as the result of a potential threat are discussed in greater detail below.

II. Subsystem View

Figure 2:
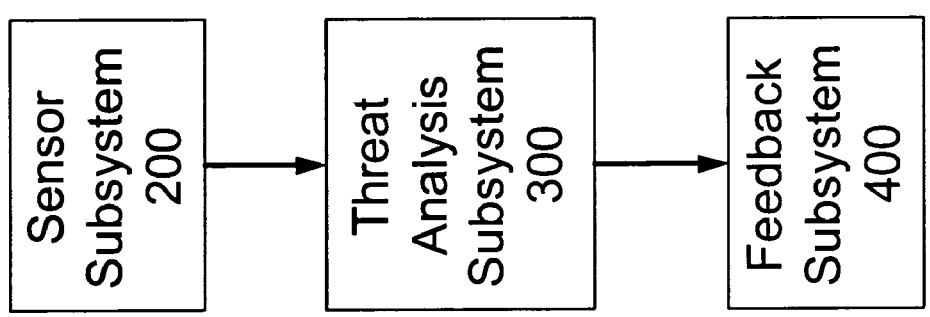
FIG. 2 is an illustration of an example of a subsystem-level view of the invention, including three subsystems included in a preferred embodiment of the invention.

FIG. 2 illustrates a subsystem view of the system 100. The system 100 can be divided up into three primary components, a sensor subsystem 200, a threat analysis subsystem 300, and a feedback subsystem 400.

A. Sensor Subsystem

The sensor subsystem 200 captures sensor data and sends the sensor data to the threat analysis subsystem 200. The sensor subsystem 200 can rely on a single sensor 104, or can utilize as many sensors 104 as are desired. In some embodiments of the invention, the sensor subsystem 200 formats the sensor data into a format that makes it easier for the threat analysis subsystem 200 to process. In many embodiments, sensor data will be sensor measurements relating to target objects 106 such as leading vehicles. In some preferred embodiment, sensor data is made up of sensor measurements relating to physical attributes of objects outside the vehicle, such as distance, velocity, acceleration, size, etc. In other preferred embodiments, the sensor subsystem 200 can also be used to capture internal attributes relating to the vehicle 102 and persons or objects within the vehicle 102. For example, the sensor subsystem 200 can be configured to evaluate a user's (e.g. driver) attentiveness level by prompting the user for a oral response, or by evaluating the motion of the user. Another example of an internal attribute that can be captured by the sensor subsystem 200 is user impairment level. For example, the sensor subsystem 200 could be configured to monitor the insulin levels of a diabetic, a user's heart rate, or other physical condition. Internal attributes are described in greater detail below.

As described above, the preferred embodiment of the system 100 uses a forward-looking radar sensor. However, the sensor subsystem 200 can utilize a wide range of different sensor types, sensor directions, and sensor heuristics in providing information to the threat assessment subsystem 300. The type of sensor used and the precise sensor heuristic used to evaluate sensor data from a particular type of sensor should be configured in light of the particular context of the system 100. For example, in a automotive embodiment of the system 100, there is significant research data gathered by sources such as NHTSA (the National Highway Traffic Safety Administration) regarding the particular categories of collisions, and the causes of those collisions. Any collision avoidance system needs to be configured in such a way as to accommodate the typical practices and conventions of vehicle users. Just as different vehicle types and users may require different sensor strategies, different sensor types themselves can require different types of sensor heuristics depending on the context of use.

Some functionality of the system 100 can be incorporated into either the sensor subsystem 200 or the threat assessment subsystem 300 in different embodiments of the invention. For example, the sensor subsystem 200 could include a path-prediction module to enhance the usefulness of sensor data by using a path-prediction heuristic to predict where external objects will be in relation to the vehicle 102. Another example of functionality that could exist in either the sensor subsystem 200 or the threat assessment subsystem 300 is a scene-processing module. The scene processing module, described in greater detail below, can be used to classify the environment surrounding the vehicle 102 into one of several predetermined categories and otherwise evaluate environmental conditions. A stationary object processing module is yet another example of a potential module in the sensor subsystem 200. The stationary object module, described in greater detail below, allows the system 100 to differentiate between other vehicles, stationary objects, and other types of potential obstructions and hazards.

B. Threat Assessment Subsystem

The threat assessment subsystem 300 takes the sensor data of the sensor subsystem 200 as input in order to generate a threat assessment. In many embodiments, the sensor data relates to position and/or motion attributes relating to the target object, such as position, velocity, or acceleration. In a preferred embodiment of the invention, the threat assessment subsystem 300 also incorporates an internal attribute in determining the threat assessment. An internal attribute is potentially any attribute relating to the internal environment of the vehicle 102. Attributes relating to a user of the vehicle are user-based attributes. Examples of potential user-based attributes can include age, a user's history with the vehicle, a level of alertness, experience with particular categories of vehicles, preferences with respect to the desired sensitivity of the system 100, and any other potentially relevant characteristic relating to the ability of a vehicle user to avoid a collision. Attributes relating to the vehicle itself are vehicle-based attributes. Examples of vehicle-based attributes can include performance characteristics for a particular model of vehicle 102, performance characteristics for a specific vehicle 102, the response time for a particular system on the vehicle 102, the maneuverability characteristics for a particular vehicle 203, or any other potentially relevant characteristic There are a wide variety of different categories of user-based attributes. Selection-based attributes are user-based attributes that selected by the user of the vehicle 102. For example, different people may desire different threat sensitivities. An older driver may require more time ("reaction time attribute") to avoid a collision, and thus would desire a greater sensitivity to potential threats so that the system 100 does not wait until it is too late for the slower-responding user to respond to a system 100 warning. In contrast, a taxicab driver in New York City might find the frequent false alarms generated by a highly sensitive system 100 to be an annoyance. Such a person could set a lower threat sensitivity given the realities of city driving. In a preferred embodiment, the user should be able to have some influence on the threat sensitivity of the system 100.

User-based attributes also include condition-based attributes. Users of vehicles 102 are impacted by lack of sleep, intoxication, the use of pharmaceuticals, ill-health, and other potential physical and mental limitations. Since such condition-based attributes can effect the response time of the user in avoiding a collision, the system 100 can in many embodiments capture condition-based attributes in order to properly calibrate the threat sensitivity of the system 100.

User-based attributes can also include history-based attributes. History-based attributes can potentially relate to any aspect of a user's history with the specific vehicle, the particular model of vehicle, with vehicles generally, or with any other characteristic relating to the user that could potentially relate to the user's ability to avoid a collision. For example, if a particular user had a history of colliding with cars at rest waiting at a red light, the threat sensitivity of collision for that particular user could be higher than for a user with no history of accidents. Another example of a history-based attribute is a user's braking history. Different users have different braking preferences. The system 100 can be configured to flexibly and automatically (without human intervention) accommodate those preference differences.

A preferred embodiment of the system 100 can distinguish between different users of the vehicle 102. For example, a smart card could be used to store user-based attributes for a particular user. Thus, if a particular vehicle is often driven by two or more family members, each user of the vehicle 102 could preserve their own preferences and history. In other embodiments, other types of technologies could be incorporated by the system 100 to distinguish between different users. Retina scans, finger prints, voice prints, and any other "identification technology" could be used by the system 100.

The threat assessment subsystem 300 can evaluate sensor data in many different ways. Characteristics relating to the roadway environment ("roadway environment attribute") can be used by the threat assessment subsystem 300. Roadway environment attributes can include all relevant aspects of roadway geometry including on-road and off-road features. Roadway environment attributes can include such factors as change in grade, curves, intersections, road surface conditions, special roadways (parking lots, driveways, alleys, off-road, etc.), straight roadways, surface type, and travel lanes.

The threat assessment subsystem 300 can also take into account atmospheric environment attributes, such as ambient light, dirt, dust, fog, ice, rain, road spray, smog, smoke, snow, and other conditions. In a preferred embodiment of the system 100, it is more important that the system 100 not report atmospheric conditions as false alarms to the user than it is for the system 100 to function in all adverse environmental conditions to the maximum extent. However, the system 100 can be configured to detect atmospheric conditions and adjust operating parameters used to evaluate potential threats.

A traffic environment of the vehicle 102 can also be used by the threat assessment subsystem 300. Occurrences such as lane changes, merging traffic, cut-in, the level of traffic, the nature of on-coming traffic ("head-on traffic"), the appearance of suddenly exposed lead vehicles due to evasive movement by a vehicle, and other factors can be incorporated into the logic of the decision of whether or not the system 100 detects a threat worthy of a response.

A wide variety of different threat assessment heuristics can be utilized by the system 100 to generate threat assessments. Thus, the threat assessment subsystem 300 can generate a wide variety of different threat assessments. Such threat assessments are then processed by the feedback subsystem 400. Different embodiments of the system 100 may use certain heuristics as part of the threat assessment subsystem 300 where other embodiments of the system 100 use those same or similar heuristics as part of the feedback subsystem 400.

C. Feedback Subsystem

The feedback subsystem 400 is the means by which the system 100 responds to a threat detected by the threat assessment subsystem 300. Just as the threat assessment subsystem 300 can incorporate internal attributes such as user-based attributes and vehicle-based attributes in assessing threats, the feedback subsystem can incorporate those same attributes in determining what type of feedback, if any, needs to be generated by the system 100.

The feedback subsystem 400 can provide feedback to the user and/or to the vehicle itself. Some types of feedback ("user-based feedback") rely exclusively on the user to act in order to avoid a collision. A common example of user-based feedback is the feedback of a warning. The feedback subsystem can issue visual warnings, audio warnings, and/or haptic warnings. Haptic warnings include display modalities that are perceived by the human sense of touch or feeling. Haptic displays can include tactile (sense of touch) and proprioceptive (sense of pressure or resistance). Examples of user-based haptic feedback include steering wheel shaking, and seat belt tensioning.

In addition to user-based feedback, the feedback subsystem 400 can also initiate vehicle-based feedback. Vehicle-based feedback does not rely exclusively on the user to act in order to avoid a collision. The feedback subsystem 400 could automatically reduce the speed of the vehicle, initiate braking, initiate pulse breaking, or initiate accelerator counterforce. In a preferred embodiment of the system 100 using a forward looking sensor, the feedback subsystem 400 can change the velocity of a vehicle 102 invoking speed control such that a collision is avoided by reducing the relative velocities of the vehicles to zero or a number approaching zero. This can be referred to as "virtual towing." In all embodiments of the system 100, the user should be able to override vehicle-based feedback. In some embodiments of the system 100, the user can disable the feedback subsystem 400 altogether.

Both user-based feedback and vehicle-based feedback should be configured in accordance with sound ergonomic principles. Feedback should be intuitive, not confuse or startle the driver, aid in the user's understanding of the system 100, focus the user's attention on the hazard, elicit an automatic or conditioned response, suggest a course of action to the user, not cause other collisions to occur, be perceived by the user above all background noise, be distinguishable from other types of warning, not promote risk taking by the user, and not compromise the ability of the user to override the system 100.

Moreover, feedback should vary in proportion to the level of the perceived threat. In a preferred embodiment of the system 100 using a forward looking sensor, the feedback subsystem 400 assigns potential threats to one of several predefined categories, such as: (1) no threat, (2) following to closely, (3) collision warning, and (4) collision imminent.

A wide variety of different feedback heuristics can be utilized by the system 100 in determining when and how to provide feedback. All such heuristics should incorporate a desire to avoid errors in threat assessment and feedback. Potential errors include false alarms, nuisance alarms, and missed alarms. False alarms are situations that are misidentified as threats. For example, a rear-end collision alarm triggered by on-coming traffic in a different lane in an intersection does not accurately reflect a threat, and thus constitutes a false alarm. Missed alarms are situations when an imminent threat exists, but the system 100 does not respond. Nuisance alarms tend to be more user specific, and relate to alarms that are unnecessary for that particular user in a particular situation. The threat is real, but not of a magnitude where the user considers feedback to be valuable. For example, if the system incorporates a threat sensitivity that is too high, the user will be annoyed with "driving to close" warnings in situations where the driver is comfortable with the distance between the two vehicles and environmental conditions are such that the driver could react in time in the leading car were to slow down.

Different embodiments of the system 100 can require unique configurations with respect to the tradeoffs between missed alarms on the one hand, and nuisance alarms and false alarms on the other. The system 100 should be configured with predetermined error goals in mind. The actual rate of nuisance alarms should not be greater than the predetermined nuisance alarm rate goal. The actual rate of false alarms should not be greater than the predetermined false alarm rate goal. The actual rate of missed alarms should not be greater than the predetermined missed alarm rate goal. Incorporation of heuristics that fully utilize user-based attributes is a way to reduce nuisance alarms without increasing missed alarms. Tradeoffs also exist between the reaction time constraints and the desire to minimize nuisance alarms. User-based attributes are useful in that tradeoff dynamic as well.

Predefined modes of vehicle operation can also be utilized to mitigate against some of the tradeoffs discussed above. Driving in parking lots is different than driving on the expressway. Potential modes of operation can include headway maintenance, speed maintenance, and numerous other categories. Modes of vehicle operation are described in greater detail below.

No system 100 can prevent all vehicle 102 collisions. In a preferred embodiment of the system 100, if an accident occurs, information from the system 100 can be used to detect the accident and if the vehicle is properly equipped, this information can be automatically relayed via a "mayday" type system (an "accident information transmitter module") to local authorities to facilitate a rapid response to the scene of a serious accident, and to provide medical professionals with accident information that can be useful in diagnosing persons injured in such an accident.

III. Modular-Level View

Figure 3:
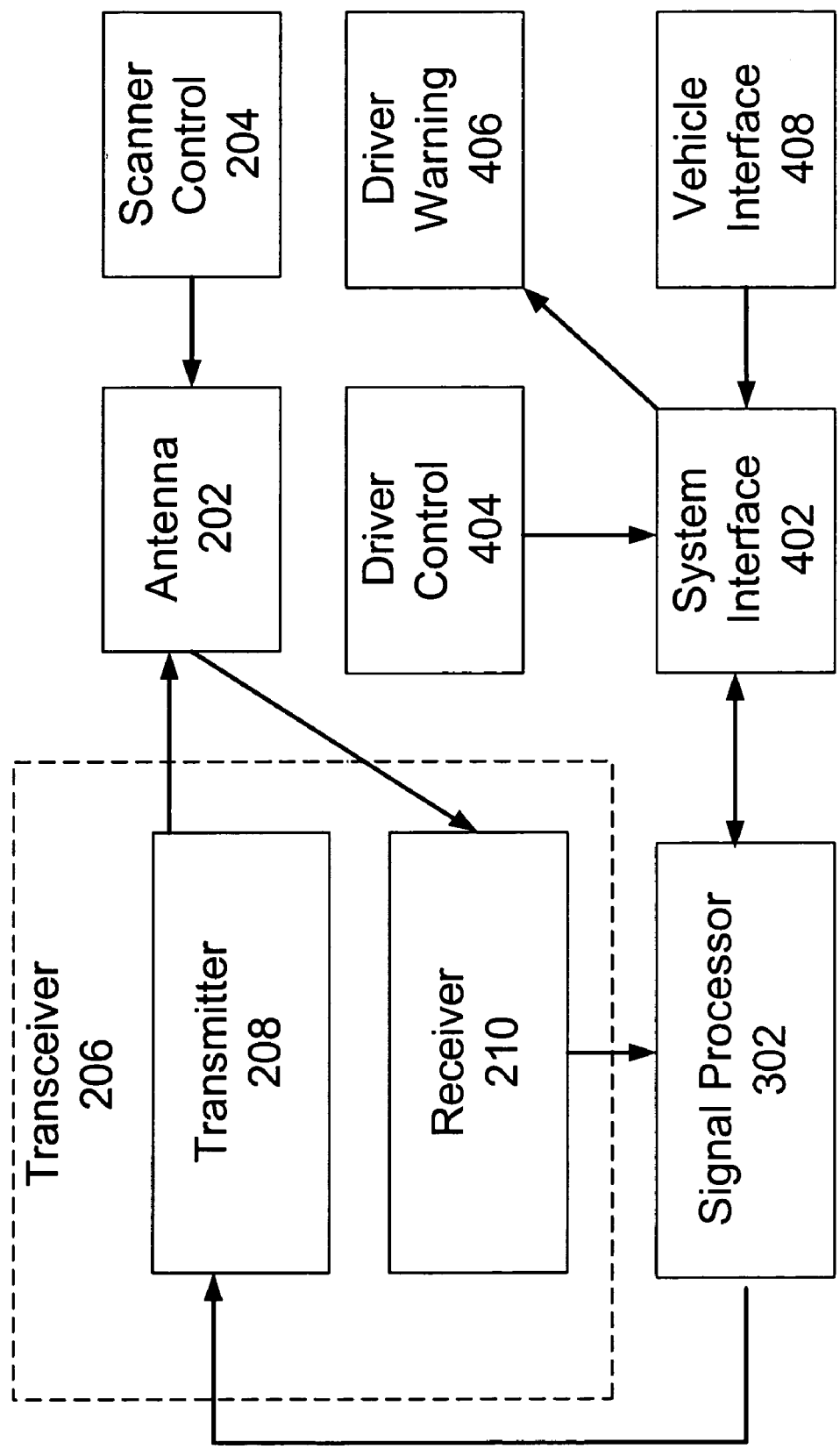
FIG. 3 is a high-level illustration exemplifying some of the modules that can be included in the invention.

FIG. 3 is an illustration of the system 100 that includes some of the various modules that can be incorporated into the system 100. In some preferred embodiments of the system 100, the software components used by the various modules are implemented in the system 100 as software objects using object-oriented programming techniques. In such embodiments, each module can have one or more "objects" corresponding to the functionality of the module. In alternative embodiments, a wide variety of different programming techniques are used to create the modules described below.

An antenna module 202, a scanner control module 204, and a transceiver module 206 are modules within the sensor subsystem 200. The antenna module 202 is the mechanism by which sensor measurements are captured. In a preferred embodiment of the system 100, the antenna module 202 is a forward-looking radar. The scanner control module 204 controls the use of the sensor, including any movement of the sensor and the range of the sensor data that is obtained with the sensor. The transceiver module 206 is made up of a receiver module 210 for receiving data from the antenna 202 or other sensor means. The transceiver module 206 is also made up of a transmitter 208 in the case of an embodiment of the system 100 where radar is the sensor being used by the sensor subsystem 200.

A signal processor 302 is a module of the threat assessment subsystem 300. It receives input from the sensor subsystem 200 and outputs a threat assessment to a system interface 402 of the feedback subsystem. The system interface 402 represents the link between assessing threats at 302 and the rest of the feedback subsystem 400. A driver warning module at 406 is for providing user-based feedback. A vehicle interface at 408 is typically for vehicle-based feedback. However, in the particular embodiment illustrated in Figure, the arrow to the vehicle interface 408 points only in one direction, so vehicle attributes are analyzed by the signal processor 302 (after being forwarded on by the system interface 402), but vehicle-based feedback cannot be invoked by the system 100. In al preferred embodiment, a driver control module 404 will similarly have a one-way relationship with the system interface 402 for the feedback subsystem 400 because a user should be able to override the feedback of the system 100.

Figure 4:
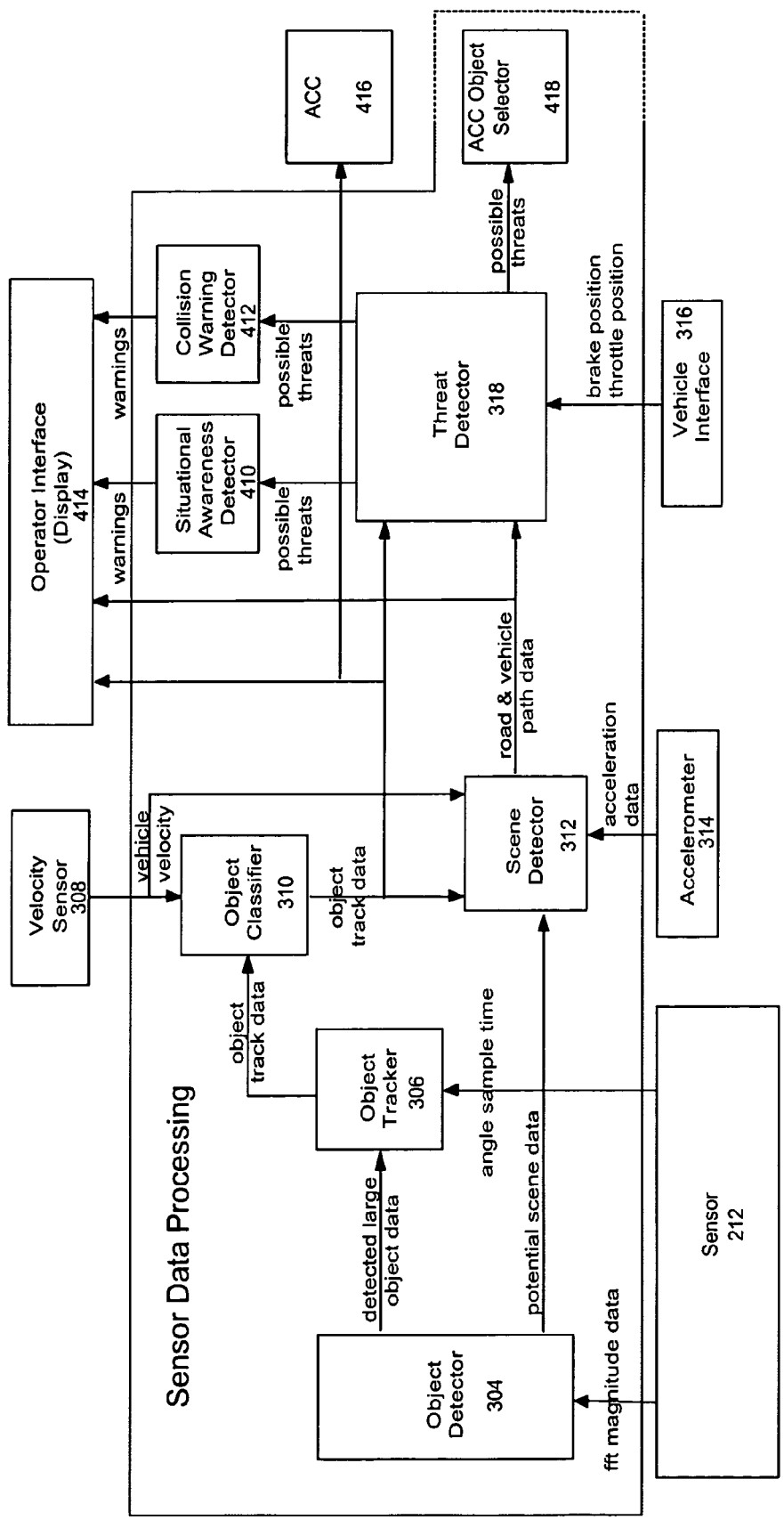
FIG. 4 is a more comprehensive illustration of an example of a modular-level view of the invention, including more examples of different modules can be incorporated into the system.

FIG. 4 is a more detailed illustration of the various modules that can be incorporated into the system 100. In a preferred forward looking radar embodiment of the system 100, a sensor 212 is baseband radar. The baseband radar takes the raw data from the radar sensor and processes it into a usable form. The baseband signal is amplified using a range law filter, sampled using an analog to digital converter, windowed using a raised cosine window, converted to the frequency domain using a fast fourier transform (FFT) with a magnitude approximation. The resultant data represents a single azimuth sample and up to 512 range samples at 0.5 meters per sample. The forward looking radar application uses between 340 and 400 of these samples (170-200 meter maximum range). A variety of different sensor heuristics can be applied by the sensor module 212.

An object detector module 304 performs threshold detection on FFT magnitude data and then combines these detections into large objects and potential scene data ("object detector heuristic"). In non-baseband radar embodiments, different object detector heuristics can be applied. Objects should be classified in order that the threat assessment subsystem 300 can determine the threat level of the object. Objects can be classified based upon: absolute velocity, radar amplitude, radar angle extent, radar range extent, position, proximity of other objects, or any other desirable attribute. A variety of different object detector heuristics can be applied by the object detector module.

In a baseband radar embodiment, the system 100 utilizes a narrow beam azimuth antenna design with a 50% overlap between adjacent angle bins. This information can be used to determine object angular width by knowing the antenna gain pattern and using that information with a polynomial curve fit and/or interpolation between the azimuth angle bins. The ability to perform range and angle grouping of objects is critical to maintaining object separation, which is necessary for the successful assessment of potential threats. A two dimensional grouping heuristic can be used to more accurately determine the range and angle extent of large objects for systems 100 that operate in primarily two dimensions, such the system 100 in automotive embodiments. This will simplify the object detector module 304 while providing better object classification and as an aid to scene processing.

Data relating to large objects is sent to an object tracker module 306. The object tracker module uses an object tracker heuristic to track large objects with respect to position and velocity. Sensor module information such as angle sample time in a radar embodiment, should also be an input for the object tracker module 306 so that the system 100 can compensate for characteristics of the sensor 212. A variety of different object tracking heuristics can be applied by the object tracking module 306.

Object tracking information can be sent to a object classifier module 310. The object classifier module 310 classifies objects tracked by the object tracker module 306 based on predefined movement categories (e.g. stationary, overtaking, receding, or approaching) and object type (e.g. non-vehicle or vehicle) using one of a variety of object tracking heuristics. The classification can be added to a software object or data structure for subsequent processing.

The object classifier module 310 sends object classification data to a scene detector module 312 applying one or more scene detection heuristics. The scene detector module 312 can process the detected objects (large and small, vehicles and non-vehicles) and from this data predict the possible roadway paths that the vehicle might take. In a preferred embodiment, the scene detector module 312 incorporates user-based attributes in assisting in this determination.

The scene detector module 312 utilizes information from the radar sensor and other attitude sensors on the vehicle 102 hosting the system 100 ("host vehicle") to predict the path of the host vehicle. It is desirable to estimate the path of the host vehicle 102 in order to reduce nuisance alarms to the user for conditions when objects out of the vehicle path are included as threats. The scene detector module 312 should use both vehicular size objects and roadside size objects in this determination. It is important that the radar have sufficient sensitivity to detect very small objects (<<1 m$^2$) so this information can be used to predict the roadway. The threat level of an object is determined by proximity to the estimated vehicular path, or by proximity to roadside objects.

The first heuristic for scene detection and path prediction (collectively scene detection) is to use the non-vehicular objects by identifying the first non-vehicular object in each azimuth sample then connecting these points together between azimuth angles ("azimuth angle scene detection heuristic"). The resultant image is then low pass filtered and represents a good estimation of the roadway feature edge. The constant offset between the roadway feature edge and the vehicular trajectory represents the intended path of the host vehicle.

A second example of a scene detection heuristic (the "best least squares fit scene detection heuristic") is to use the stationary object points to find the best least squares fit of a road with a leading and trailing straight section, of arbitrary length, and a constant radius curvature section in between. The resultant vehicle locations can be used to determine lanes on the road and finely predict the vehicle path.

Another scene detection heuristic that can be used is the "radius of curvature scene detection heuristic" which computes the radius of curvature by using the movement of stationary objects within the field of view. If the road is straight, then the stationary objects should move longitudinally. If the roadway is curved, then the stationary points would appear to be rotating around the center of the curvature.

The system 100 can also use a "yaw rate scene detection heuristic" which determines vehicle path by using yaw rate information and vehicle speed. While in a constant radius curve the curvature could be easily solved and used to augment other path prediction processing (e.g. other scene detection heuristics).

The system 100 can also use a multi-pass fast convolution scene detection heuristic to detect linear features in the two dimensional radar image. The system 100 is not limited to the use of only one scene detection heuristic at a time. Multiple heuristics can be applied, with information integrated together. Alternatively, process scene data can combine the radar image with data from a Global Positioning System (GPS) with a map database and/or vision system. Both of these supplemental sensors can be used to augment the radar path prediction algorithms. The GPS system would predict via map database the roadway ahead, while the vision system would actively track the lane lines, etc., to predict the travel lane ahead.

The estimated path of the host vehicle 102 can be determined by tracking vehicles 106 in the forward field of view, either individually or in groups, and using the position and trajectory of these vehicles 106 to determine the path of the host vehicle 102.

All of these scene processing and path prediction heuristics can be used in reverse. The expected path prediction output can be compared with the actual sensory output and that information can be used to assess the state of the driver and other potentially significant user-based attributes.

A threat detector module 318 uses the input from the scene and path detector module 312. The threat detector module 318 applies one or more threat detection heuristics to determine what objects present a potential threat based on object tracking data from the object tracker module 306 and roadway data from the scene detector module 312. The threat detector module 318 can also incorporate a wide range of vehicle-based attributes and user-based attributes in generating an updated threat assessment for the system 100.

A collision warning detector module 412 is part of the feedback subsystem 400. The module 412 applies one or more collision warning heuristics that process the detected objects that are considered potential threats and determine if a collision warning should be issued to the driver. The various potential heuristics are described in greater detail below.

With threat sensitivity configured correctly into the system 100 the system 100 can significantly reduce accidents if the system 100 is fully utilized and accepted by users. However, no system can prevent all collisions. In a preferred embodiment of the system 100, if an accident occurs, information from the system 100 can be used to detect the accident and if the vehicle is properly equipped, this information can be automatically relayed via a "mayday" type system (an "accident information transmitter module") to local authorities to facilitate a rapid response to the scene of a serious accident, and to provide medical professionals with accident information that can be useful in diagnosing persons injured in such an accident.

The threat detector module 318 can also supply threat assessments to a situational awareness detector module 410. The situational awareness detector module 412 uses a situational awareness heuristic to process the detected objects that are considered potential threats and determines if a "following too closely" warning should be issued to the user.

The situational awareness algorithms can be used to detect unsafe driving practices. By having the sensor process the vehicle-to-vehicle and vehicle-to-roadside scenarios, the state of the user can be determined such as impaired, inattentive, etc.

Other situations can be detected by the system 100 and warnings or alerts provided to the user. For example, the detection of dangerous cross wind gusts can be detected by the system 100, with warnings provided to the user, and the appropriate compensations and adjustments made to system 100 parameters. System 100 sensor parameters can be used to determine tire skidding, low lateral g-forces in turns, excessive yaw rate in turns, etc.

In a preferred automotive environment, any speed control component is an adaptive cruise control (ACC) module 416 allowing for the system 100 to invoke vehicle-based feedback. An ACC object selector module 418 selects the object for the ACC module to use in it's processing.

As mentioned above, the inputs to the system 100 are not necessarily limited to the sensor data of a single sensor. An accelerometer module 314 can provides lateral (left/right) acceleration data to the system 200. A longitudinal accelerometer can also be incorporated in the system. The accelerometer is for capturing data relating to the vehicle hosting (the "host vehicle"). Similarly, a velocity sensor 308 for the host vehicle 102 can be used in order to more accurately invoke the object classifier module 310.

The system 100 can also interact with various interfaces. An operator interface 414 is the means by which a user of a vehicle 102 receives user-based feedback. A vehicle interface 316 is a means by which the vehicle itself receives vehicle-based feedback.

Figure 5:
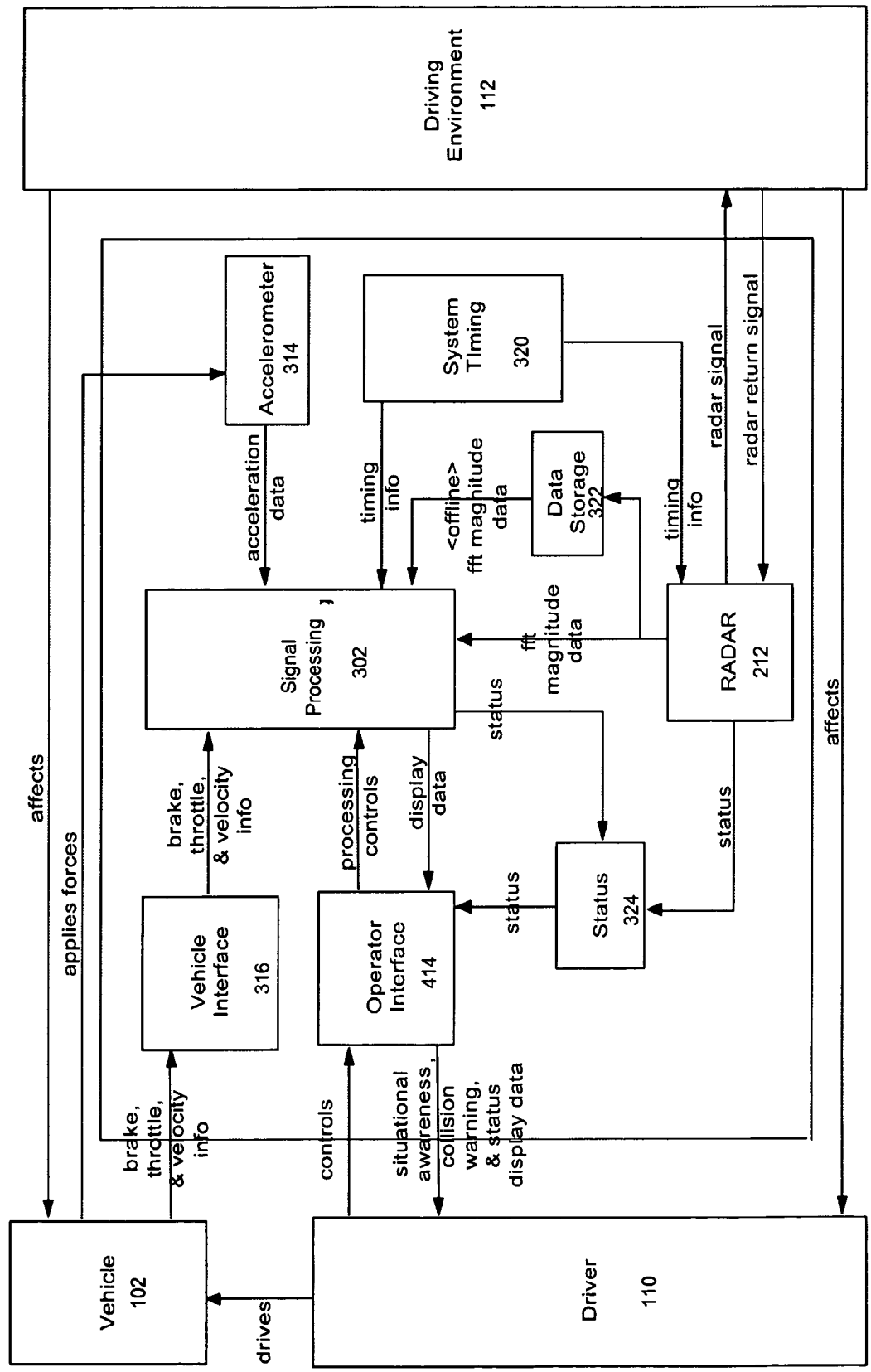
FIG. 5 is an object diagram of the invention that includes a vehicle object, a driver object, and a driving environment object.

FIG. 5 shows a modular-view of the system 100 in the context of additional environmental, such as a driver (e.g. user) 110, a driving environment 112, and the vehicle itself 102. The system 100 can integrate with additional modules and components regarding driving environments 112, drivers 110, and vehicles 102. Such integration can enhance the ability of the system 100 to improve threat assessment processing by using user-based attributes, vehicle-based attributes, and environment-based attributes.

The Figure also illustrates the interactions between the vehicle 102 and the vehicle interface module 316 and the user or operator 110 and the operator interface module 414. A status module 324 can be used to evaluate the status of the signal processing module 302 and the sensor module 212, and convey all status information to the operator interface module 414 where it can be viewed by the user 110.

A system timing module 320 can be use to calibrate the sensor readings of the sensor 212 and the processing of the signal processor 302. A data storage module 322 can be used to store sensor data for generating history-based attributes, preserving crash information, or for many other different purposes.

IV. State Views

A. System States

Figure 6:
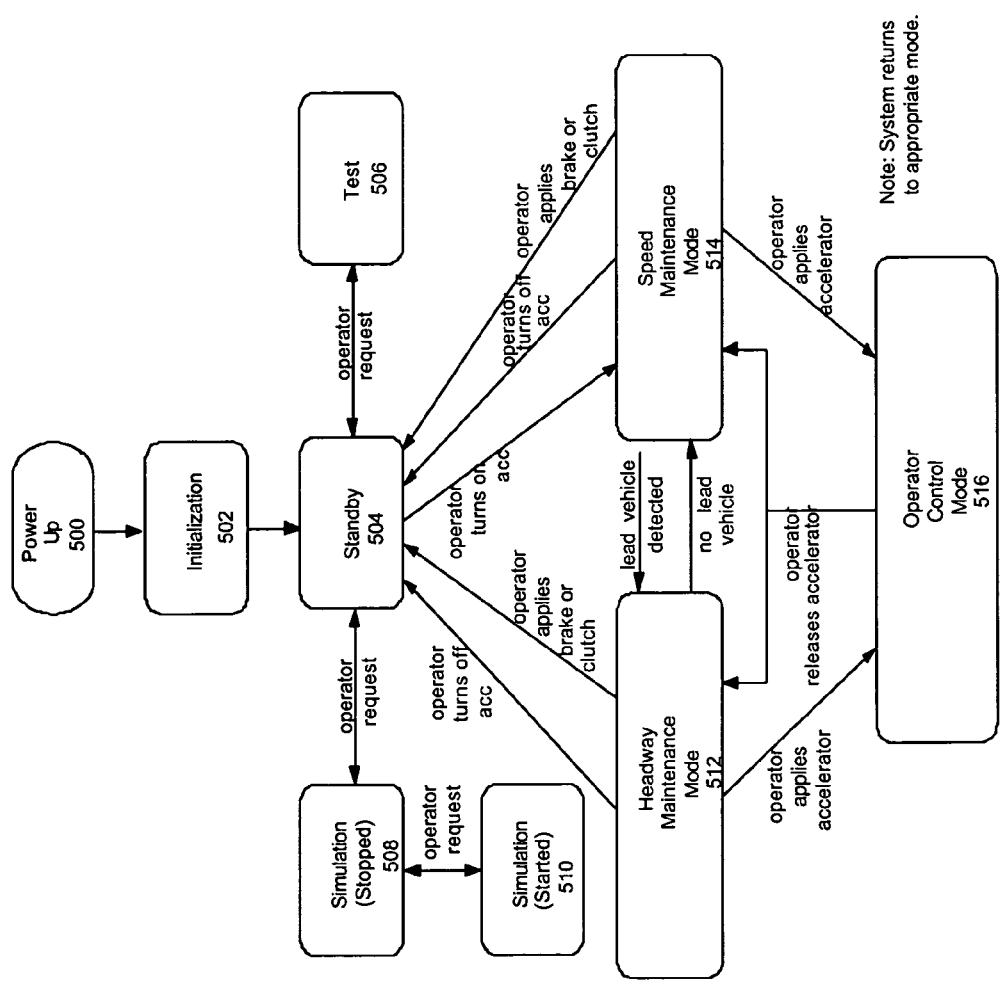
FIG. 6 is a state diagram illustrating the various states that can exist in a preferred embodiment of the invention.

FIG. 6 is a "state" view of the system 100 with an adaptive cruise control module. In a preferred embodiment of the system 100 where object-oriented programming techniques are used to build the system 100, the system 100 is represented by a system object and the system object can be capable of entering any of the states illustrated in the Figure. The behavior of the system object can be expressed as a combination of the state behavior expressed in this section and/or the concurrent behavior of the other "objects" that the system 100 is composed of. The Figure shows the possible states of the system object and the events that cause a change of state. A "states" can be made up of one or more "modes" meaning that several "modes" can share the same "state."

In a preferred automotive embodiment, the system 100 is invoked by the start of the ignition. In alternative embodiments, a wide variety of different events can trigger the turning on of the system 100. Regardless of what the "power-up" trigger is, the system 100 must begin with a power up event 500. The power up event is quickly followed by an initialization state 502. The initialization of system data items during power up is performed in the "initialization" state 502.

After all initialization processing is complete, in some embodiments of the system 100, the system 100 enters into a standby state 504. The standby state 504 allows the user to determine which state the system will next enter, a test state 506, a simulation state 508, or an operational state such as a headway maintenance mode state 512, a speed maintenance mode state 514, or an operator control mode 516. In alternative embodiments of the system 100, there can be as few as one operational state, or as many operational modes as are desirable for the particular embodiment.

The "test" state 506 provides capabilities that allow engineering evaluation or troubleshooting of the system. Examining FFT magnitude data is one example of such a test. Alternative embodiments may include two distinct test states, a test stopped state and a test started state.

In a preferred embodiment of the system 100, the user invoke a simulation component causing the system to enter a simulated state where sensor data previously stored in the data storage module 322 can be used to evaluate the performance of the system 100 and to allow the user to better calibrate the system 100. The system 100 performs a simulation in the simulation (started) state 508 on a file of stored FFT data selected by the operator. In a simulation (stopped) state, the system 100 is stopped waiting for the operator to start a simulation on stored FFT data or return to an operational state.

In a preferred embodiment of the system 100, the default mode for the operational state is the speed maintenance mode 514. If no lead vehicle is detected, the system 100 will remain in the speed maintenance mode 514. If a lead vehicle is detected, the system 100 transitions to a headway maintenance mode 512. As discussed above, different embodiments may use a wide variety of different modes of being in an operational state. By possessing multiple operational modes, the threat assessment subsystem 300 can invoke threat assessment heuristics that are particularly well suited for certain situations, making the system 100 more accurate, and less likely to generate nuisance alarms.

As is illustrated in the Figure, user actions such as turning off the ACC module, turning on the ACC module, applying the brakes, applying the accelerator, or other user actions can change the state of the system 100. Application of the accelerator will move the system 100 from an operational state at either 514 or 512 to an operational control mode 516. Conversely, releasing the accelerator will return the system 100 to either a speed maintenance mode 514 or a headway maintenance mode 512.

As mentioned above, additional modes can be incorporated to represent particular contexts such as parking, off-road driving, and numerous other contexts.

B. Adaptive Cruise Control States

Figure 7:
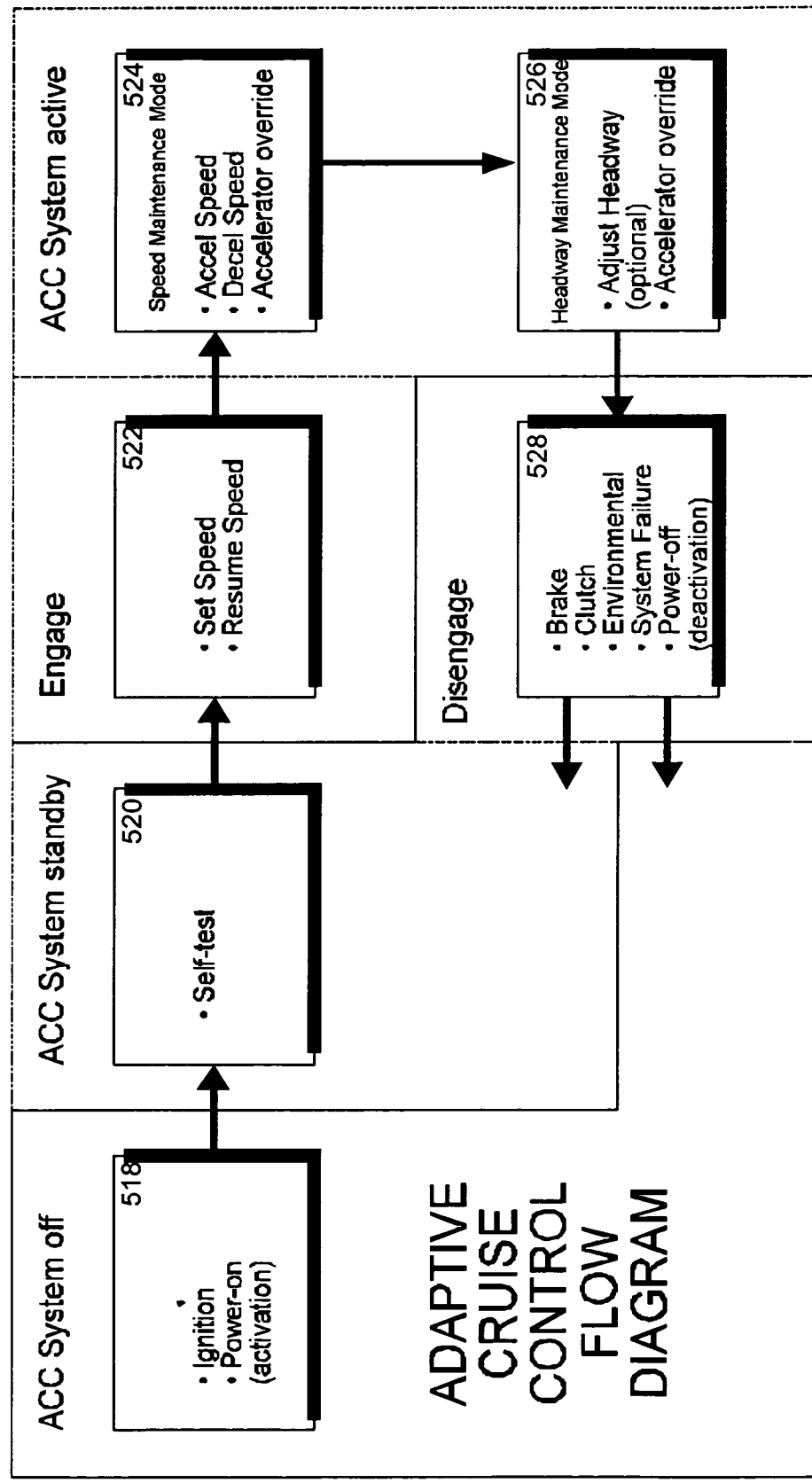
FIG. 7 is a state diagram illustrating some of the various states of the adaptive cruise control module that can exist in a preferred embodiment the invention.

In a preferred automotive embodiment of the system 100, the system 100 includes an ACC module 416 described above. FIG. 7 is a state diagram of the ACC module 416. The initial state of the ACC module is off before activation occurs at 518. The ACC module 416 goes into standby mode at 520 to perform self-testing. Once the ACC module 416 is engaged at 522, the user can set the vehicle velocity as with any cruise control or speed control system. The ACC module is active whether the system 100 is in the speed maintenance mode at 524 or the headway maintenance mode at 526. Various user and vehicle events can trigger disengagement at 528.

Various methods can cause the ACC module 416 to disengage from the ACC mode to the standby mode. The ACC module 416 may disengage when the driver activates the brake as with conventional cruise control systems currently deployed in the U.S. If the ACC module 416 employs active braking to maintain headway, then any active braking should not interfere with the driver providing additional braking. The ACC module 416 may disengage when the driver activates the clutch pedal (manual transmission systems only). In other words, the ACC module 416 must be compatible with the vehicle on which it is installed and operating.

The ACC module 416 may disengage when a fault is detected in the proper operation of the ACC module 416. This includes disengaging the ACC module 416 when the sensor subsystem 200 can no longer reliably detect vehicles in the forward path due to atmospheric (rain, sleet, snow, etc.) or roadway (road spray) conditions. If the ACC module 416 is controlling the headway through active braking, then it may be necessary for the ACC system to continue braking until driver intervention is detected. From a human factors standpoint, it is desirable that the driver be given an indication of the fault condition. The fault condition should be unique to the failure mode of the ACC module 416.

The ACC module 416 may need to disengage if the driver is in the speed maintenance mode and commands the set speed below the minimum set speed. The ACC module 416 may also need to disengage if the ACC module 416 drops below the minimum set speed while in the headway maintenance mode. However if active braking is being employed disengaging the system may cause a positive acceleration toward the lead vehicle, putting the driver at risk of a collision. It may be necessary to require the ACC module to continue to decelerate until the driver intervenes.

There may be a set speed below which the driver is unable to engage the ACC module 416. This minimum set speed may cause the ACC module 416 to disengage if the driver commands the set speed below this value. If the headway is less than the minimum and the driver attempts to engage the system 100, the system 100 can engage, engage and provide an alert, or simply not engage. Similarly, the ACC module 416 may need a maximum allowable set speed to prevent drivers from driving beyond the capability of the ACC module 416. The maximum set speed is dependent upon the vehicle platform and the ACC module design.

As with conventional cruise control, the ACC module 416 may provide the driver the ability to increase the set speed. If the subject vehicle is in the headway maintenance mode then commands to increase the set speed will not change the headway. This may necessitate an indication to the driver of the current speed setting for the ACC module 416 independent of the speedometer. As with conventional cruise control, the ACC module 416 may provide the driver the ability to decrease the set speed. If the host vehicle is in the speed maintenance mode, then commands to the set speed decelerate will incrementally decrease the speed down to the minimum speed setting. At the minimum speed setting the ACC module 416 may disengage. If the host vehicle 102 is in the headway maintenance mode and is employing active braking to maintain headway on the lead vehicle 106 then commands to decrease the set speed below the minimum set speed should not cause the system to disengage, however a warning or dialog may be appropriate.

It may be necessary to provide the capability for the driver to override the accelerator while the ACC module 416 is operating. Conventional cruise control systems currently allow this option, and unless compelling reasons can be given to show that drivers will not expect this to be the case with ACC module 416 it should remain similar in order to avoid possible safety issues.

If the ACC module 416 employs active braking to maintain headway, then accelerator override may need to inhibit active deceleration. It may also be necessary to inhibit collision warnings to the driver if this condition occurs. It may be possible to disengage the ACC module 416 if this condition occurs, but this may be considered a nuisance to the driver since conventional cruise control systems do not function in this manner. ACC modules 416 that employ active braking to maintain headway must not decrease the capability and response for driver override.

A minimum headway time should be established by the implementers of the system 100. ACC modules 416 should not be adjustable below the minimum headway time. The intent of the headway adjustment is to allow drivers of differing abilities and comfort levels (headway time is an example of a user-based attribute) to adjust the headway between the host 102 and lead 106 vehicles. The headway adjustment time may need to return to a nominal value each time the system 100 is powered off to prevent drivers with conservative abilities from using aggressive headway times, although it may be considered a nuisance by the driver if they must reset the headway setting to their preferred value every time the system is started.

There is a large population of drivers familiar with conventional cruise control systems. ACC modules 416 should be an extension of these systems. Drivers must under all circumstances be able to override the system 100 with the accelerator and brake pedal. There should be automatic transition between the speed and headway maintenance modes. Slow and stopped lead vehicles must be accommodated. Warnings and alerts should occur when the longitudinal authority of the ACC module 416 is exceeded or is going to be exceeded. An identifying icon or display must alert the driver to the presence of an ACC module 416 (rather than a conventional cruise control) so that the driver may anticipate either the relinquishing of speed control to the ACC module 416 or perhaps more importantly the need for individual control in the absence of the ACC module 416. The ACC module 416 may be implemented separate from a forward looking sensor embodiment of the system 100, but preferably the system 100 includes both sets of functionality.

The advent of forward looking technology allows other vehicular systems to benefit based on the knowledge from the forward looking sensor. In applications where roadway curvature, roadway grade can be determined, the transmission shift points can be changed based on measured "forward" roadway expectations. When the driver demands additional acceleration, into a curve, less can be applied, or information can be used by the traction control system or the anti skid/anti slip system. Detection of a straight roadway would allow demanded acceleration from the driver to be answered in full. For dense traffic environments, the transmission shift point may be adjusted early in response to traffic in the forward path to allow additional acceleration, or more low-end power.

V. Threat Assessments

The threat assessment subsystem 300 can implement a wide variety of different threat assessment heuristics in identifying potential threats. Similarly, the feedback subsystem 400 can implement a wide variety of different feedback heuristics to determine what the appropriate user-based or vehicle-based feedback is to a particular identified threat. The particular heuristics implemented by a particular embodiment of the system 100 should be based on factors relating to that particular embodiment of the system 100.

In the context of a forward looking automotive embodiment of the system 100, the task of a forward looking collision warning system 100 is to mitigate rear-end collision damage and to prevent the greatest possible number of collisions. The system 100 can accomplish this by constantly sensing and evaluating the inter-vehicular dynamics (preferably in conjunction with internal attributes), and if the situation warrants, warn the driver to take defensive action or implement some form of vehicle-based feedback. The heuristics of the system 100 are the mechanisms employed to evaluate and warn. Preferred heuristics are a group of equations combined with conditional switches at decision points to transition between driving states.

The guidelines presented here support a multiple-mode approach to driver alerting that is able to warn the driver of potential collision situations. It can provide continuous situational awareness to the driver and may also provide cautionary information or a following-too-closely warning when required.

The system 100 must account for lost time. Lost time is driver reaction time, brake actuation time, warning actuation time, and processing delays. Processing delays are small, usually on the order of 0.1 seconds. Driver reaction time is the main contributor to lost-time and varies from person to person. Individual means may range from about 0.9 to 2.4 seconds and discrete reactions vary about the mean. It appears that reaction time also varies as a function of the driving environment, traffic density, speeds, etc. The effects of this widely varying parameter are discussed in subsequent sections in depth.

Warning means prediction. It does little good to warn of past events. Lost-time defines the minimum time projection that the system may entertain. If the lost-time value is 1.5 seconds then the system 100 must always warn based on what is predicted to occur at least 1.5 seconds in the future. It is this time projection that is the root of most nuisance alarms. Therefore, a reduction in lost time equals a reduction in nuisance alarms.

The key to driver acceptance of the system 100 is not in knowing when to warn the driver, but rather in knowing when not to warn the driver. In order for the system to reduce collisions it must be deployed, and in order to be bought and used it will have to maximize warnings of potentially dangerous conditions while truly minimizing the occurrence of nuisance alarms as well as false alarms. In light of the necessarily predictive nature of the controlling heuristics and the systems 100 they can support, these two conflicting requirements present some inherent tradeoffs.

The timing of warnings can be critical to the utility of the system 100. The more conservative (earlier) the warning, the more drivers may find the warning to be a nuisance and thus lower overall driver acceptance and system effectiveness. Moreover, if the collision threat is beyond the perception (view) of the driver, then issuance of the warning may actually contribute to a collision by distracting or otherwise affecting the driver's vigilance. Also, drivers appear to react differently to different types of dynamic situations which may require different warning times for lead vehicle decelerating, lead vehicle stopped, etc.

Figure 9:
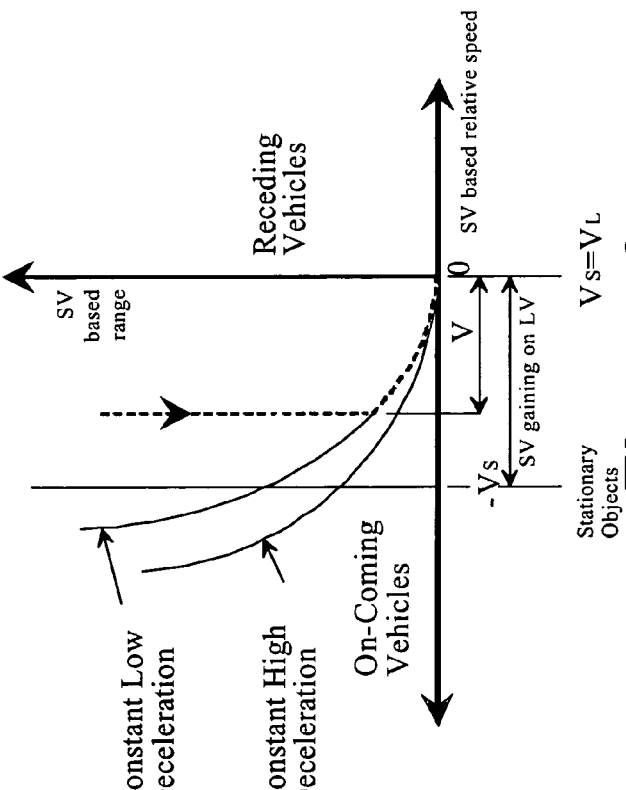
FIG. 9 is a graph illustrating the approaching of a host vehicle to a lead vehicle that can be incorporated into the various heuristics of the invention.

FIG. 9 illustrates a diminishing likelihood curve that illustrates the probability of a crash in comparison with the time to collision. In any circumstance there is a region where the prevention of a collision is physically impossible. In this region, the probability of a crash approaches unity. It may not be not possible to definitively quantify define the diminishing likelihood curve as it is individualistic, and changes as a function of dynamic situation, and driving environment.

Backing away (in time) from the collision there exists a region where the crash is avoidable if the driver takes appropriate action. The concept of the forward-looking, rear-end collision warning embodiment of the system 100 is to reduce the probability of a collision through driver notification. However, if the warning to the driver occurs too soon before the potential collision, the driver will consider the warning a nuisance and the driver's overall reliance on the system 100 may diminish, thus, the probability of a crash may increase with the use of the system 100.

Receiving a warning in a situation in which the driver does not agree with the need for the warning is the definition of a nuisance alarm. It is likely for a minimum acceptable system that when situations develop where the system 100 is unsure of when to warn then warnings should be inhibited. This may occur in scenarios such as lane change, merging, cut-in, etc.

Even in the presence of valid collision threats, the system 100 has no accurate means of assessing the driver's intentions. This means that the driver may respond to the threat before the system 100 warns, may act in the midst of the lost-time interval, may recognize the threat, and plan to act well after the system 100 would sound the alarm. Furthermore, due to some circumstance beyond the simple sensory capabilities of the system 100, the driver may see no need to act at all. The driver's assessment of the situation and responses, planned and executed, modify the perceived danger level in ways that the forward-looking, rear-end collision warning embodiment of the system 100 cannot predict.

Ideally the system 100 will warn only when the driver is truly in danger. But there are a number of influences that must be addressed to approach this ideal. Target recognition and discrimination must be achieved by the object detection heuristics discussed above. Some sense of the vehicle's likely and intended course might be provided by a scene processing heuristic, as discussed above. The strengths and limitations of the employed forward looking sensor or any other sensor must be understood. Lost time effects must be minimized. Tailoring for specific traffic encounters may be required. And finally there is the definition of nuisance to contend with.

As discussed above, nuisance alarms are any alarms issued to the driver that the driver deems unnecessary. The driver's viewpoint is always valid and may, as discussed above be based on a myriad of reasons, but included in the driver's perception must be some evaluation of the immediate urgency or danger inherent in the situation. Therefore two simplifying divisions can be used here. They are that nuisance alarms are alarms issued in non-urgent situations or alarms issued after the action has been taken. This working definition of nuisance alarms is consistent with the general definition given above.

Ignoring nuisance alarms that result from false alarms (i.e. crossing vehicles, left turn across the subject vehicles, etc.), non-urgent alarm generators may include, lane change, cut-ins, sliders (cut-ins that continue across and out of the subject vehicle's lane), various merge scenarios and of course the simple act of pulling up behind a vehicle at a stop light.

The chosen measure of urgency is the level of deceleration required by the subject to avoid the collision, so a deceleration level warning threshold is needed. It is known that drivers have preferential levels of braking. A large body of research shows that the population at large finds the comfortable braking level to be less than 4 m/s$^2$ (0.4 g). Only 1% of brake applications are made at greater than 3.5 m/s$^2$ (0.35 g) and that less than one in a thousand brake applications exceeds 5 m/s$^2$ (0.5 g).

A level of braking in excess of the driver's comfort level should coincide with warnings issued by the system 100. It is assumed that warnings that require braking in excess of the driver's preferred value will not be considered a nuisance while warnings issued within the driver's habitual comfort zone will be. These assumptions are supported by anecdotal evidence from drivers using these heuristics. It is anticipated that the further the heuristic warnings are beyond the comfort level the lower will be the nuisance alarm rate. Benefit of course is a combined measure of nuisance and crash mitigation/prevention, so the extension of warning beyond the comfort threshold, has the capabilities of the driver and machine as an ultimate upper bound.

Generally caused by the combination of attentive drivers and the time projection due to lost-time, these nuisance alarms are characterized by drivers reacting to a threat before a warning is given or during the warning actuation time. Inhibiting the warning to the driver would eliminate nuisance alarms to drivers who are already responding to the threat.

A minimal autonomous forward-looking, rear-end collision warning system would have limited sensor capability and would have as inputs only host vehicle speed, relative speed and inter-vehicular range. In a preferred embodiment, user-based attributes, vehicle-based attributes, and environmental-based attributes are also incorporated into the various heuristics. It is when the driver is inattentive or distracted that the system 100 is generally to warn, hopefully in time to avoid a collision. The installed warning system and the driver must work together to prevent collisions.

In a preferred embodiment of the system 100, different types of threats are assessed with different types of threat assessment heuristics. Processing should be targeted as closely as possible to specific categories of threats in an effort to avoid nuisance alarms. For example, the threat assessment subsystem 300 should apply a different threat assessment heuristic for in-path collision warnings (an in-path collision heuristic) than the threat assessment heuristic applied to out-of-path or crossing vehicles hazards.

In a preferred automotive embodiment, an in-path collision heuristic should: minimize nuisance alarms; handle lead vehicle stopped scenarios; handle following-too-closely scenarios; handle lead vehicle slowing, constant speed and accelerating scenarios; transition smoothly and transparently over all driving scenarios; support changes to adapt to an individuals preferences and habits (user-based attributes such as selection-based attributes and history-based attributes); support changes to adapt to changing driver, vehicle and driving environments; provide situational awareness as well as imminent collision warnings; and assume that braking is the only recourse.

An in-path collision heuristic can be evolved from the assumptions above and a systematic design approach. The in-path collision heuristic should to try to guide the relative speed of the host 102 and lead 106 vehicles to, or near to, zero without having them collide while leaving the host vehicle 102 at some distance behind the lead vehicle 106 consistent with both the lead vehicle 106 speed and the urgency of the situation. This must be done in a manner that is consistent with the capabilities of the vehicle 102 and driver.

The in-path collision heuristic can be predicated on a physical model, an empirical construct designed to optimize some value set, or it may be a combination of multiple independent methodologies. A preferred in-path collision heuristic is predicated on a specific physical model, but it tuned to optimize performance across a variety of scenarios. Driver braking habits (a history-based attribute) and lost time effects are the preferable physical basis for the in-path collision heuristic in an automotive embodiment of the system 100.

FIG. 9 is a diagram that depicts the "host" or subject vehicle (SV) 102 moving at speed $v_s$ and approaching (overtaking) a lead vehicle (LV) 106. The vehicle pair moves together to create a constant relative speed of $\Delta v$. The diagram shows two constant deceleration curves, one depicting a higher deceleration rate and the other lower. The curves terminate at the origin indicating zero relative speed and zero separation distance. Their shape is strictly a function of relative speed and deceleration level. The sooner braking is initiated the lower the necessary level. As mentioned above, the system 100 should provide a user with a warning in time for the user to avoid a collision without having the break the vehicle 102 at a braking level that exceeds a braking threshold at which the user is comfortable.

The heavy dashed line depicts the relative speed and range relationship as the subject vehicle approaches the lead vehicle 106. The vertical segment represents a constant relative speed ($\Delta v$) and the vehicle-to-vehicle range is shown (by the arrows) to be decreasing. By applying the brakes at the intercept with the upper deceleration curve and effecting a constant deceleration, the subject vehicle 102 will, as range and relative speed decrease, follow the curve to its terminus until it is bumper-to-bumper with the lead vehicle and moving at the same forward speed.

This final position relates to lead vehicle stopped and urgent braking scenarios where the separation distance between the lead 106 and subject 102 vehicles may reasonably be near zero. The constant deceleration curves may be viewed as driver preferences or vehicle deceleration limits, or a better interpretation might be a braking level within the driver-vehicle capability that is beyond the driver's usual braking preference, either way, the sooner the braking commences, the lower the necessary level required to stop.

Figure 10:
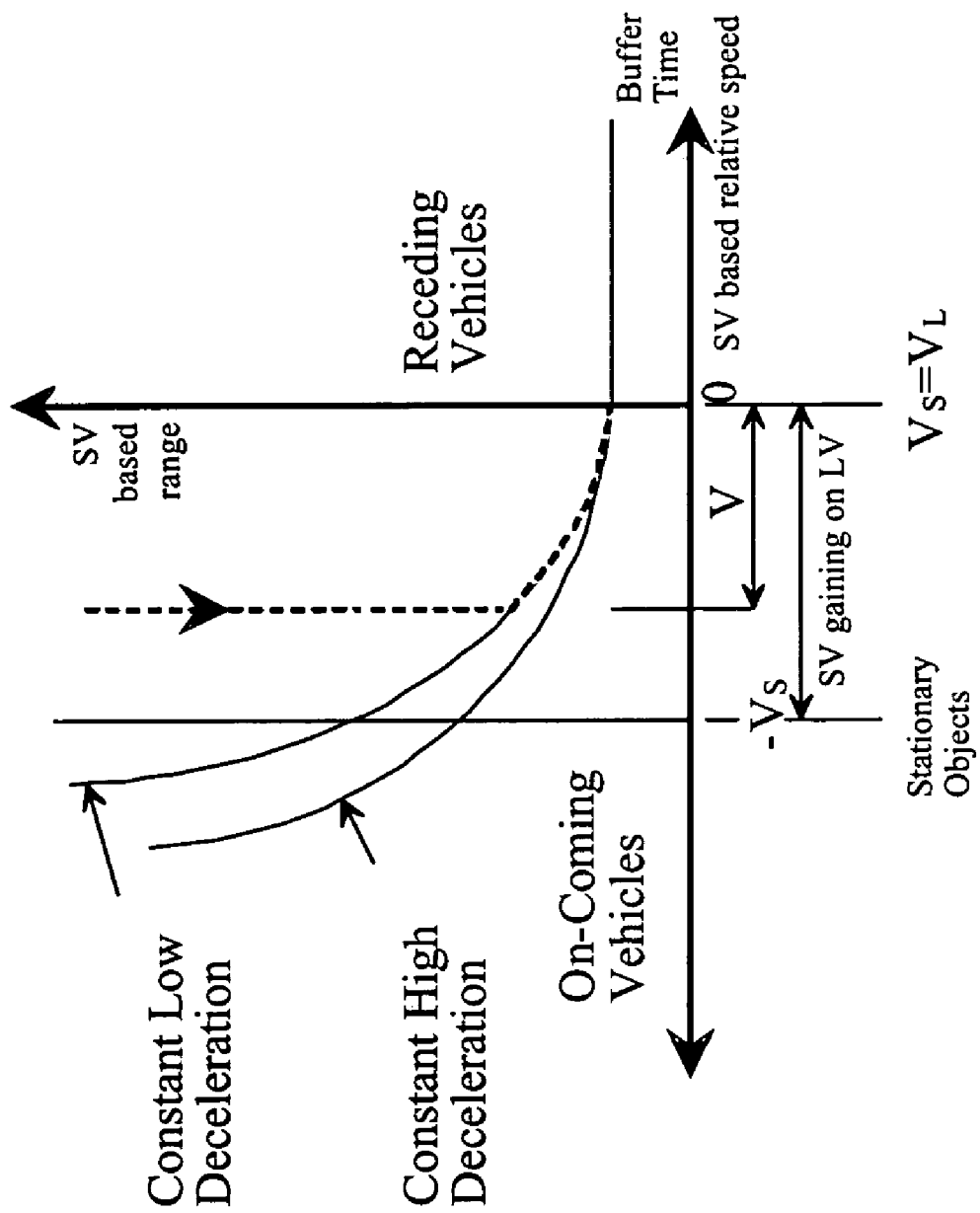
FIG. 10 is a coupled headway state diagram that can be incorporated into the various heuristics of the invention.

It is generally considered desirable to not tailgate and so for routine (non-urgent) braking, the recommended final position would not be as represented in FIG. 9, but would ideally be as diagrammed in FIG. 10, a coupled headway diagram. Here the following vehicle 102 again follows the path to zero relative speed, but because the plot is specific to a lead vehicle absolute speed greater than zero, the inter-vehicular range at zero relative speed is not zero but some minimum headway value providing a buffer between the lead and subject vehicles. The term coupled headway is used here to represent the range between the vehicles when the subject vehicle is traveling coupled, behind the lead at a relative speed that is close to (and probably varying around) zero.

This final position is compatible with normal, in traffic braking scenarios where the resulting separation distance between the lead and subject vehicles must reasonably be greater than zero. Again the constant deceleration curves may be viewed as driver preferences or vehicle deceleration limits, or a better interpretation would be a braking level within the driver-vehicle capability that is beyond the driver's usual braking preference.

Figure 11:
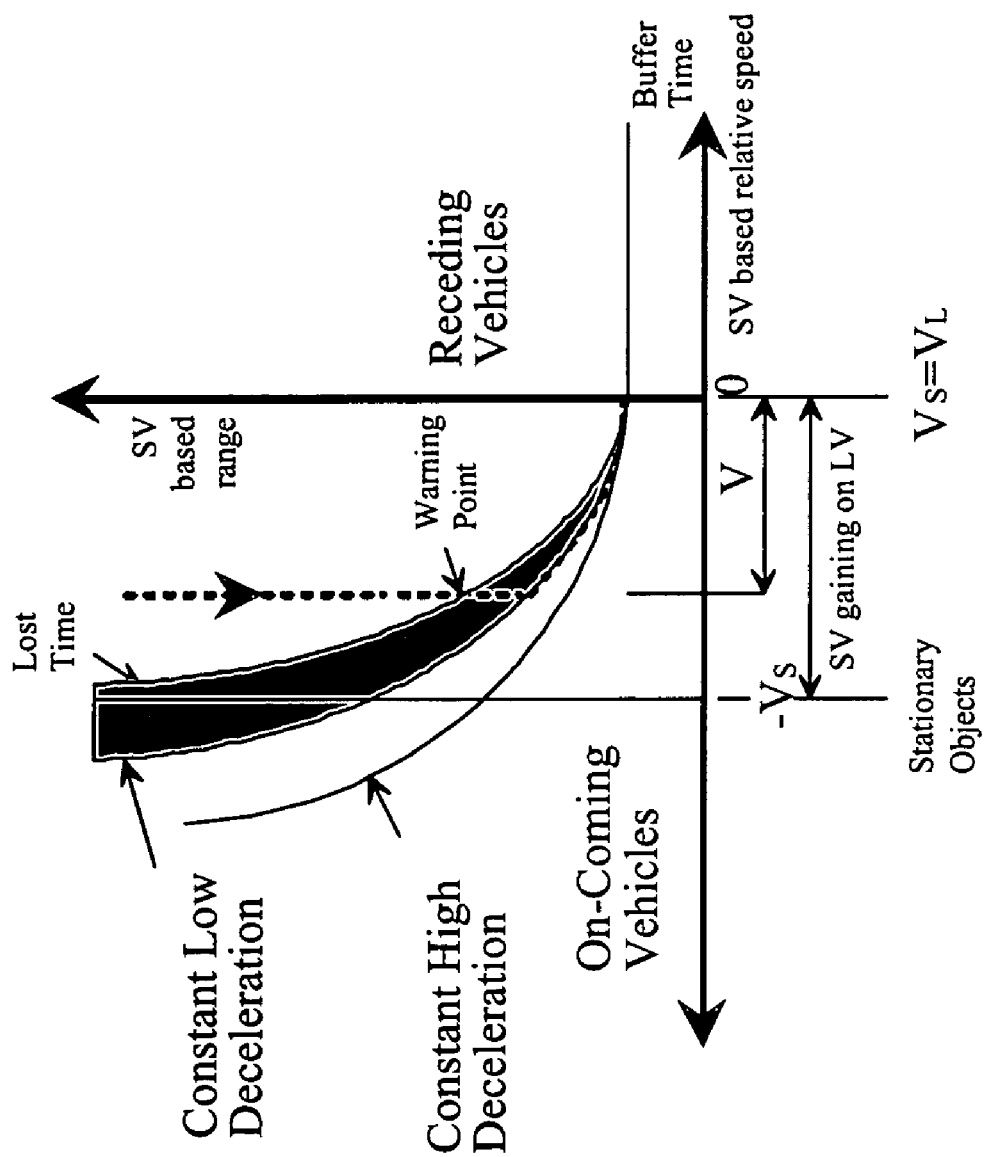
FIG. 11 is lost time state diagram that can be incorporated into the various heuristics of the invention.

Lost time is the sum of driver reaction time, brake actuation time and processing delays. A lost time value is associated with each and every individual driver, and will vary based on the driver, driver condition, driving environment, vehicle, etc. Drivers do not, and cannot respond to a warning instantaneously. The overall system 100 must take lost time into account, but errors in determining lost time lead directly to nuisance alarms. Working backwards from a constant deceleration curve, lost time is the time required for the driver to respond as shown in FIG. 11. The feedback subsystem 400 must take an estimate of lost time into account in determining when to warn. A shaded zone that is a representation of distance traveled due to lost-time (driver response/reaction time) has been added to the diagram in FIG. 11. It is applied as a function of the relative speed. If in the Figure the upper deceleration curve is the intended braking profile, then the upper boundary of the lost-time zone may be seen as the warning range.

Because of lost-time and assuming that the driver does not recognize the threat, an alarm must be issued at the point labeled "Warning Distance" in order for the driver to respond and brake in time to put the vehicle onto the desired deceleration curve. FIG. 11 also illustrates that the path of the subject vehicle 102 along the prescribed deceleration curve is entirely within the warning zone. It may be overly optimistic to alarm only at the entrance to the warning zone and it is certainly unacceptable to alarm continuously when the driver is in no danger and following the prescribed profile. Thus, in a preferred embodiment, user-attributes are used to mitigate against nuisance alarms.

Figure 12:
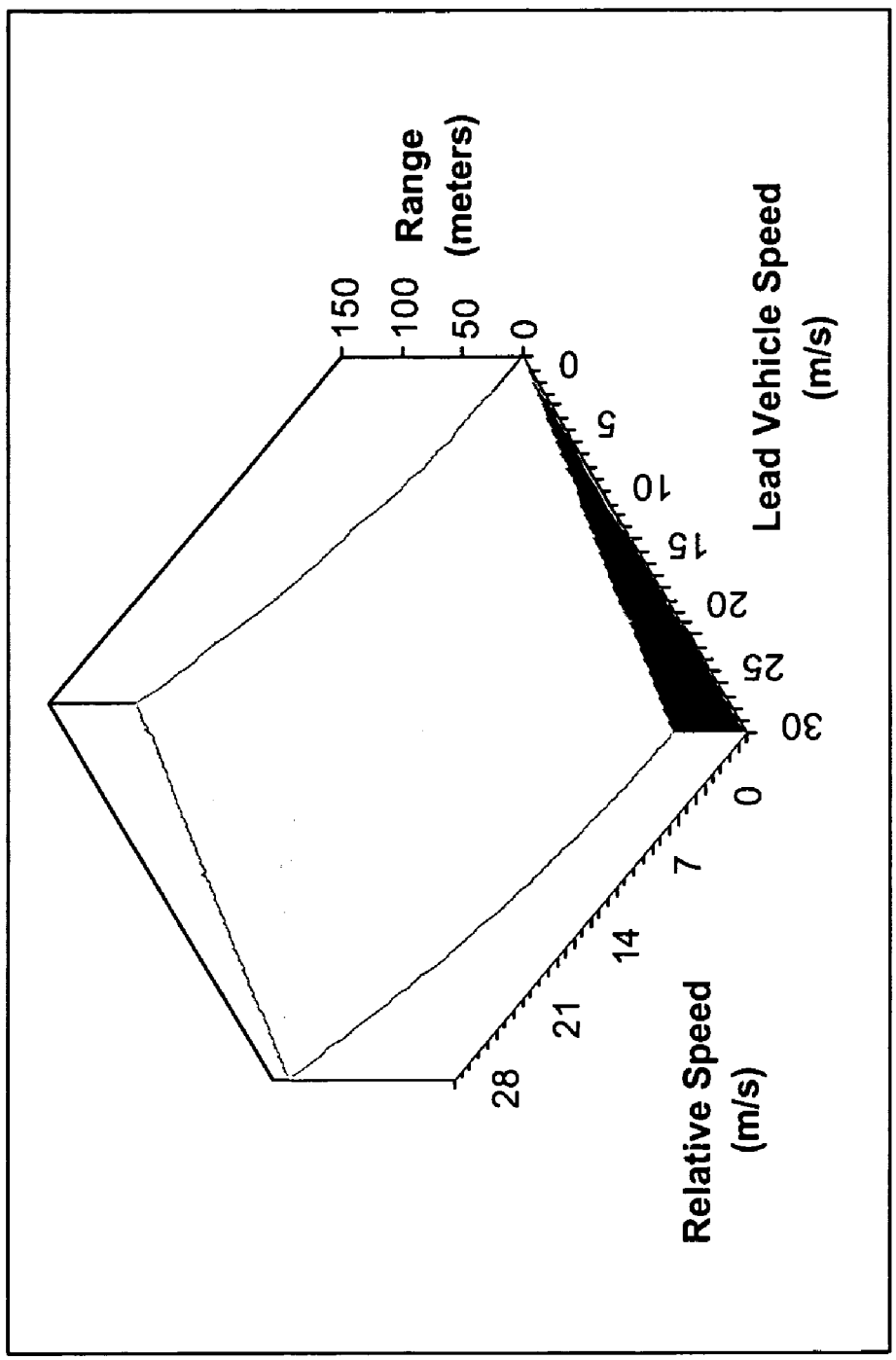
FIG. 12 is a graph illustrating relationships between relative velocities, lead vehicle velocity, and vehicle distance that can be incorporated into the various heuristics of the invention.

By adding a third axis to FIG. 11, the range/relative speed state diagram is expanded to depict a range of lead vehicle speeds from 0 to 30 m/s. FIG. 12 includes a coupled headway buffer that is a function of the lead vehicle 106 absolute speed, resulting in the triangular wall on the lower right. The diagram in FIG. 12 is valid for a single deceleration value. The surface in FIG. 12 represents an idealized vehicle performance that is assumed consistent with both the perception of typical drivers and the notion that a constant deceleration can represent the desired performance of the driver under varying speed and range conditions. Though there is some debate whether a single deceleration level, or profile, suffices for all speeds and conditions and it has been shown that driver's deceleration profiles vary based on absolute speed, and this notion provides good results in current simulations and is amenable to tuning and conditioning.

The standard output of collision warning equations is a warning distance (WD), calculated from the current speeds of the vehicles and one or more assumed deceleration rates. The calculated distance is then compared to the measured range (r) and a warning is issued when r≦WD. This approach is used here for consistency.

An alternate approach that has the benefit of providing an indication of the urgency of the situation across different absolute and relative speeds is to use the speeds and range as inputs while solving for the required deceleration. Warnings are then issued at selected deceleration (g) levels.

This method allows warning level compensation for changes in road conditions, driver preferences and vehicle performance variation, by merely changing an offset. For the researcher, deceleration or g-level values also reveal the predicted mean braking level (relative to the assumed braking thresholds represented in the state diagrams) for the condition being explored.

The kinematic core equation for the deceleration curves plotted on the state diagrams is:

$$r = \frac{(v - v_f)^2}{2g\alpha}$$

r=inter-vehicular range (change in range between v and $v_f$)
v=initial (current) speed (meters/second)
$v_f$=final speed(meters/second)
g=9.8 (meters/second)
α=acceleration (g's) (assumed constant either positive or negative)

This is a general kinematic equation for constant acceleration/deceleration and all in-path collision heuristics should incorporate it in some way. There are however, major differences in how it is applied which intentionally or not relate to some physical model.

The variable $v_f$ represents the final speed of the vehicle pair. Ideally, it would be beneficial if the final speed were known, but the driving environment is unpredictable, and the system 100 can not always predict the final speed of the vehicle pair. As a result, an assumption must be made regarding the final speed. Two extremes are possible, either $v_f$ will be zero, or $v_f$ will be a constant equivalent to the speed of the lead vehicle 106, neglecting for a moment, any acceleration components. Between these extremes there are an infinite number of intermediate values or potential approaches.

The variable α represents the relative acceleration that is applied between the current speed (v) and the final speed ($v_f$) of the vehicle pair. Ideally, it would be beneficial if the final speed were known, but the driving environment is unpredictable, and the system 100 can not always predict the final speed of the vehicle pair. As a result, an assumption must be made regarding the final speed.

The stopping distance equation assumes that $v_f$ is zero. In the stopping distance equation, two terms use the kinematic core equation for r as difference terms to predict the stopping distance required. The stopping distance equation "assumes" that the lead vehicle and as a result, the subject vehicle will be coming to a stop ($v_f$=0 in the kinematic core equation). The problem with the stopping distance equation is that the assumption that the lead vehicle is stopping causes the equation to be overly conservative, this in turn leads to the possibility of nuisance alarms in benign conditions such as pulling up behind a lead vehicle at a stop light.

The Lead Vehicle Constant Speed Equation (LVCS) assumes the opposite extreme, that the lead vehicle is at a constant speed. The initial benefit of the LVCS equation is that by providing the terms for $v_f$ in the equation, the issues of acceleration, deceleration, or changes in the speed of the vehicle pair can be included. In the examples of the state diagrams, $v_f$ equals the final speed of the vehicle pair. If for example, in FIG. 9 the condition depicted is assumed to be lead-vehicle-stopped, then $v_f$=0, if however the figure is representing an urgent braking scenario and the lead is moving at some forward speed, say 22 m/s, then $v_f$=22 m/s. The notion that the value of $v_f$ is equal to the lead vehicle speed and that the equation predicts and warns based on that number has led this approach to be labeled the lead-vehicle-constant-speed (LVCS) model ("LVCS heuristic").

The LVCS lost-time elements are necessary to adjust kinematic predictions to accommodate driver and system 100 delays. Using the LVCS heuristic, the lost-time elements are converted to distance by multiplying by the difference of the speeds. The resulting lost-distance effectively shortens the inter-vehicular range and heightens the predictions of stopping urgency as illustrated in FIG. 13.

Figure 13:
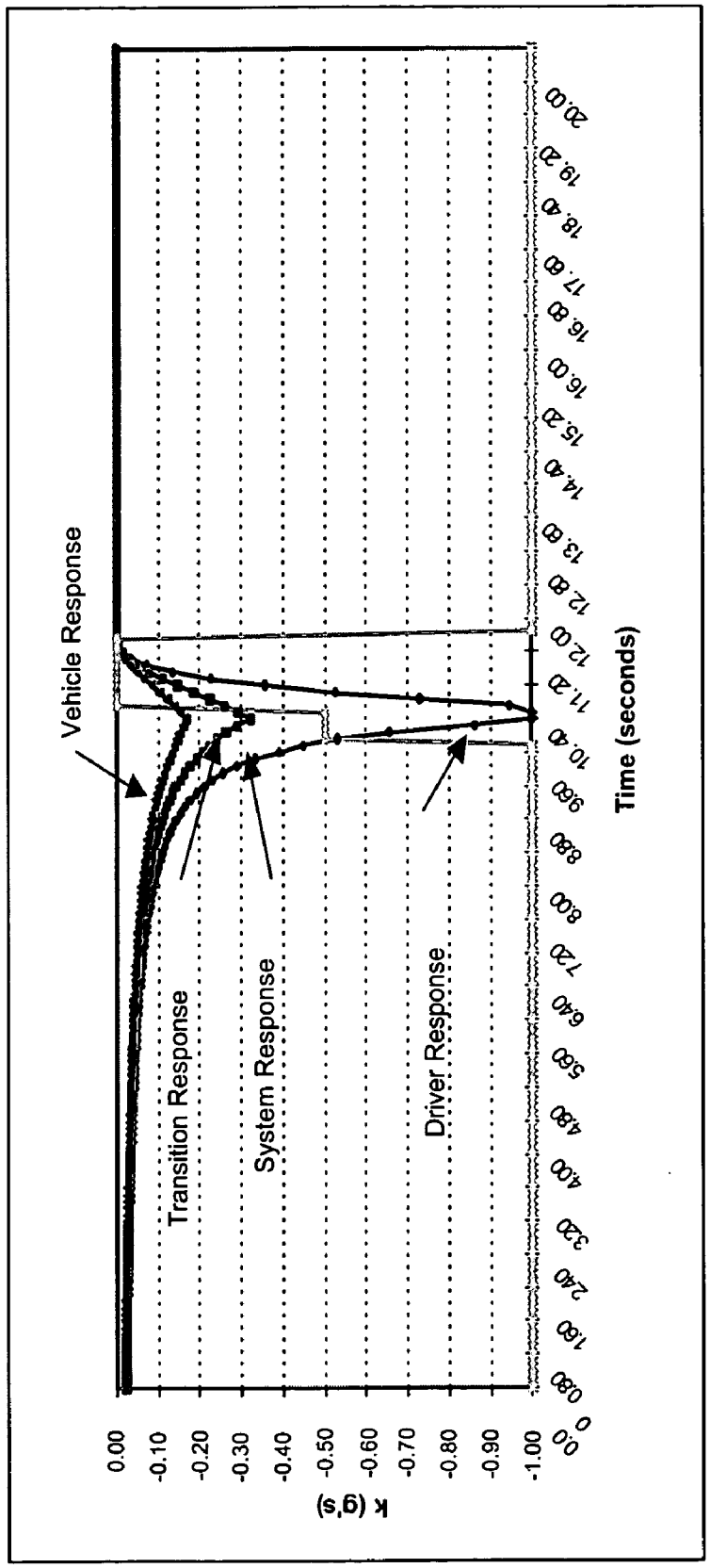
FIG. 13 is a graph illustrating one example of response time output that can be incorporated into the various heuristics of the invention.

FIG. 13 represents an example of output of the LVCS heuristic plotted as a function of deceleration (g) level (k), a continuous representation of the deceleration required to slow the host vehicle to the lead vehicle speed. The Figure shows a driver input response (removing foot from accelerator and braking) and three output curves that are functions of different values of lost-time.

The system response curve is the predicted deceleration required, calculated with a realistic lost-time. The vehicle response curve at the top of FIG. 13 results when lost-time requirements are removed. The vehicle response curve is reflecting the kinematic reality of the scenario. This curve defines what the vehicle must do without regard to the assumed driver and system induced delays. A comparison of the two curves yields, at the peak of the curve where the brakes were applied, predicted values of −9.8 m/s² (1.0 g) (heuristic with lost-time) and −1.8 m/s² (0.18 g's) (kinematic core equation only), the difference results solely from the distance compression caused by lost time effects. The result is clear, eliminate excessive lost-time.

There are two driver braking reaction times to consider when dealing with the various heuristics. They are the driver's immediate situational reaction time (accurately reflecting the mood, sobriety, attentiveness level, and other user-based attributes of the individual driver) and the reaction time value of the system 100, ($A_{RT}$) which is a vehicle-based attribute.

In a preferred embodiment, the system 100 reaction time is the specific reaction time of the driver. If the system 100 had this reaction time, the predictions of the system 100 would be extremely accurate and nuisance alarms would be eliminated. In alternative embodiment, values from a distribution representing the driver reaction population at large can be used by the system 100 as user-based attributes.

Figure 14:
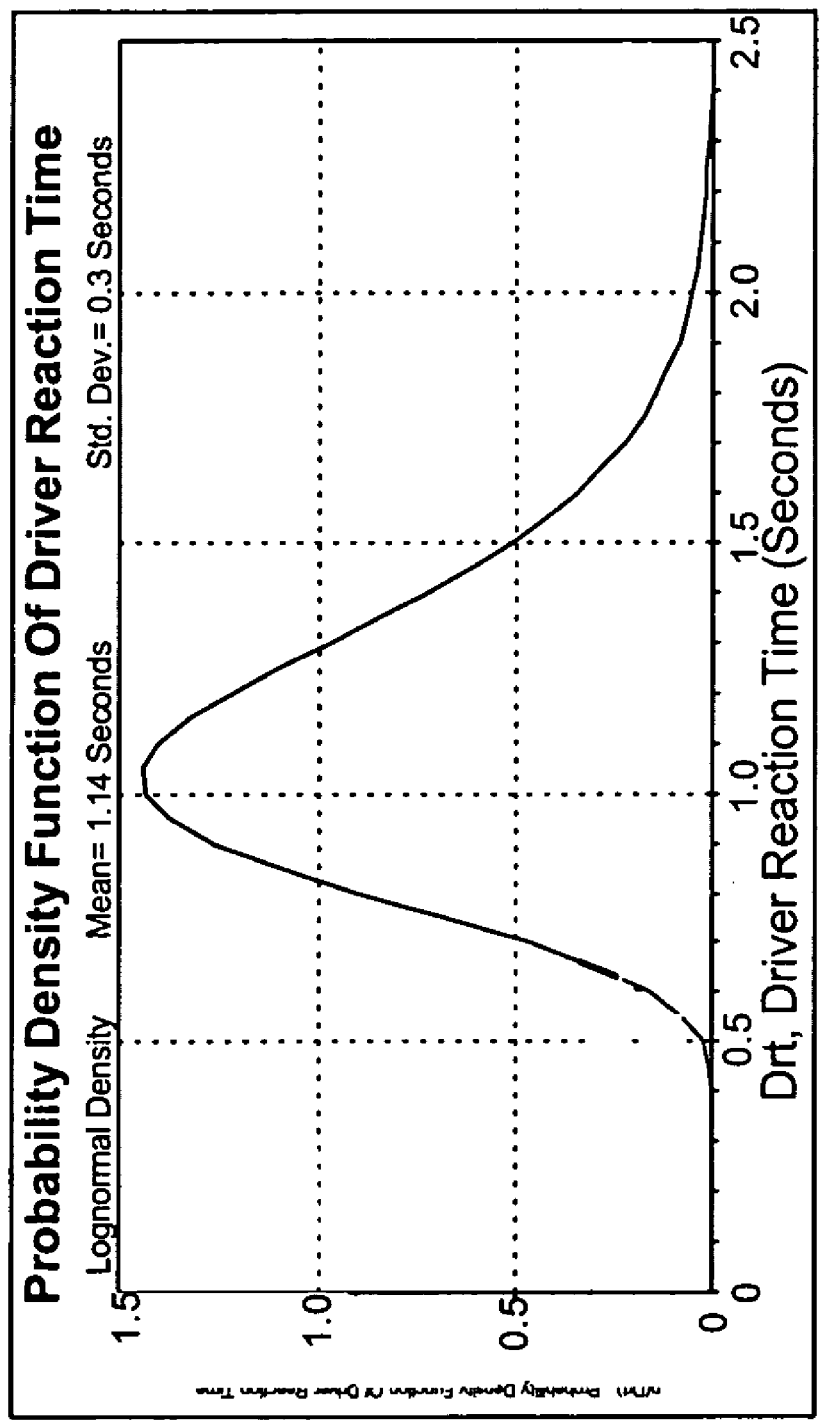
FIG. 14 is a probability density graph relating to response times that can be incorporated into the various heuristics of the invention.

A number of studies have been done that report braking reaction time data on unalerted drivers. A skewed distribution (or lack of symmetry) of the data is prevalent in the studies. A log-normal probability density function can be fit to the data, providing a practical numerical description of the observed distribution. An estimate of the reaction time of the driving population is shown in FIG. 14. The driver reaction time distribution (Drt) for the driving population is modeled as a random variable having a log normal probability distribution. The probability density function of Drt is:

$$p(Drt) = \{1/[(2\pi)^{1/2} \cdot \zeta \cdot Drt]\} e^{\{-[Ln(Drt)-Ln(\lambda)]^2/(2 \cdot \zeta^2)\}}$$

where

Drt=Driver reaction time (Seconds)
Drtm=The mean of Drt=1.14 Seconds
Drts=Standard deviation of Drt=0.3 Seconds
$\zeta = \{Ln[(Drts/Drtm)^2 + 1]\}^{1/2}$ = Dispersion of Drt
$\lambda = Drtm \cdot e^{(-\zeta^2/2)}$ = Median of Drt (Seconds)

The processing delay ($t_p$) represents the sampling and update rate of the system 100. The processing delay assumes that the object under consideration has already been acquired and is being tracked by the system 100. The system processing delay includes sensor sampling, filtering, object classification, scene processing, and warning heuristics as well as updating the object track files. The system processing delay is anticipated to be less than one tenth of a second. Heuristically, the system processing delay $t_p$ should be replaced with the actual delay of the system 100.

The braking actuation time is the time delay from brake initialization to braking effect and is made up of the brake response time and the pressure build up times. Values for $t_B$ can vary with individual systems, their condition, frequency of use (hot brakes, cold brakes) etc. A standard value is 0.36 seconds. If platform specific information is available it should be used in place of the default. The brake actuation time is different from a warning actuation time that uses braking initiation.

The time required for the processor output to become an identifiable stimulus presented to the driver is the warning actuation time ($t_W$). Incredulously delays approaching 0.8 seconds have been reported for some display modalities. As with all lost-time effects this must be minimized. The cost for excessive delay is decreased benefit and increased nuisance alarms. An upper limit of 0.1 seconds is assumed but should be replaced by the system specific value.

It is expected that forward-looking, rear-end collision warning systems 100 will employ filters to improve the accuracy of the sensor data and reduce false alarms due to momentary reflections or system noise. The initial categorization of a vehicle in the forward path will require multiple samples to verify range, speed, size and location information. The number of samples to perform this function is the acquisition delay of the system 100. This acquisition delay should not be confused with processing delay. Acquisition delay will reduce the warning capability in scenarios where the lead vehicle is acquired near or inside the optimum warning time.

If, for example, the system 100 initially requires five samples to provide accurate estimates of range and speed and the system samples at 20 Hz then at least 0.25 seconds will be consumed waiting for the first recognition of a new object. The 0.25 seconds lost to initial multiple sensor samples is the acquisition delay and cannot be compensated.

Combining the kinematic core equation with the lost-time elements that are collectively converted to lost-distance, yields the collision warning equation. This warning core equation has been shown to be acceptable when used in a lead vehicle constant speed (LVCS) mode in a representative heuristic over the majority of driving conditions.

The derivation tags this equation as LVCS though its application may be more general. Note that $v_f$ is meant to represent the final speed of the subject vehicle, and not necessarily the current speed of the lead. The equation is provided here in two forms, with both warning distance and g-level outputs.

| | |
|---|---|
| WD = | Warning distance |
| v = | subject vehicle current speed (meters/second) |
| $v_f$ = | subject vehicle final speed (meters/second) |
| g = | 9.8 (meters/second$^2$) |
| a = | assumed (assigned) deceleration (g's) |
| $A_{RT}$ = | Algorithm assumed driver reaction time (seconds) |
| $t_P$ = | platform specific processor delay |
| $t_B$ = | platform specific brake actuation delay |
| $t_W$ = | platform specific warning actuation delay |
| k = | g-level |
| r = | range (meters) |

The output WD (meters), is compared with the measured range to determine the warning:

$$WD = \frac{(v - v_f)^2}{2g\alpha} + (A_{RT} + t_P + t_B + t_W)(v - v_f) \text{ (meters)}$$

The output k (g's), is compared to a predefined braking level to determine the warning:

$$k = \frac{(v - v_f)^2}{2g\alpha((A_{RT} + t_P + t_B + t_W)(v - v_f) - r)} \text{ (g's)}$$

The current LVCS heuristic can provide a manageable compromise between crash prevention, crash mitigation and nuisance alarms. Further optimizations can be incorporated into the system 100. Additional factors such the non-linear driving effects of drivers, discrepancies in scene process and object classification, and other characteristics can be further integrated into the system 100.

Defining the heuristics expected final velocity ($v_f$) as a function of absolute speed, relative speed or some other parameter (lead vehicle deceleration, a threshold) is a useful means of shaping the response of the collision warning equation to tune the heuristic.

A variety of offsets, positive or negative, constant, increasing, decreasing, linear or exponential may be added to the collision warning heuristics. Generally they are manifested as distance terms and either compress or expand the apparent range, thereby increasing or decreasing the predicted urgency of the situation.

A simple but flexible approach is to shape the response by direct modification of the collision warning equation output. Any function of speed, relative speed, following distance, etc., can be applied as a factor, enabling a number of minor tweaks with or without logical branches to be easily and cleanly incorporated. This method has the advantage of maintaining a discernible separation between the core and the various modifications.

The output of the system's heuristics may be turned off, or parameters switched in or out responding to auxiliary sensors, speeds or, if known, the condition of the driver. Any switched outputs that result in sudden display changes should have a situational justification for that change, i.e. sudden speed changes etc.

The system 100 should be able to incorporate as many predefined driver responses as possible. Three obvious driver responses to a developing situation are steering, braking and releasing the accelerator (coasting). In order to compensate for these driver activities the extended system must provide adequate sensor information. Brake light signals exist, and accelerator presence and steering level sensors are reasonably inexpensive devices. In order to manage nuisance alarms and prevent the occurrence of warnings after the driver has responded these additional sensors may be necessary.

FIG. 13 shows the continuous output of three implementations of the collision warning equation for a simple lead vehicle stopped scenario. The driver in this case responds to the scenario and removes his foot from the accelerator, then brakes and slows to a stop just behind the lead vehicle, a scenario depicted in FIG. 9.

The vertical lines in FIG. 13 represent the driver's response. The leftmost vertical line (extending from k=−1 to −0.5) indicates the removal of the driver's foot from the accelerator (transition indicator), while the line to the right (extending from k=−0.5 to 0) indicates the application of the brake. Approximately 0.5 seconds is required for the driver's foot to move from the accelerator to the brake and this is seen to be relatively constant, even in panic situations. This value is used in the figure as a typical response time and is used to compensate for driver activities.

Note the rapid increase in the predicted required deceleration, between the transition indicator and the application of the brakes. This is the result of the lost-time values becoming dominant as the inter-vehicular range decreases.

The lowest curve (System Response) in FIG. 13 is the deceleration required to avoid the lead vehicle assuming the driver is driving normally with his foot on the accelerator. It is calculated with all lost-time factors. The middle curve (Transition Response) represents the same conditions, but the lost-time has been calculated with an $A_{RT}$ of 0.5 seconds, a value consistent with the driver responding by letting off the accelerator pedal (transition). This assumes that the driver is responding to the scenario which may not be accurate under all circumstances. The top curve (Vehicle Response) is the deceleration calculated without lost-time, representing the physics of the situation without regard to driver lost time.

A number of approaches are possible to reduce driver-responding induced nuisance alarms. A simple lock out of the warning when the driver is off the accelerator or on the brake is a first order approach. Unfortunately, this approach eliminates monitoring capability, and slow and go traffic situations find drivers spending a lot of time coasting at speeds as low as 5 or 10 mph. It is therefore desirable to implement a scheme to provide a reduction in nuisance alarms while still maintaining contact with the developing traffic situation in order to provide the driver more comprehensive protection.

Continuous monitoring with the adjusted lost-time values will provide protection while reducing nuisance alarms. The heuristic output would then follow the lowest curve to the accelerator transition line, then up the vertical line to the transition curve and so on in a stair step manner.

Steering feedback, either directly from the steering mechanism or as an input from an accelerometer can be used to detect an avoidance-by-steering maneuver. This measurement of lateral acceleration may be useful in lane change/merging and cut-in scenarios by is not completely reliable under all conditions.

The sudden lateral shift of the field of regard relative to the target group, may also be a viable indicator of a sudden steering adjustment. (The complete disappearance of the threat from the field may result.) Target and scene processors are reluctant to make pronouncements based on single readings and a number of passes through the sampling loop (with the resultant loss of time), but will probably be required before the adjustment can be made.

Since indication of a timely steering maneuver does not necessarily imply recognition of the threat, or an avoidance maneuver, continuous monitoring with an adjustment of lost-time is suggested.

Excessively long warning delays are doubly damaging because they artificially increase the lost-time, thereby increasing the predicted urgency, and because they are systemic they must be maintained throughout steering or accelerator action compensations, continuing to dictate an unnecessary urgency.

Slow Speed Overtaking is the seemingly benign case of a motorist pulling up behind a stopped lead vehicle. Very slow speed, close in situations may trigger a warning response under non-collision conditions. Three approaches are suggested to reduce the nuisance alarm potential to the driver, others are possible dependent upon heuristic topology.

First, a constant negative offset can be added to the collision warning heuristic. This has the effect of desensitizing the equation at slow speed and close quarters, but has little effect in other higher speed scenarios. In a Monte Carlo simulation the addition of a −3 meter offset resulted in an improvement of 60 fold in the nuisance alarm rate, but with the penalty of a minimal decrease in mitigation effectiveness and a 3% increase in low speed collisions below 5 mph.

Second, a relative and/or absolute speed dependent factor can be used to increase the value of $v_f$, again reducing the sensitivity at slow speeds.

Figure 15:
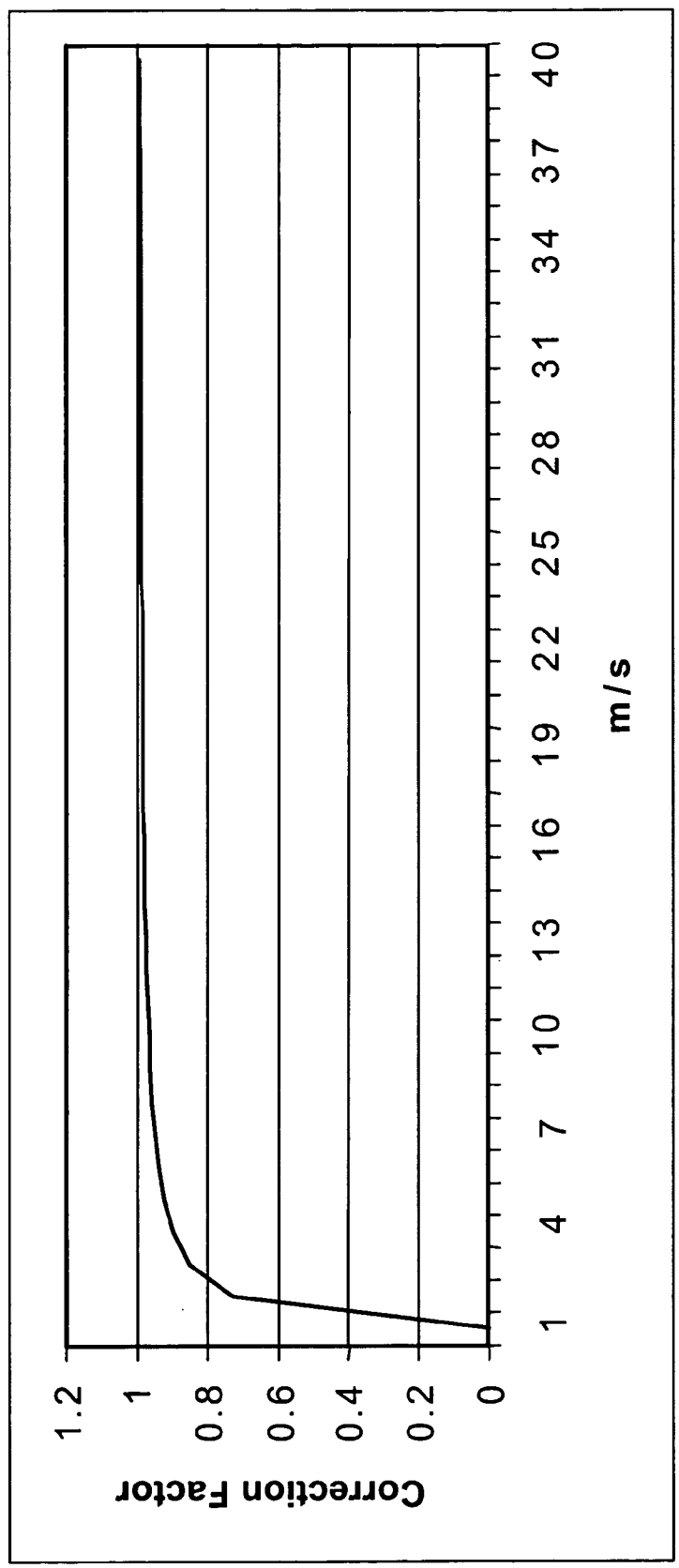
FIG. 15 is a graph illustrating one example of a slow speed response correction heuristic.

Third, response shaping can also be accomplished by a separate, speed dependent function that is applied to the output (warning distance (WD) or deceleration rate (k)) of the collision warning equation, as shown by example in FIG. 15.

Cut-ins, sliders, mergers, etc. also provide a challenge to system 100 processing. Cut-ins are sudden, close range merging vehicles 106 which may or may not slow in front of the subject vehicle forcing a following-too-closely condition. Sliders are cut-ins that continue across and out of the subject vehicle's lane. These, along with more mannered merging vehicles share some common characteristics. They all suddenly appear in the immediate frontal path. Generally they present no real danger and indeed the GES database shows only 1% of the rear-end collisions resulting from these scenarios.

If they appear and disappear within the acquisition time, they are never passed to the warning algorithm and are not a concern. If they are recognized as targets and are pulling away, the collision warning equation will not force an alarm. Leaving us with the case where they are too close and the subject vehicle is closing on them.

Figure 8:
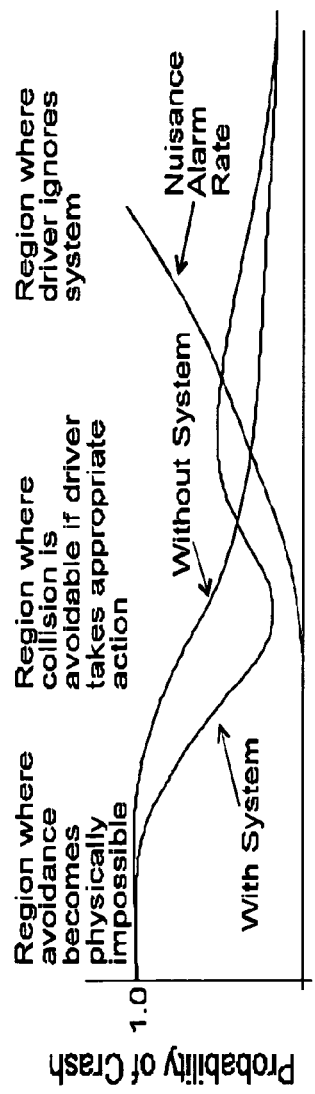
FIG. 8 is a graph illustrating a diminishing likelihood curve relating to nuisance alarms that can be incorporated into the various heuristics of the invention.

As illustrated in FIG. 8, there is a region where the prevention of a collision is physically impossible and as noted, the probability of a crash approaches unity in that region. An intrusive warning within that region may actually distract an attentive driver and cause a response delay that actually delays an alert driver's chance to avoid the crash. A warning under these circumstances will not aid the inattentive driver.

An adjusted collision warning equation with a low ($5^{th}$ percentile, 0.3–0.5 second) reaction time could be used to set a minimum warning range and any warning falling below that threshold could be suppressed. In these cases, the driver may be aware that warnings have been artificially eliminated. Times above the minimum will cause a system warning.

One of the disturbing scenarios is the suddenly exposed lead vehicle. A slow moving or stopped vehicle 106 that is masked to the driver and system 100 by the lead vehicle 106, that is itself moving at a relatively high rate of speed. The obscuring lead anticipates the threat represented by the vehicle in-path and force merges or turns off, out of the lane, avoiding the collision but leaving the subject vehicle in close proximity, near or inside the optimum warning time. This scenario is affected by long acquisition delay times. The percentage of same direction accidents attributed to suddenly exposed lead vehicles is unknown. By observation, the occurrence is, in urban driving, relatively common and near collisions are common. The system 100 response to the suddenly exposed lead is the same as the cut-in family of scenarios.

A decelerating lead vehicle 106 can also be difficult for the LVCS heuristic to accurately process. Not a surprising circumstance since the stopping distance equation is based on that activity and the physical basis for the collision warning equation used here is lead vehicle constant speed. There are at least three ways to approach the lead vehicle decreasing speed situation. All three approaches must be considered in light of nuisance alarms and efficiency.

An optimized values heuristic can be used. This approach uses the lead vehicle constant speed equation with values optimized for a statistical mix of collision scenarios and is the method used here. In an effort to further optimize the heuristic or if the frequency or import of lead vehicle decelerating cases warrants, two alternative approaches are offered.

A measured lead vehicle deceleration heuristic can be used. If the sensor subsystem 200 allows, measurement of the lead vehicle 106 deceleration can augment these scenarios. Unfortunately, sensors don't measure acceleration directly, they must measure relative speed between the vehicles and then estimate deceleration by differentiation of the absolute speed of the lead vehicle 106. Errors are induced in the measurement of relative speed, and absolute speed of the host vehicle 102. Delays are induced in filtering the measurements in order to provide accurate estimates of lead vehicle 106 deceleration. These errors and delays make the use of measured lead vehicle 106 deceleration difficult. Even if a perfect estimate of lead vehicle 106 deceleration is known, it does not provide information about the duration of the lead vehicle 106 deceleration or the resultant final speed. A cooperative system using information handed-off from the lead vehicle 106 would obviously benefit these scenarios, but cooperative systems require all vehicles to be equipped in order to be effective and this would delay deployment of systems that could truly benefit the driving public. However, in a preferred embodiment of the system 100, multiple vehicles host the system 100 such that velocity, acceleration, and other information can be exchanged between both host vehicles 102 and lead vehicles 106 using a information sharing module in the sensor subsystem 200. In a situation where the deceleration of the lead vehicle 106 is either unknown, or cannot be accurately measured by the sensor subsystem, then the heuristic can revert to the lead vehicle 106 constant speed case.

In some situations it is known that the lead vehicle 106 is decelerating, but it is not known what the final speed of the lead vehicle 106 will be. One approach is to assume that the lead vehicle will come to a complete stop (a "complete stop heuristic"), but this may force the heuristic to be overly conservative and as a result have an unacceptably high number of nuisance alarms in benign scenarios. Another approach would be to assume that the lead vehicle will slow to a percentage of the absolute speed (a "reduced speed heuristic").

The deceleration rate heuristic can augment the LVCS heuristic for this circumstance and is developed to bring the vehicles together at the speed $v_f$ after both vehicles decelerate to that value. In this equation, $\alpha_l$ is the assumed deceleration of the lead vehicle and $v_l$ is the lead vehicle cannot speed. The heuristic can be rewritten to facilitate the transition from lead vehicle slowing to LVCS.

A third approach is to use the lead vehicle count speed equation combined with a deceleration threshold detection scheme to trigger reductions in $v_f$ when in the presence of a lead vehicle deceleration that exceeds the threshold. This approach may have the benefit of requiring only a gross approximation of deceleration, simplifying sensor and processing accuracy.

It is possible that a warning may be issued when the lead vehicle 106 accelerates from in front of the host vehicle 102. This is the result of the squared term in the core equation. A simple logical trap to suppress warnings on negative relative speeds will prevent this from happening.

The focus of the heuristics discussion above has concentrated on collision warnings and the considerations required to develop heuristics for collision warnings. However, the system 100 can also incorporate situational awareness information and following-too-closely warnings.

It is reasonable to assume that a driver would expect a warning or advisory in situations where they are following-too-closely. This type of is intended to be less intrusive and may be disabled by the driver due to the increased nuisance potential. This type of warning is specific to following-too-closely (tailgating). The feedback subsystem 400 output to the following-too-closely display is simply the continuous output of the waning heuristic, scaled and filtered to produce a stable output. The following-too-closely display can be used to warn the driver that an unsafe or cautionary, tailgating condition exits.

The following-too-closely display needs to not only be intuitive to the driver, but may need to operate harmoniously with the collision warning display such as giving the driver situational awareness in high closure rate scenarios as well as tailgating scenarios.

One type of situational awareness of the system 100 can be for a condition previously referred to as "coupled headway." Coupled headway is the condition experienced when the subject vehicle's 102 absolute speed is dependent upon vehicles in the forward path. In this case, the driver of the subject vehicle 102 is follow the lead vehicle 106 at near zero relative speed and is controlling the speed of the subject vehicle in response to the actions of the lead. Zero relative speed between the subjects lead vehicle 106 at near zero relative speed and is controlling the speed of the subject vehicle in response to the actions of the lead. Zero relative speed between the subject vehicle and lead vehicle may occur at any absolute speed as suggested in FIG. 11. Coupled headway distance is the range between coupled vehicle pairs and is used to define a safety zone or buffer between the coupled vehicles. This is not what driver's do, but perhaps what they should do dependent upon the absolute speed. This safety zone is defined as a minimum coupled distance, which creates an interval for warning and reaction time (see FIGS. 12 and 13).

Since reaction time (within the collision warning equation) is implemented as a product of relative speed, the separation distance dictated by such a product requires zero separation at zero relative speed and provides no buffering at low relative speeds. The coupled headway buffer is therefore made proportional to lead vehicle speed, an approach that is consistent with the scheme of FIG. 11. The buffer or coupled headway distance and the lost time are separate and distinct.

Assuming that a buffer zone is desirable how big might it be? Germany uses 0.9 seconds as a legal minimum following distance. The state of Arizona recommends a 2 second minimum. About twenty-five percent of the 40,000 vehicle pairs surveyed on New Mexico's highways were coupled at less than 1 second.

Constant coupled headway times (at any practical values) are not consistent with observed driver behavior, since vehicles are often coupled at less than 0.5 seconds at 20 m/s (45 mph), a habit that appears unsafe, however, yielding to driver preferences may be necessary. Not only for driver acceptance but also because drivers at these following-too-closely headways seldom have collisions. To provide practical time margins for coupled pairs at various speeds, a headway time value that is proportional to speed is desirable. It should be noted that this headway time value is separate and distinct from headway time values discussed in conjunction with the ACC module.

Headway values are used to maintain a buffer between vehicles under routine driving conditions as illustrated in FIG. 11 and should be reduced to zero during severe-braking-required episodes to allow imminent warnings to reflect crash conditions, with the expectation that a satisfactory end to an urgent braking is the bumper to bumper condition of FIG. 11.

Coupled headway distance is a function of the anticipated final speed of the subject vehicle and the coupled headway time ($t_{CH}$) which is itself a function of the assumed final speed. Coupled headway time ($t_{CH}$) is nominally defined as varying from a standoff time $t_{so}$ at $v_f$=0 at a slope of $t_{SL}$. This allows for a minimum standoff time and a lead vehicle speed dependent coupled headway time. Values should be based on either user specific user-attributes or user-attributes based on normative driver data.

$$d_{CH}=t_{CH} \cdot v_f \text{(meters)} \quad t_{CH}=t_{SL} \cdot v_f + t_{SO} \text{(seconds)}$$

To provide the most optimum possible collision warning thresholds it is necessary to reduce and then remove $d_{CH}$ from consideration or treat it as a separate warning system independent of collision warning. Without this, the heuristics and the resultant driver warning displays will be erratic.

Figure 16:
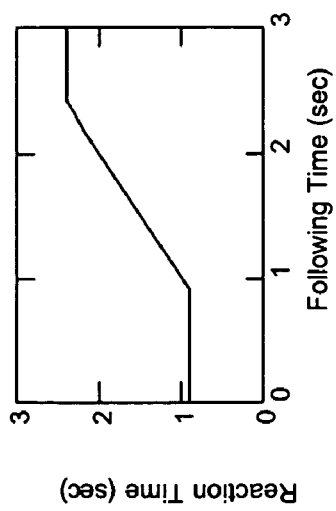
FIG. 16 is a graph illustrating one example of a potential relationship between response times and following times in coupled headway environments.

FIG. 16 is a graph of a relationship between the following time between two vehicles, and the response time of the driver in the following vehicle 102. It is possible that user response time is faster in coupled headway environments because the user has knowledge that the lead vehicle 106 exists in the forward path. This definition of $A_{RT}$ has been somewhat quantified to show that there is a 1:1 correspondence in the interval 0.9–2.4 seconds between following time ($t_F$) and the reaction time ($D_{RT}$) and zero slope plateaus beyond those points.

A further restriction is that this relationship applies to somewhat attentive drivers who are aware that they are in a closely coupled situation and are therefore focused. A driver merely progressing closer and closer to the lead vehicle (which may be the result of either the subject vehicle speed or the lead vehicle deceleration) and therefore constantly reducing following time may be asleep, distracted, etc. In order to prevent the heuristic-assumed reaction time from being a strict and instantaneous function of the actions of the lead vehicle, the subject vehicle following time input to the $A_{RT}$ function, may need to be an averaged value of the following time $t_F$ or discrimination must be made between coupled and non-coupled cases.

The situational awareness heuristic can be the collision warning equation combined with the $d_{CH}$ term.

| | |
|---|---|
| WD = | Warning Distance |
| v = | subject vehicle current speed (meters/second) |
| $v_f$ = | subject vehicle final speed (meters/second) |
| g = | 9.8 (meters/second$^2$) |
| a = | assigned deceleration (g's) |
| $A_{RT}$ = | Algorithm assumed driver reaction time (seconds) |
| $t_P$ = | platform specific processor delay |
| $t_B$ = | platform specific brake actuation delay |
| $t_W$ = | platform specific warning actuation delay |
| $t_{ch}$ = | headway time (seconds) |
| k = | g-level |
| r = | range (meters) |

The output WD (meters), can be compared with the measured range to determine the warning:

$$WD = \frac{(v-v_f)^2}{2g\alpha} + (A_{RT} + t_P + t_B + t_W)(v-v_f) + t_{ch}v_f \text{ (meters)}$$

The output k (g's), is compared to a predefined braking level to determine the warning:

$$k = \frac{(v-v_f)^2}{2g((A_{RT} + t_P + t_B + t_W)(v-v_f) - r) + t_{ch}v_f} \text{ (g's)}$$

Individual drivers have preferred stopping profiles, and a preferred heuristic takes this fact into account in an attempt to avoid nuisance alarms. Breaking preferences are user-based attributes, whether the breaking preference relates to historical information regarding a particular user or whether the breaking preference relates to normative data across an entire pool of potential users. Breaking preferences are related to habits about closing and deceleration rates. Slowly developing scenarios may be to brake at a low relatively constant rate over a long distance or to brake at higher rates for shorter distances. Drivers with less accurate judgment may find themselves braking rapidly initially while adjusting their braking rate as they better gage the stopping force required. Others with equally poor judgment may brake gradually and adjust their stopping force as the situation ahead worsens.

In more rapidly developing situations the same three performance patterns can be expected. The last situation with increasing deceleration rate is common in lead-vehicle 106 slowing situations. The driver recognizes that the vehicle ahead is slowing, but if the purpose of the slowing is not readily apparent, can't predict the depth of the stop. The driver begins to slow while constantly updating the status of the vehicle ahead. If the lead continues to slow at a constant or increasing rate, the following driver is required to stop harder and harder. This case may be the result more of circumstance than preference, but seldom are drivers observed to brake suddenly without provocation.

Conversely, heuristics could also assume a constant deceleration for the driver. Such an assumption might be useful for the purposes of the system 100, but that does not mean that typically users decelerate in a relatively constant manner.

Three generalized curves can be used to describe typical stopping behavior. The regression equation relates a dimensionless index, Q to initial speed, v expressed in miles per hour, thus:

$$Q = 0.3 + 0.04\left(\frac{v}{15}\right)^{2.5}$$

Figure 17:
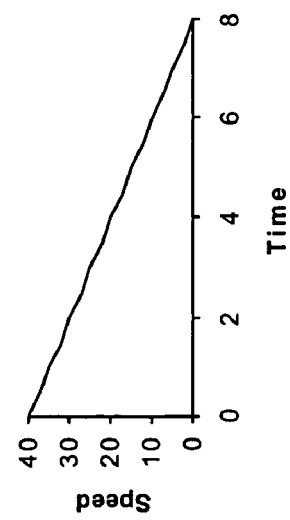
FIG. 17 is a graph of a deceleration profile that can be incorporated into the various heuristics of the invention.

Q is the ratio of calculated uniform accelerations $\alpha_{vx}/\alpha_{xt}$ with $\alpha$ calculated from $(\Delta v, \Delta x)$ or $(\Delta x, \Delta t)$ respectively. FIG. 17 is a graph of a uniform deceleration profile. While such a deceleration profile can be useful, it is not generally an accurate representation of how drivers behave.

Figure 18:
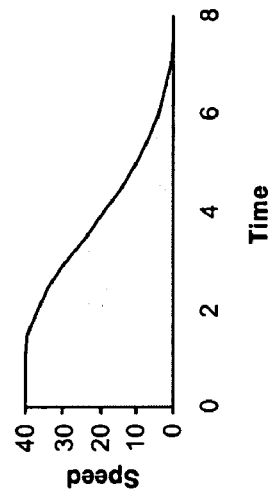
FIG. 18 is a graph of a low-speed deceleration profile that can be incorporated into the various heuristics of the invention.

FIG. 18 is a graph of a low-speed deceleration profile. As initial speed decreases, the curve shape of FIG. 18 dominates and Q<1. Drivers use lower initial braking rates followed by more severe braking, with the effect of requiring more distance to stop than would be predicted by a constant deceleration equation.

Figure 19:
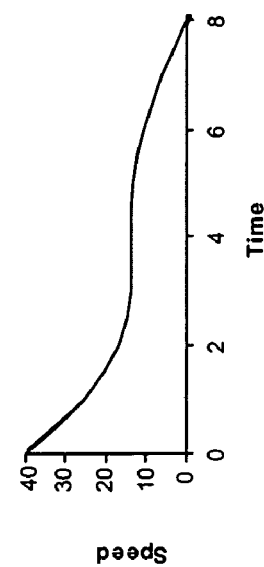
FIG. 19 is a high-speed deceleration profile that can be incorporated into the various heuristics of the invention.

In contrast, FIG. 19 is a graph of a high-speed deceleration profile. As initial speed increases, the curve shape of FIG. 19 dominates and Q>1. Drivers use harder initial braking followed by a relatively benign run-out. More speed is scrubbed off early and the effect is a shorter than predicted stopping distance.

In a preferred embodiment of the system 100, user-based attributes relating to breaking preferences are incorporated into the threat assessment subsystem 300 and the feedback subsystem 400. Such user-based attributes can either be specifically captured for each user, via user selection, the capturing of user history, etc., or by incorporating normative data relating to a large population of potential users. However, such normative data should be used to create predefined categories of drivers. The diversity of driving profiles is too diverse for a single value to be used for all drivers. In attempting to make a system that routinely predicts the actions of the extended system 100, the largest single hurdle is the fitting of the broad population based curves to the behavior of the driver behind the wheel.

To cover all drivers with a single value will inevitably lead to either too many nuisance alarms or too many missed alarms. The system 100 should be capable of adjusting the various assigned values in the driver warning heuristic to match the performance of the individual driver and vehicle will reduce the number of nuisance alarms and provide a more efficient and acceptable system 100.

Driver adaptation of the forward-looking, rear-end collision warning system does not necessarily remove the need to develop a single breaking profile. In some embodiment of the system 100, there will be a single default starting value which is adapted over time to fit the profile of the driver. This minimum must be based on reasonably aggressive driving tendencies to reduce the possibility of nuisance alarms. Additionally, the minimum should be compatible with other processing such as Adaptive Cruise Control module 416. An embodiment where the user can select from one of many predefined driving profiles provides a better starting value than a system 100 utilizing a single default value for all drivers.

As discussed above, it is preferable for the system 100 to utilize data from a wide variety of sources including vehicle-based attributes, user-based attributes, and environment-based attributes, as well as from sensor data collected by the sensor subsystem 200. There are a number of obvious information sources (beyond the primary forward-looking, rear-end collision warning sensor) that can be used to adapt the system to the driver, the vehicle and environmental conditions. Multiple sensors either newly installed as part of a forward-looking, rear-end collision warning system 100, or with functionality borrowed from existing auto applications should not represent a major impact in costs whether measured in processing capability, installation or integration difficulty or of course—cost.

Host vehicle 102 sources include: IR probes (active or passive), driver alertness indicators, driver diversion indicators, lidar, radar, visibility sensors, brake light switches, accelerometers, humidity sensors, wheel slip/traction indicators, clock, driver haptic controls, photo-optical sensors, vehicle load sensors, side looking and rear looking sensors, pedal activation, hydraulic system sensors, tilt indicators, CCD's, acoustic and ultrasonic sensors, windshield wipers, internal and external temperature sensors.

Extravehicular information sources include: coded and transmitted weather data, traffic density information, overtaking vehicle warning, leader-follower information exchange (i.e. lead vehicle tells following vehicle that react mode is active; or that lane is clear), cooperative speed and acceleration exchange, lane markers and side of road markers.

There are various parameters that define the habitual driving environment for each specific driver. The two such parameters are deceleration and following distance. Deceleration is the driver's habitual rate of change of speed (stopping or slowing expressed in g's or m/s$^2$). It is suggested that habitual deceleration is a function of absolute vehicle speed and is related to the driving environment and perception distance of the driver. Following distance is the distance, usually expressed in time, that drivers habitually follow other vehicles in coupled headway environments. There are other parameters that define the habitual driving environment such as vehicle type and condition, driver state: fatigued, alert, bored, preoccupied, impaired, etc., roadway environment: hills, curves, etc., atmospheric and roadway conditions, etc. These inputs affect the driving habits in various ways dependent on the mental state of the driver.

The more such attributes can be captured, the greater the benefit to the system 100 in adapting to the driver, and thereby the more accurate the system 100 becomes with respect to the driver. Recognizing that threat assessment heuristics must make some assumptions about driver performance and preferences and then implement these assumptions as constants, a preferred embodiment of the system 100 can incorporate both specific user-based attributes as well as user-based attributes relating to statistical data derived from large pools of potential users.

The resulting system may be truly adaptive and self-adjusting, compensating for load, weather or driver performance on the fly either via a neural net or learning capability; or may be merely seeded with information that provides driver specific information to tune the system 100 to the individual driver's profile.

A plastic "SMARTCARD" used in place of or in conjunction with a vehicle key would give the driver the ability to keep his profile in his pocket and transfer it from vehicle 102 to vehicle 102. It would relieve the on board system 100 of the burden of storing the data while affording the driver more consistent response from system to system and vehicle to vehicle. The card could be used as a key with a PIN. In that case the validation of a PIN for a guest would allow borrowers or renters to use the vehicle without altering the profiles. A universal card would allow the vehicle master cardholder to create a PIN for the borrower, thereby allowing guest drivers to use their own card and profile. In alternative embodiments, other forms of "identification technology" could be used, such as retina scans, finger prints, voice prints, face prints, or any other form of technology used to identify individuals could be used to different who the user is of a particular vehicle 102 at a particular time. Such technologies do not have the portability advantages of a smart card, but wireless communications could be used to transmit data to the appropriate vehicle 102, as desired by the user.

Getting the driver's foot off the gas is necessary for all primary avoidance maneuvers other than steering. It is suggested that a driver's conditioned response to any extraordinary driving circumstance is to release the accelerator. This may not include complete removal of pressure (input) to the vehicle's accelerator. Of the various visual, auditory and tactile/haptic warnings that have been discussed and debated a thump or upward pressure on the accelerator foot is suggested as a possible initial (cautionary) warning mechanism. Unlike beeps, buzzers and dashboard lights the pedal actively pushing back would be unique to a headway hazard. The ability for the driver to override can be maintained, and the warning can be accomplished in a very non-intrusive way thereby limiting the driver's interpreting the warning as a nuisance. This is critical for the cautionary warning that is expected, and designed, to occur frequently in comparison to the imminent warning (approximately 100 times more often).

Unfortunately, getting the driver's foot off the accelerator does not solve the entire problem because there exists a reasonable possibility that the driver is coasting with his/her foot off the accelerator when the warning is initiated and as a result, the driver never perceives the warning. This suggests that the next display modality for the imminent warning should be associated with brake initiation or pulse braking. Braking is unique to the longitudinal direction and can be perceived by anyone in the vehicle regardless of position. This braking could be a single transient to the braking system (brake initiation), or could be a scripted series of transients to the braking system (pulse braking). Braking is not without it's own problems.

If a nuisance alarm is described as an alarm occurring when the driver is warned at a distance that requires less stopping force than the driver habitually uses, then a correct alarm can be described as a warning that occurs when the driver must apply more stopping force than the driver habitually uses. For imminent collisions, a "brake to avoid" can be anticipated to occur approximately 15 times per year. One problem with the cautionary and imminent warnings is that they are not closely related, one gets the driver's foot off the gas pedal and the other thumps the brakes. Both are unique to the longitudinal direction of the vehicle 102, which is good, but the cautionary warning may not allow the driver to develop a proper mental model of the system 100 operation. As a result, the driver may be responsive to the cautionary warning, but on the chance that the cautionary warning is missed as described previously the driver may be startled by the braking initiation, not respond properly or not respond in a timely manner due to the infrequency of the imminent warning. Additionally, braking initiation that slows the vehicle 102 can cause collisions in close merging or lane changing scenarios. Scripted braking transients (a thump, thump, thump on the brakes) may be considered an embarrassment to the driver if other passengers sense the occurrence and are familiar with the cause.

The system 100 should assume that the driver is reasonably efficient. Real drivers posse options in addition to breaking. Evasive steering and accelerating out of danger are valid reactions to a threat and a real driver would be expected exercise them some portion of the time. Automatic braking is only justified when a collision is imminent and the time to impact is below the warning (driver reaction) time. It should be limited to low speed, close in situations such as stop and go traffic with the threat directly in front of the host vehicle 106.

There must be a concentrated effort to define, track and report a "coefficient of human interaction". With respect to such a coefficient, "good enough" is significantly better than not having it. Of course, as technologies expand and more driving data is captured, such factor estimates can become increasingly refined.

As previously discussed, the situational awareness display would typically be a visual alert type of status display that the driver could easily interpret in relation to the current scenario. Other display modalities exist including modification of the climate conditions for the driver based on roadway or traffic environments. In this case, the climate within the host vehicle can be cooled during more demanding driving tasks to increase driver attention. Other methods may include chemical release, such as menthol, into the air to increase driver attention, etc.

Threat assessment heuristics can be defined as a set of equations based on vehicle dynamics and various decision points used to transition between driving states, and various thresholds used to determine the actions of the feedback subsystem 400.

At a minimum, an autonomous forward-looking, rear-end collision warning system as envisioned would have limited sensor and processing capability. A minimum system 100 will have only host vehicle speed, relative speed and range between vehicles as inputs. A preferred embodiment of the system 100 will incorporate more data, including potentially user-based attributes, vehicle-based attributes, environment-based attributes, and data from a wide assortment of different sensors.

The various heuristics used by the system 100 should be targeted to specific threats. Thus different heuristics can focus on distinct sets of parameters. For example, a forward looking collision system 100 will preferably focus on only two vehicles, the subject vehicle 102 and the lead vehicle 106. In a preferred embodiment of the system 100, a forward looking collision avoidance system is not a stand alone device, but is just one element of an extended system focusing a comprehensive range of potential threats. Lost time, comprised of driver and system delays, is the largest contributor to nuisance alarms and system inefficiency. Incorporating additional information can be the key in reducing nuisance alarms and system inefficiency cause by lost time. Threat assessment heuristics can be divided into three functional groups, imminent collision avoidance, tailgating and situational awareness. Such heuristics should be built on kinematic equations with terms added to adjust for lost time, and should preferably incorporate user-based attributes, vehicle-based attributes, and environment-based attributes.

VI. Process Flows, Functions, and Data Items

The various subsystems and modules in the system 100 implement their respective functions by implementing one or more heuristics. Some of the process flows, functions, and data items are described below.

A. Sensor Processing Heuristics

Figure 20:
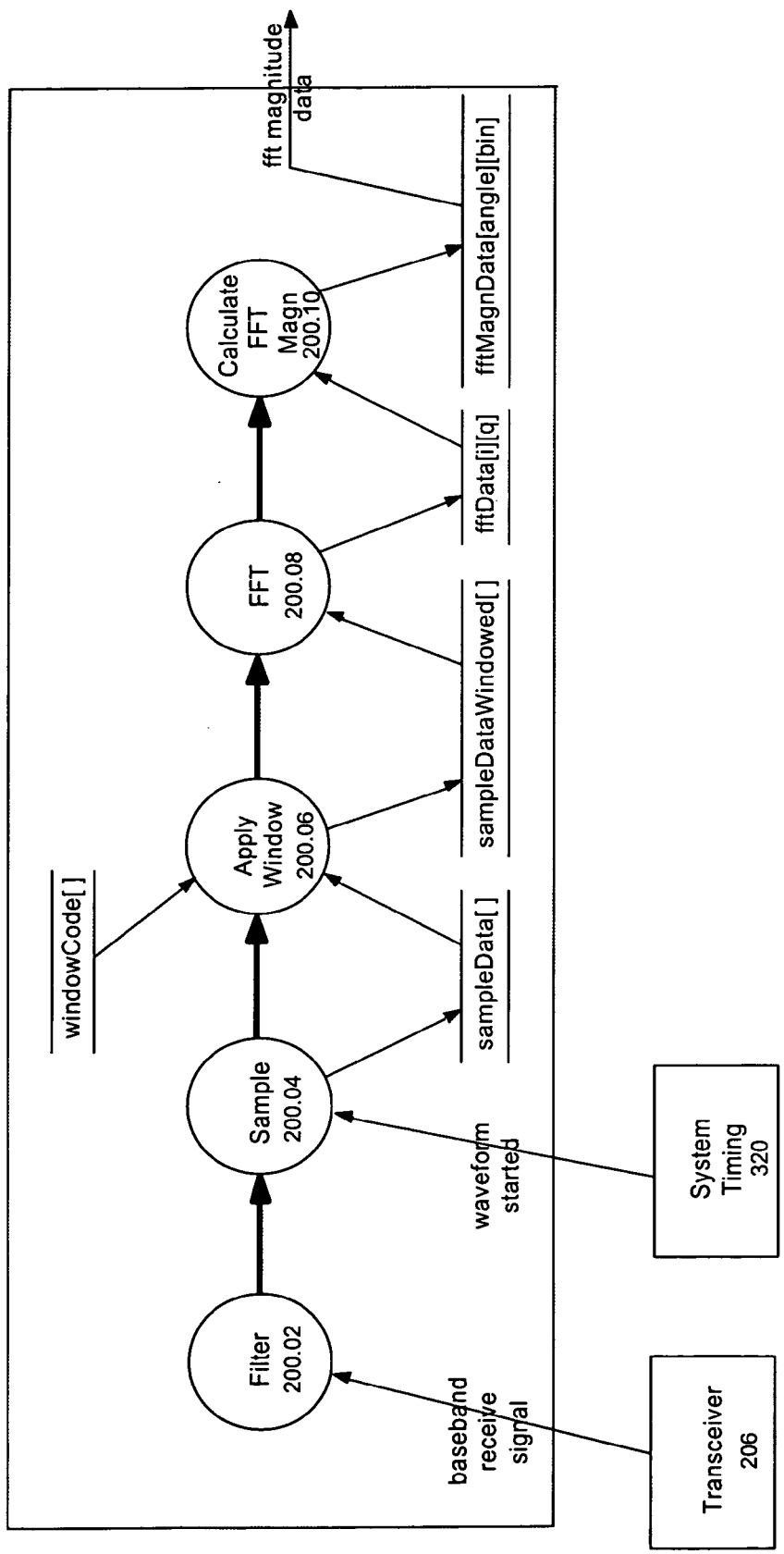
FIG. 20 is a data flow diagram of one example of a sensor heuristic that can be incorporated into the invention.

FIG. 20 is a process flow diagram of a sensor heuristic performed by the sensory subsystem 200. The particular embodiment that is illustrated relates to a system 100 with a baseband radar sensor. As discussed above, the transceiver 206 sends an unfiltered sensor data to the sensor subsystem 200. A filter 200.02 receives the data with a range law filter that also acts as the anti-aliasing filter. The filtered data is then sent to a sampler 200.04 which receives the filtered signal and converts the samples into a digital form and stores the samples where they can be used for testing or simulation purposes, as illustrated in FIG. 6. The system timing module 320 calibrates timing between the various objects and/or modules in the system 100. An apply window function 200.06 "windows" the sampled data from the sampler 200.04. Then a fast fourier transform (FFT) can be performed at 200.08 and the magnitude of the FFT can be calculated at 200.10. In a preferred automotive embodiment of the sensor subsystem 200, FFT magnitude data is what is sent to the threat assessment subsystem 300.

The functions and data items in FIG. 20 are illustrated in the pseudo-code examples below:

ApplyWindow( )

---

Windows the sampled data with a windowing function.
{
    Perform the following on each of the "baseband receive signal samples":
sampleDataWindowed[n] = Sample.sampleData[n] * windowCode[n];
}

---

CalculateFFTMagn( )

---

Calculates the FFT magnitude of the "fftData" array and stores it.
{
Perform the following for each i, q pair of fftData[i][q] and store in the appropriate element of fftMagnData[angle][bin]:
magnitude = $(i^2 + q^2)^{1/2}$;
/***** Note: magnitude = |(largest of i & q)| + ⅜ * |(smallest of i & q)| can be used as an approximation for better execution time. *****/
}

---

FFT( )

---

Performs a real FFT on the windowed data.
{
Perform a real FFT on the sampleDataWindowed array and store the results in fftData[i][q];
// Number of points defined by attribute "FFT Size"
}

---

Filter( )

---

Filters the incoming "baseband receive signal" from the
Transceiver object with a range law filter that also acts as
the anti-aliasing filter.
    {
Low pass filter input signal with the following filter characteristics:
    Pass band gain = 90 dB @ 325 KHz,
    // Range law filter.
        Increasing gain with frequency in the pass band = 40 dB/decade;
        3 dB cutoff frequency = 300 KHz;
    // Anti-aliasing filter.
        3 dB cutoff frequency = 350 KHz
        Cutoff frequency transition = 8-pole low pass (48 dB/octave);
    Output filtered signal;
}

---

Sample( )

---

Samples the "baseband receive signal filtered", converts the
samples to digital form and stores the samples in sampleData[ ];
    {
Perform the following when the modulation waveform starts for
the number of samples required by the FFT defined by the attribute
"FFT Size"
    {
        angleSampleTime[angle samples were taken at] = time
        samples started being taken;
        Sample "baseband receive signal filtered" at the rate specified
        by the attribute "A/D Sample Rate";
    Convert each sample to a digital word of the size specified by the
    attribute "Number of A/D Bits";
    Store each sample in sampleData[ ];
}
    }

--- angleSampleTime[angle]

Indicates the time that RADAR baseband receive signal samples were last taken at each angle.

fftData[i][q]

Results of the latest Fast Fourier Transform that has been taken of the baseband receive signal.

fftMagnData[angle][bin]

FFT magnitude data of the baseband receive signal for all range bins and angles.

sampleData[ ]

Latest samples of the "baseband receive signal filtered" signal.

sampleDataWindowed[ ]

Latest "baseband receive signal filtered samples" after a window function has been applied.

windowCode[ ]

Specifies the code for windowing input samples. It is of the form x=128*(1−cos(θ)/2).

B. Object Classification Heuristics

Figure 21:
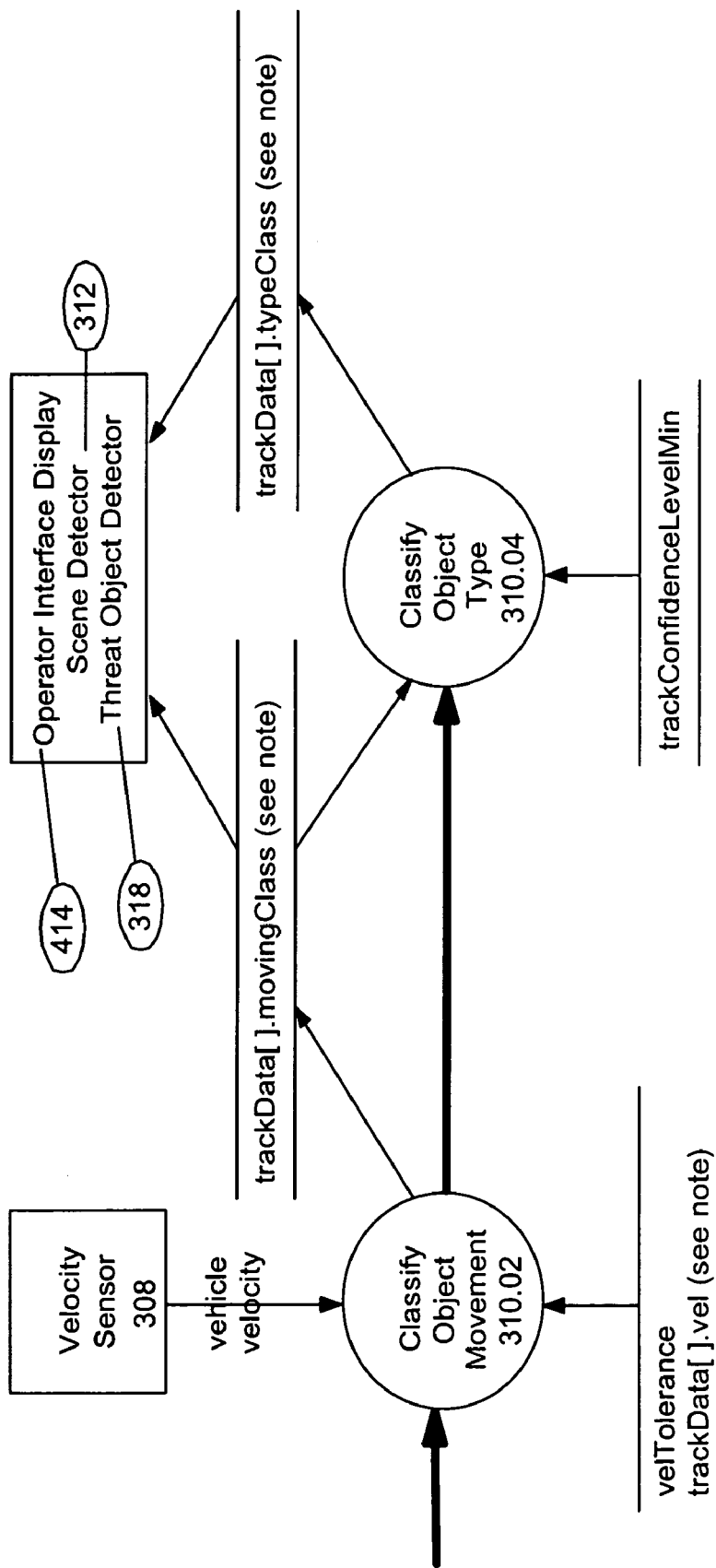
FIG. 21 is a data flow diagram of one example of an object classifier heuristic that can be incorporated into the invention.

FIG. 21 is an illustration of a data flow diagram relating to the object classification module 310. Object movement is classified at 310.02. Velocity information from the velocity sensor 306 can be incorporated into the classification of object movement at 310.02. In some embodiments of the system 100, The velocity sensor 308 is used to capture velocity information relating to external objects such as other vehicles, or other potential obstacles and/or hazards. Velocity sensors 308 typically measure the velocity of the source vehicle 102, but can also be used to determine the relative velocity of objects outside the source vehicle 102. In a preferred embodiment of the system 100, object movement are classified as either receding, following, overtaking, stationary, or approaching. In alternative embodiments of the system 100, different sets of movement categories can be used. The movement classification can then be sent to the operator interface display 414, the scene detector 312, the threat detector 318, and the object type classifier at 310.04. The object type classifier at 310.04 uses the movement classification from 310.02 to assist in the classification in the type of object. Object classification information can then be sent to the operator interface display 414, the scene detector 312, and the threat detector 318.

Some examples of the functions and data items that can support movement and object classification are described below:

ClassifyObjectMovement( )

---

Classifies the movement of tracked objects.
{
    Set trackData[ ].movingClass for all tracked objects after
    every update of ObjectTracker.trackData[ ].vel
    Table A: ObjectTracker.trackData[ ].movingClass Logic

| VelocitySensor.vehicleVelocity | ObjectTracker.trackData[ ].vel | ObjectTracker.trackData[ ].movingClass |
|---|---|---|
| X | >(velTolerance) | RECEDING |
| >=(velTolerance) | <(velTolerance) AND >(-velTolerance) | FOLLOWING |
| X | <(-velTolerance) AND >(-vehicleVelocity + velTolerance) | OVERTAKING |
| X | <(-vehicleVelocity + Tolerance) AND >(-vehicleVelocity - velTolerance) | STATIONARY |
| X | <=(-vehicleVelocity - Tolerance) | APPROACHING |

Note:
vehicleVelocity is from the VehicleInterface.VelocitySensor object and X = Don't Care.
}

---

ClassifyObjectType( )

---

Classifies the type of tracked object.
{
Perform the following for all tracked objects after each update of ObjectTracker.trackData[ ].movingClass:
{
    if (an object is ever detected with
        ObjectTracker.trackData[ ].movingClass != STATIONARY
        and ObjectTracker.trackData[ ].confidenceLevel >=
    trackConfidenceLevelMin)
    {
        ObjectTracker.trackData[ ].typeClass = VEHICLE;
}
/* Note: ObjectTracker.trackData[ ].typeClass is initialized to NON_VEHICLE when the object is formed. */
}

--- velTolerance

Specifies the velocity tolerance for determining the moving classification of an object. This number can be changed from the Operator Interface Control object.

Default value=3 meters/second (approx. 6.7 MPH).

trackConfidenceLevelMin

Specifies the minimum trackData[ ].confidenceLevel before the trackdata[ ].typeClass is determined. This number can be changed from the Operator Interface Control object.

Default value=20.

C. Object Detection and Scene Detection Heuristics

Figure 22:
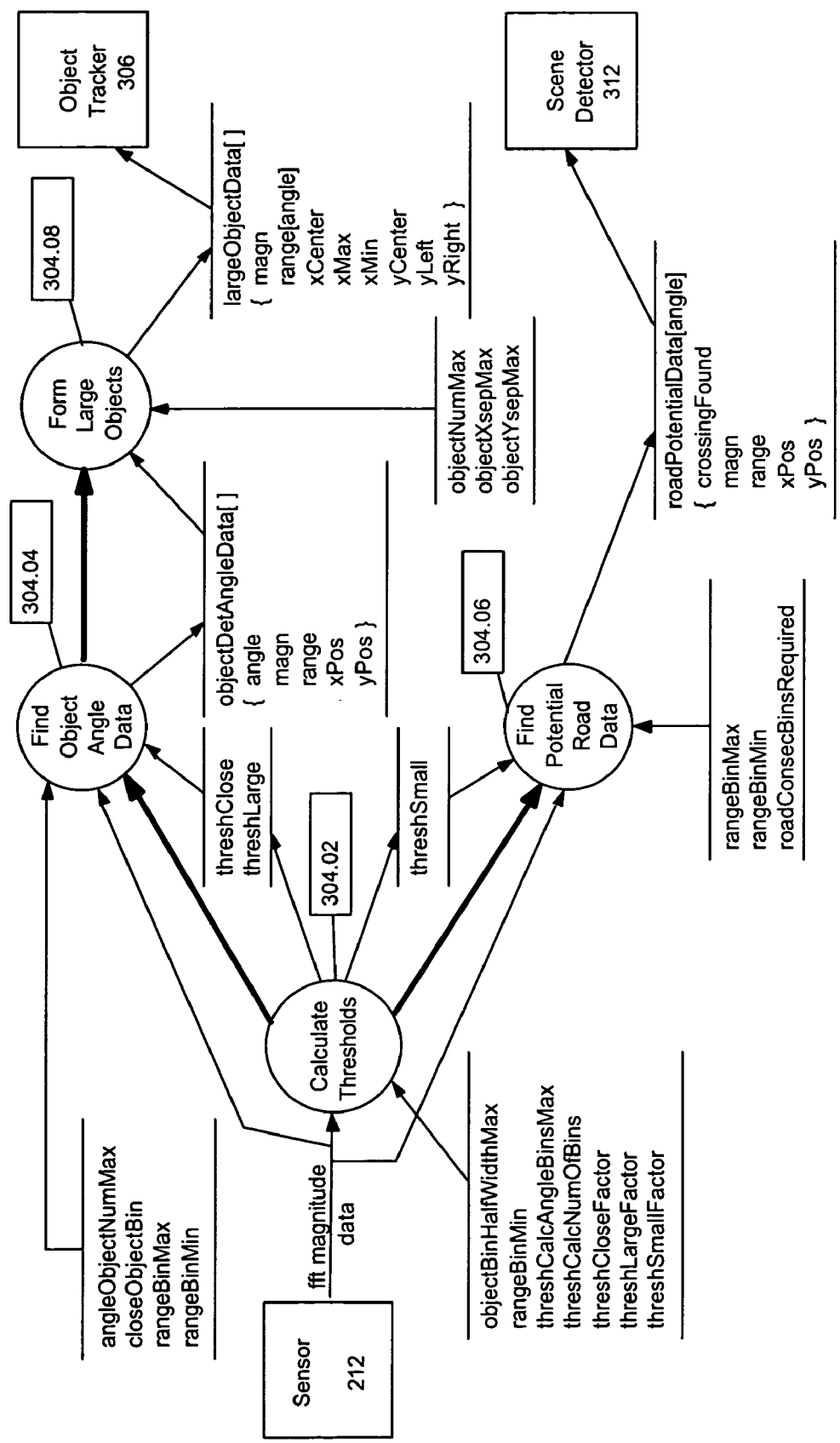
FIG. 22 is a data flow diagram of one example of an object detector and scene detector heuristic that can be incorporated into the invention.

FIG. 22 is a process flow diagram illustrating one example of how sensor data from the sensor subsystem 200 can be used by the object tracker module 306 and the scene detector module 312. As described above, the sensor 212 sends FFT magnitude data so that thresholds can be calculated at 304.02. The sensitivity of the system 100 with respect to identifying scene data and foreign objects is determined by predetermined thresholds. Such thresholds also determine whether changes in sensor measurements are cognizable by the system 100.

At 304.04, angle information relating to large objects is captured. Contiguous range bins that have FFT magnitudes that cross the large threshold are presumed to be part of a single object. At 304.08, large (inter-bin) objects are formed by the system 100, and sent to the object tracker module 306 for subsequent processing.

At 304.06, FFT bins that are potentially part of the road edge are identified and sent to the scene detector 312.

Some examples of the functions and data items that can be used in the process flow diagram are illustrated below:

CalculateThresholds( )

---

Calculates thresholds from the Baseband object's FFT magnitude data. These thresholds are used for detecting objects.
{
    Find the mean value (fftMagnMean) of the FFT magnitudes from
    multiple angles (Baseband.fftMagnData[angle][bin]) based
    on the following:
    {
        Include threshCalcNumOfBins bins in the calculation;
        Include a maximum of threshCalcAngleBinsMax bins from each angle;
        Do not include bins from an angle that are longer in range than the peak FFT amplitude of that angle – objectBinHalfWidthMax;
        Use range bins from each angle starting at rangeBinMin and going out in range until one of the above constraints occurs;
        Use angle bins in the following order: 9, 10, 8, 11, 7, 12, 6, 13, 5, 14, 4, 15, 3, 16, 2, 17, 1, 18, 0, 19 where angle bin 0 is the far left angle bin and angle bin 19 is the far right angle bin.
    }

---

Find the standard deviation (fftMagnStdDev) of the bins included in the determination of the mean (fftMagnMean) with the following calculation:

fftMagnStdDev=(Sum of the absolute values of (Baseband.*fftMagn*Data[angle] [bin]−*fftMag-n*Mean))/(Number of bins included in the sum);

Calculate the threshold for large objects to be tracked by performing the following:
{
   threshLarge = (threshLargeFactor * fftMagnStdDev) + fftMagnMean;
}
Calculate the threshold for detecting potential scene data by performing the following:
{
   threshSmall = (threshSmallFactor * fftMagnStdDev) + fftMagnMean;
}
Calculate the threshold for detecting close in targets by performing the following:
{
   threshClose = (threshCloseFactor * fftMagnStdDev) + fftMagnMean;
}
}

FindObjectAngleData( )

Finds large objects within each angle bin and calculates/stores parameters of these objects. Contiguous range bins that have FFT magnitudes that cross the largethreshold are considered part of a single object.
{
  Use a largeThreshold based on the following:
  {
    if (FFT bin <= closeObjectBin)
      largeThreshold = threshClose;
    else
      largeThreshold = theshLarge;
  }
  Form angle objects from FFT bins that have a Baseband.fftMagnData [angle][bin] > largeThreshold (found above) based on the following:
  {
    An angle object is confined to a single angle;
    Possible range bins are from rangeBinMin through rangeBinMax;
    Contiguous range bins that have FFT magnitudes that are above threshLarge are considered part of a single angle object;
    The maximum number of angle objects is angleObjectNumMax;
    Check angle bins in the following order: 9, 10, 8, 11, 7, 12, 6, 13, 5, 14, 4, 15, 3, 16, 2, 17, 1, 18, 0, 19 where angle bin 0 is the far left angle bin and angle bin 19 is the far right angle bin;
  }
  Calculate and store parameters for each angle object found based on the following:
  {
    objectDetAngleData.angle = angle of the angle object;
    objectDetAngleData.xPos = x coordinate position of the object's largest FFT magnitude bin;
    objectDetAngleData.yPos = y coordinate position of the object's largest FFT magnitude bin;
    objectDetAngleData.magn = largest FFT magnitude of bins forming the angle object;
    objectDetAngleData.range = Closest range bin in the angle object that has an FFT magnitude that crossed the large threshold;
  }
  objectDetAngleData.range[angle] = 0 for angles where none of the range bins crossed the threshold;
}

FindPotentialRoadData( )

Finds potential road edge data and calculates/stores parameters of this data.
{
  Find FFT bins that are potentially part of the road edge from each angle based on the following:
  {
    Check range bins in each angle starting at rangeBinMin and going out in range to rangeBinMax;
    Find first roadConsecBinsRequired consecutive range bins of an angle with Baseband.fftMagnData[angle][bin] > threshSmall;
  }
  Perform the following for the angles of FFT bins found above;
  {
    roadPotentialData[angle].crossingFound = TRUE;
    roadPotentialData[angle].magn = FFT magnitude of the closest range bin;
    roadPotentialData[angle].range = Closest range bin;
    Calculate (minimum resolution = ¼ meter) and store the following parameters in roadPotentialData[angle]:
    {
      xPos = X axis position of closest range bin;
      yPos = Y axis position of closest range bin;
    }
  }
  Perform the following for angles that do not have a threshold crossing:
  {
    roadPotentialData[angle].crossingFound = FALSE;
  }
}

FormLargeObjects( )

Forms large objects that span one or more angle bins from angle objects. Angle objects span one or more range bins within a single angle.
{
  Delete all previous large objects (largeObjectData[ ]);
  Initially make the first angle object the first large object by performing the following:
  {
    largeObjectData[0].xMax = objectDetAngleData[0].xPos;
    largeObjectData[0].xMin = objectDetAngleData[0].xPos;
    largeObjectData[0]yRight = objectDetAngleData[0].yPos;
    largeObjectData[0]yLeft = objectDetAngleData[0].yPos;
  }
  Form large objects from angle objects based on the following:
  {
    Form a maximum of objectNumMax large objects;
    Add an angle object (objectDetAngleData[n]) to a large object (largeObjectData[m]) when all of the following conditions are met;
    {
      objectDetAngleData[n].xPos <= largeObjectData[m].xMax + objectXsepMax;
      objectDetAngleData[n].xPos >= largeObjectData[m].xMin − objectXsepMax;
      objectDetAngleData[n].yPos <= largeObjectData[m].yRight + objectYsepMax;
      objectDetAngleData[n].yPos >= largeObjectData[m].yLeft − objectYsepMax;
    }
    Perform the following when an angle object is added to a large object:
    {
      if (objectDetAngleData[n].xPos > largeObjectData[m].xMax)
        largeObjectData[m].xMax = objectDetAngleData[n].xPos;
      if (objectDetAngleData[n].xPos < largeObjectData[m].xMin)
        largeObjectData[m].xMin = objectDetAngleData[n].xPos;
      if (objectDetAngleData[n].yPos > largeObjectData[m].yRight)
        largeObjectData[m].yRight = objectDetAngleData[n].yPos;
      if (objectDetAngleData[n]yPos < largeObjectData[m].yLeft)
        largeObjectData[m].yLeft = objectDetAngleData[n].yPos;
      largeObjectData[m].range[objectDetAngleData[n].angle]= objectDetAngleData[n].range;

```
                /* Note: largeObjectData[m].range[angle]= 0 for angles
                without large threshold crossings. */
        }
        When an angle object does not satisfy the conditions to be
        added to an existing large object then make it a large object
        by performing the following:
        {
                largeObjectData[m].xMax = objectDetAngleData[n].
                    xPos;
                largeObjectData[m].xMin = objectDetAngleData[n].
                    xPos;
                largeobjectData[m].yRight = objectDetAngleData[n].
                    yPos;
                largeObjectData[m].yLeft = objectDetAngleData[n].
                    yPos;
                largeObjectData[m].range[objectDetAngleData[n].angle]=
                    objectDetAngleData[n].range;
                /* Note: largeObjectData[m].range[angle] = 0 for
                angles without large threshold crossings. */
        }
    }
    Perform the following for all large objects that have been formed:
    {
            largeObjectData[m].xCenter = average of the
            objectDetAngleData[n].xPos it is composed of;
            largeObjectData[m].yCenter = average of the object-
            DetAngleData[n].yPos it is composed of;
            largeObjectData[m].magn = the largest objectDetAngleData[n].
            magn it is composed of;
    }
}
``` angleObjectNumMax

The maximum number of angle objects to be detected from one complete set of FFT samples (all angle bins). This number can be changed from the Operator Interface Control object.

Default value=100.

closeObjectBin

The closeThreshold is used as a threshold for FFT bins closer than closeObjectBin when detecting large objects. This number can be changed from the Operator Interface Control object.

Default value=40.

fftMagnMean

The mean value estimate of FFT magnitudes including multiple range bins and angle bins.

fftMagnStdDev

The standard deviation estimate of FFT magnitudes including multiple range bins and angle bins.

largeObjectData[ ]

```
Data for large objects that are found during the detection process. These
objects can cover multiple angle bins.
{
    magn: Maximum FTT magnitude of any range bin the object consists
        of.
    range[angle]: Specifies the closest range bin in a given angle that has
        an FFT magnitude that crossed the large threshold in that angle. Set
        equal to zero for angles when none of the range bins crossed the large
        threshold.
    xCenter: Center x position of the object.
    xMax: Maximum x position the object extends to.
    xMin: Minimum x position the object extends to.
    yCenter: Center y position of the object.
    yLeft: Left most y position the object extends to.
    yRight: Right most y position the object extends to.
}
``` objectBinHalfWidthMax

The number of FFT bins on each side of a peak FFT amplitude bin that are to be excluded from threshold calculations. This number can be changed from the Operator Interface Control object.

Default value=20.

objectDetAngleData[ ]

```
Data for large objects that are found during the detection process in each
angle. The objects are confined to one angle.
{
    angle: Angle of the angle object.
    magn: Largest FFT magnitude of bins forming the angle object.
    range: Closest range bin that has an FFT magnitude that crossed the
        large threshold.
    xPos: X position of the range bin with the highest FFT amplitude of
        the object in meters. Note: X position is measured parallel to the
        vehicle where x = 0 is at the vehicle, and x gets larger as
        the distance gets larger in front of the vehicle.
    yPos: Y position of the range bin with the highest FFT amplitude of
        the object in meters. Note: Y position is measured cross angle where
        y = 0 is at the vehicle, y < 0 is to the left of the
        vehicle, and y > 0 is to the right of the vehicle.
}
``` objectNumMax

Maximum number of large objects that will be detected in one azimuth scan. This number can be changed from the Operator Interface Control object.

Default value=100.

objectXsepMax

The maximum separation that is allowed between an angle object's X coordinate and a large object's X coordinate in order for the angle object to be added to the large object. This number can be changed from the Operator Interface Control object.

Default value=2.5 meters.

objectYsepMax

The maximum separation that is allowed between an angle object's Y coordinate and a large object's Y coordinate in order for the angle object to be added to the large object. This number can be changed from the Operator Interface Control object.

Default value=2.5 meters.

rangeBinMax

The maximum range bin to look for detections. This number can be changed from the Operator Interface Control object.

Default value=339.

rangeBinMin

The minimum range bin to look for detections. This number can be changed from the Operator Interface Control object.

Default value=3.

roadConsecBinsRequired

Specifies the number of consecutive low threshold crossings (in range) required to have a potential road edge. This number can be changed from the Operator Interface object.

Default value=2.
   roadPotentialData[angle]

---

Identifies potential road edge data for each angle.
{
   crossingFound: Indicates if a threshold crossing was found (TRUE or FALSE).
   magn: FFT magnitude of the range bin identified as the potential road edge.
   range: Range bin of the potential road edge.
   xPos: X position of the potential road edge.
   yPos: Y position of the potential road edge.
}

--- threshCalcAngleBinsMax

The maximum number of range bins from any one angle to be included in the threshold calculations. This number can be changed from the Operator Interface Control object.

Default value=16.
   threshCalcNumOfBins:

The total number of range bins to be included in the threshold calculations. This number can be changed from the Operator Interface Control object.

Default value=64. Note: Making this a power of two allows implementing the divide as a shift.
   threshClose The threshold value to be used for detection of large objects that are to be tracked for FFT bins closer than or equal to closeObjectBin.
   threshCloseFactor The value to multiply the standard deviation in determination of the detection thresholds for large objects that are closer or equal to FFT bin=closeObjectBin. This number can be changed from the Operator Interface Control object.

Default value=20.
   threshLarge

The threshold value to be used for detection of large objects that are to be tracked with FFT bins farther than closeObjectBin.
   threshLargeFactor The value to multiply the standard deviation in determination of the detection thresholds for large objects with FFT bins farther than closeObjectBin. This number can be changed from the Operator Interface Control object.

Default value=50.
   threshSmall

The threshold value to be used for detecting potential scene data.
   threshSmallFactor The value to multiply the standard deviation in determination of the detection thresholds for small objects. This number can be changed from the Operator Interface Control object. Default value=10.

D. Object Tracker Heuristics

Figure 23:
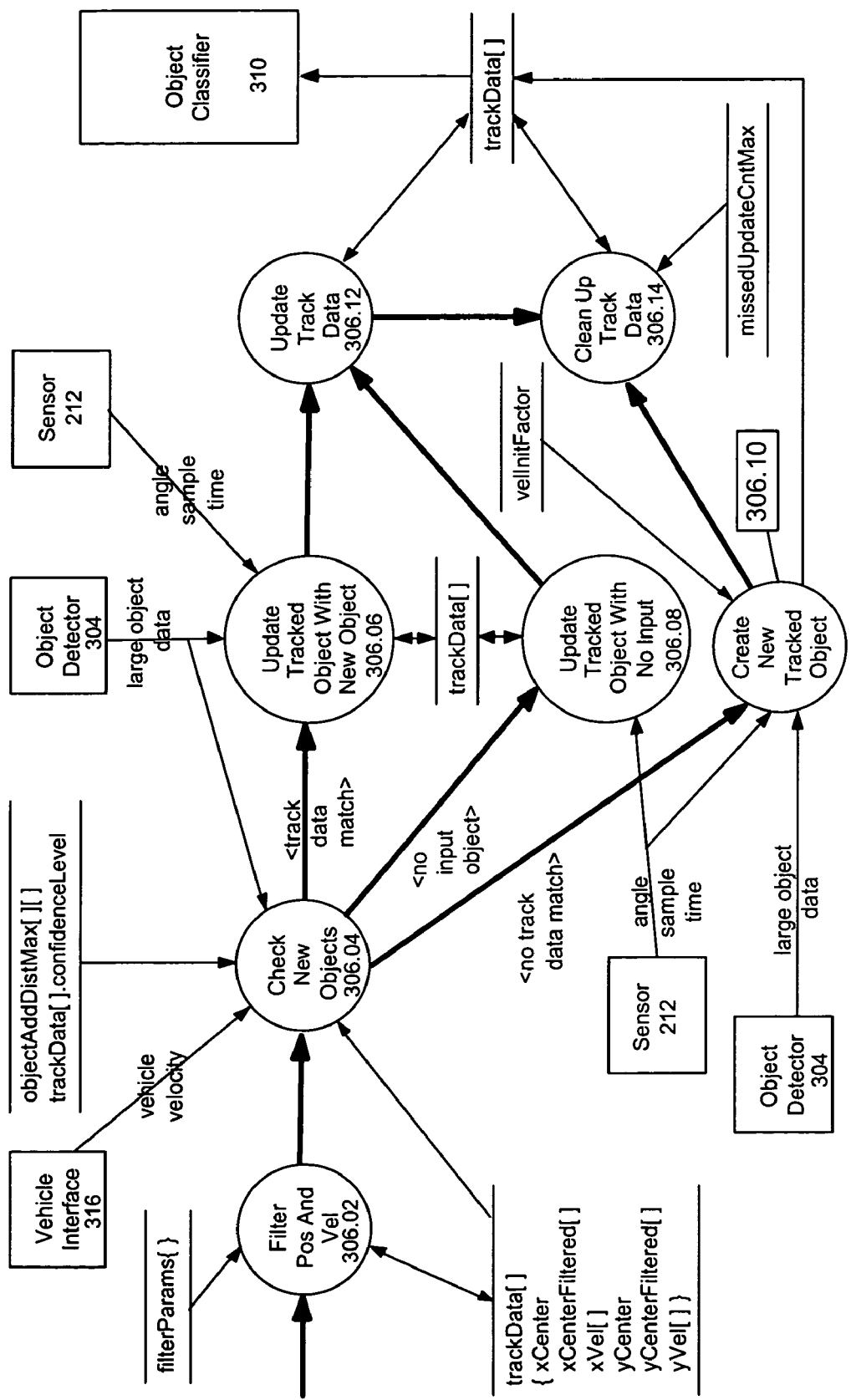
FIG. 23 is a data flow diagram of one example of an object tracking heuristic that can be incorporated into the invention.
Figure 24:
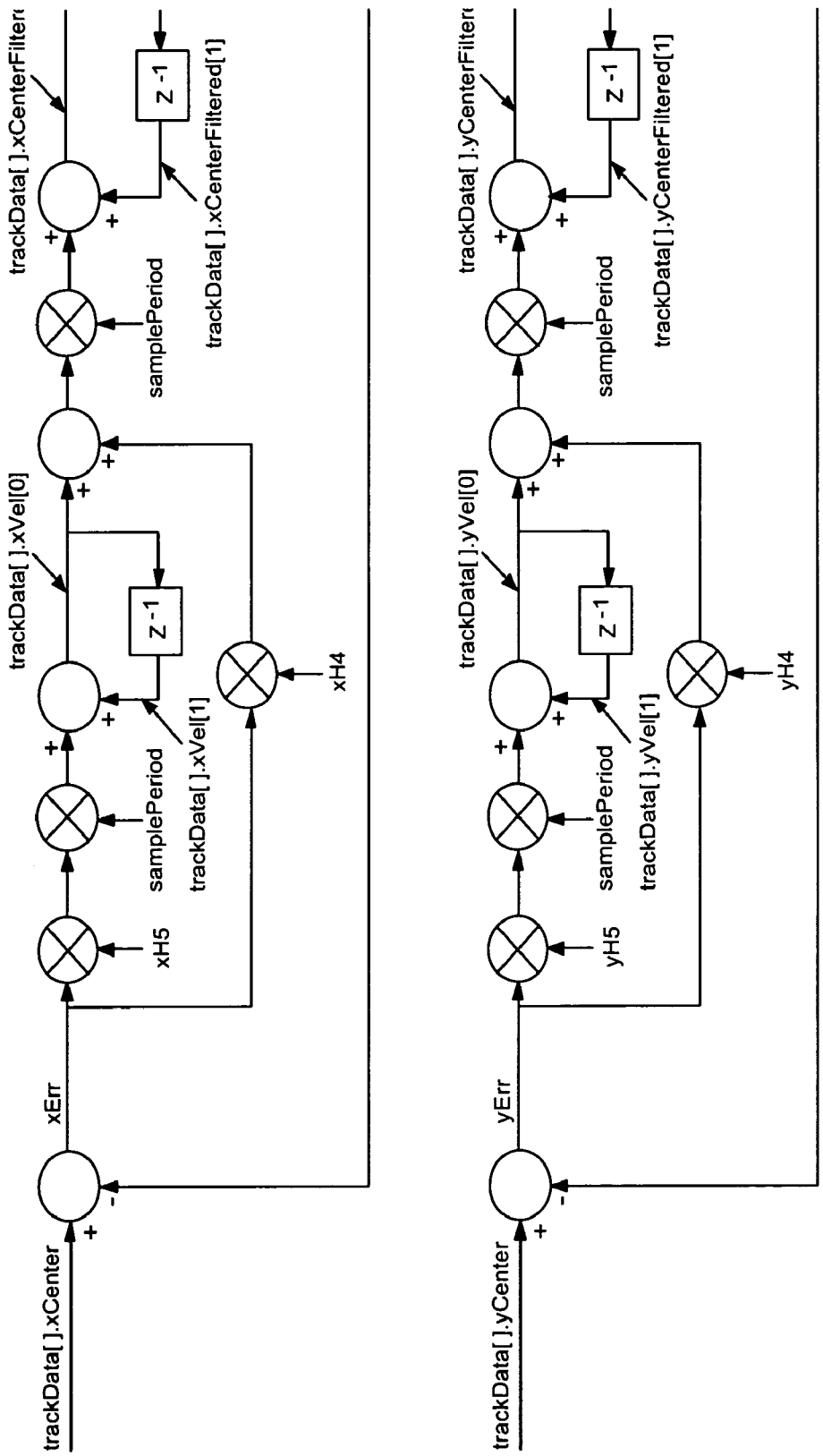
FIG. 24 is a data flow diagram of one example of a filtering heuristic that can be incorporated into the invention.

FIG. 23 is an data flow diagram illustrating on example of a object tracker heuristic. At 306.02, the position and velocity information is filtered for both the x and y axis. FIG. 24 illustrates one example of how this can be accomplished. Returning to FIG. 23, the filtered position and velocity information analyzed at 306.04 to determine if a new detected large object is part of a tracked object. If the system 100 is not currently tracking data matching the object, a new object is created and tracked at 306.10. If the system 100 is currently tracking matching data, the tracked objected is updated at 306.06. If there is no new data with which to update the object, the system 100 updates the object data using previously stored information. If the object previously existed, tracking information for the object is updated at 306.12. Both new and updated objects are cleaned with respect to tracking data at 306.14.

All output can be sent to an object classifier 310. As illustrated in the Figure, the object detector module 304 and the sensor module 212 can used to provide inputs to the process.

Some examples of functions and data items that can be used in the process flow are as follows:
   CheckNewObjects( )

---

Determines if a new, detected large object is part of a tracked object.
{
   Perform the following for all detected objects in ObjectDetector.largeObjectData[object#] and all tracked objects in trackData[object#].
   {
      Exit to <track data match> (see FIG. 23) for any largeObject-Data that satisfies the following:
      {
         ObjectDetector.largeObjectData[ ].xCenter
           AND ObjectDetector.largeObjectData[ ].yCenter
             are within objectAddDistMax[trackData[ ].confidenceLevel][vehicleVelocity]
                of trackData[ ].xCenterFiltered[0] AND trackData[ ].yCenterFiltered[0]
                AND closer than any other largeObject-Data that satisfies the matching criteria;
      }
      Exit to <no track data match> (see FIG. 23) for any detected objects that do not match the criteria for being an update to a tracked object;
   }
   Perform the following for any tracked objects that are not updated with a new detected object:
   {
      Exit to <no input object> (see FIG. 23);
   }
}

---

CleanUpTrackData( )

---

Cleans up track data.
{
   Perform the following for all tracked objects:
   {
      if (trackData[#].missedUpdateCnt > missedUpdateCntMax)
         Delete object from trackData[#];
      if (trackData[#].confidenceLevel = 0)
         Delete object from trackData[#];
   }
   Reorganize remaining objects in trackData[#] so that the trackData[#] size is minimized;
}

---

CreateNewTrackedObject( )

---

Creates a new tracked object from a new detected, large object.

-continued

```
{
    Perform the following for each new object to be created:
    {
        trackData[#].angleCenter = the center of the added object angles
        that have
                ObjectDetector.largeObjectData[#].range[angle] != 0;
        // Note: Bias the center towards the right when there is an even
        number of angles;
        trackData[#].confidenceLevel = 1;
        trackData[#].magn = ObjectDetector.largeObjectData[#].magn;
        trackData[#].missedUpdateCnt = 0;
        Perform the following for all angles:
        {
            trackData[#].range[angle] = ObjectDetector.
            largeObjectData[#].range[angle];
        }
        trackData[#].sampleTime[0] =
        Baseband.angleSampleTime[trackData[#].angleCenter];
        trackData[#].xCenter = ObjectDetector.largeObjectData[#].
        xCenter;
        trackData[#].xCenterFiltered[0] = ObjectDetector.
        largeObjectData[#].xCenter;
        trackData[#].xCenterFiltered[1] = ObjectDetector.
        largeObjectData[#].xCenter;
        trackData[#].xMax = ObjectDetector.largeObjectData-
        [#].xMax;
        trackData[#].xMin = ObjectDetector.largeObjectData-
        [#].xMin;
        trackData[#].xVel[0] = (velInitFactor/16) *
        VehicleInterface.vehicleVelocity;
        trackData[#].xVel[1] = (velInitFactor/16) *
        VehicleInterface.vehicleVelocity;
        trackData[#].yCenter = ObjectDetector.largeObjectData-
        [#].yCenter;
        trackData[#].yCenterFiltered[0] = ObjectDetector.
        largeObjectData[#].yCenter;
        trackData[#].yCenterFiltered[1] = ObjectDetector.
        largeObjectData[#].yCenter;
        trackData[#].yLeft = ObjectDetector.largeObjectData-
        [#].yLeft;
        trackData[#].yRight = ObjectDetector.largeObjectData-
        [#].yRight;
        trackData[#].yVel[0] = 0;
        trackData[#].yVel[1] = 0;
        trackData[ ].distStraight =
                (trackData[ ].xCenterFiltered[0]² + trackData[ ].
        yCenterFiltered[0]²)^{1/2};
        /* Note: distStraight = |(largest of xCenter & yCenter)| + 3/8 *
        |(smallest of xCenter & yCenter)| can be used as an
        approximation for better execution time.*/
        trackData[ ].vel = (trackData[ ].xVel[0] + trackData[ ].
        yVel[0]²)^{1/2};
        /***** Note: vel = |(largest of xVel & yVel)| + 3/8 * |(smallest
        of xVel & yVel)| can be used as an approximation for better
        execution time.*****/
        trackData[ ].movingClass = STATIONARY;
        trackData[ ].threatStatus = NO_THREAT;
        trackData[ ].typeClass = NON_VEHICLE;
    }
}
```

FilterPosAndVel( )

Filters the tracked object's X-axis position/velocity and Y-axis position/
velocity.
```
{
    Perform the following for each tracked object:
    {
        samplePeriod = trackData[ ].sampleTime[0] – trackData[ ].
        sampleTime[1];
        Perform the processing shown in FIG. 24 Filter Pos and Vel
        Functions for X and Y directions;
    }
}
```

UpdateTrackData( )

```
{
    Perform the following for all tracked objects:
    {
        trackData[ ].distStraight =
                (trackData[ ].xCenterFiltered[0]² + trackData[ ].
        yCenterFiltered[0]²)^{1/2};
        /* Note: distStraight = |(largest of xCenter & yCenter)| +
        3/8 * |(smallest of xCenter & yCenter)| can be used as an
        approximation for better execution time.*/
        trackData[ ].vel = (trackData[ ].xVel[0]2 + trackData[ ].
        yVel[0]²)^{1/2};
        /***** Note: vel = |(largest of xVel & yVel)| + 3/8 *
        |(smallest of xVel & yVel)| can be used as an
        approximation for better execution time.*****/
        if (trackData[ ].xVel < 0)
            trackData[ ].vel = –trackData[ ].vel;
        xChange = trackData[#].xCenterFiltered[0] – trackData[#].
        xCenterFiltered[1];
        trackData[#].xMax = trackData[#].xMax + xChange;
        trackData[#].xMin = trackData[#].xMin + xChange;
        yChange = trackData[#].yCenterFiltered[0] – trackData[#].
        yCenterFiltered[1];
        trackData[#].yLeft = trackData[#].yLeft + yChange;
        trackData[#].yRight = trackData[#].yRight + yChange;
    }
}
```

UpdateTrackedObjectWithNewObject( )

Updates tracked object data with new detected, large object data.
```
{
    Perform the following for a tracked object that has a new
    object added:
    {
        trackData[#].angleCenter = the center of the added
        object angles that have
                ObjectDetector.largeObjectData[#].range[angle] != 0;
        // Note: Bias the center towards the right when there is an
        even number of angles.increment trackData[#].
        confidenceLevel;
        trackData[#].magn = ObjectDetector.largeObjectData[#].
        magn;
        trackData[#].missedUpdateCnt = 0;
        Perform the following for all angles:
        {
            trackData[#].range[angle] = ObjectDetector.
            largeObjectData[#].range[angle];
        }
        trackData[#].sampleTime[1] = trackData[#].sampleTime[0];
        trackData[#].sampleTime[0] =
        Baseband.angleSampleTime[trackData[#].angleCenter];
        trackData[#].xCenter = ObjectDetector.largeObjectData[#].
        xCenter;
        trackData[#].yCenter = ObjectDetector.largeObjectData[#].
        yCenter;
    }
}
```

UpdateTrackedObjectWithNoInput( )

Updates tracked object data when there is no new detected, large
object data for it.
```
{
    Perform the following for each tracked object that does not
    have a new object added:
    {
        // Assume trackData[#].angleCenter did not change.
        decrement trackData[#].confidenceLevel;
        // Assume trackData[#].magn did not change.
        increment trackData[#].missedUpdateCnt;
```

-continued

```
// Assume trackData[#].range[angle] did not change.
trackData[#].sampleTime[1] = trackData[#].sampleTime[0];
trackData[#].sampleTime[0] =
Baseband.angleSampleTime[trackData[#].angleCenter];
// Assume constant velocity in the same direction as last update.
// e.g. Therefore same position that was predicted from last input
sample.
    trackData[#].xCenter = trackData[#].xCenterFiltered[0];
    trackData[#].yCenter = trackData[#].yCenterFiltered[0];
    }
}
``` filterParams

Filter parameters for the X-axis and Y-axis position and velocity tracking filters (See FIG. 24). These numbers can be changed from the Operator Interface Control object.
{
    xH4: Filter coefficient used for X-axis filtering.
        Default value = 5.35 / seconds ± 5%.
    xH5: Filter coefficient used for X-axis filtering.
        Default value = 14.3 / second$^2$ ± 5%.
    yH4: Filter coefficient used for Y-axis filtering.
        Default value = 2.8 / seconds ± 5%.
    yH5: Filter coefficient used for Y-axis filtering.
        Default value = 4.0 / second$^2$ ± 5%.
    xErrLimit: Limiting value for xErr in X-axis filtering.
        Default value = 5.0 meters.
    yErrLimit: Limiting value for yErr in Y-axis filtering.
        Default value = 5.0 meters.
} missedUpdateCntMax

Specifies the maximum number of updates a tracked object can have before it is deleted. This number can be changed from the Operator Interface Control object.

Default value=5.

objectAddDistMax[confidenceLevel][vehicleVelocity]

Specifies the maximum distance allowed between a newly detected large object and a tracked object before considering the newly detected large object an update to the tracked object. The distance is a function of trackData[#].confidenceLevel and vehicle 102 velocity as shown in Table B. The numbers in this table that are in Bold type can be changed from the Operator Interface Control object.

TABLE B objectAddDistMax[ ][ ]as a Function of confidenceLevel and vehicleVelocity

| TrackData. confidenceLevel | vehicle Velocity <=25 MPH | vehicle Velocity <25 & >50 MPH | vehicl Velocity >=50 MPH |
|---|---|---|---|
| 0 | Not Used | Not Used | Not Used |
| 1 | 5 meters | 5 meters | 7 meters |
| 2 | 4 meters | 4 meters | 7 meters |
| 3 | 3 meters | 3 meters | 7 meters |
| 4 | 2 meters | 2 meters | 7 meters |
| 5 | 2 meters | 2 meters | 7 meters |
| 11 | 2 meters | 2 meters | 2 meters |

Note:
vehicleVelocity is the vehicle speed and is a data item of the Vehicle Interface.Velocity Sensor.
Bold items in this table can be changed from the Operator Interface Control object.

objectAddDistMaxConfLevel

Specifies the last value of trackData.confidenceLevel to be use in determining objectAddDistMax[ ][ ] (See Table B) this Number can be Changed from the Operator Interface Control object.

Default value=11.

samplePeriod

The time between the last two sets of RADAR baseband receive samples for the current object being processed.

trackData[object #]

Provides the information that is maintained for each tracked object.
{
    angleCenter: Estimated center angle of the object.
    confidencebevel: Indicates the net number of sample times this object has been tracked.
    distStraight: Straight line distance from the host vehicle to the center of the tracked object.
    distVehPath: Vehicle path distance from the host vehicle to the center of the tracked object.
    headOnIndications: Indicates the number of consecutive times that a head on scenario has been detected for this object.
    magn: Maximum FFT magnitude of any range bin the object consists of.
    missedUpdateCount: Indicates the number of consecutive times that the object has not been updated with a new detected object.
    movingClass: Classifies an object based on it's movement.
        Possible values are:
            STATIONARY: Object is not moving relative to the ground.
            OVERTAKING: Object is being overtaken by the FCW vehicle.
            RECEDING: Object is moving away from the FCW vehicle,
            APPROACHING: Object is approaching FCW vehicle from the opposite direction.
            FOLLOWING: Object is moving at approximately the same velocity as the FCW vehicle.
    range/angle #1: Specifies the closest range bin in a given angle that has an FFT magnitude that crossed the large threshold in that angle. Set equal to zero for angles when none of the range bins crossed the large threshold.
    sampleTime[sample#]: Last two times that RADAR baseband receive samples were taken for this object.
        sample#= 0 is the time the latest samples were taken.
        sample#= 1 is the time the next to the latest samples were taken.
    threatStatus: Indicates the latest threat status of the tracked object.
    Possible values are:
        HIGHEST_THREAT: Tracked object is the highest threat for a warning.
        NO_THREAT: Tracked object is currently not a possible threat for a warning.
        POSSIBLE_THREAT: Tracked object is a possible threat for a warning.
    typeClass: Classifies an object based on whether it has been identified as a vehicle or not.
        Possible values: NON_VEHICLE, VEHICLE.
    vel: Magnitude of the relative velocity between the FCW vehicle and a tracked object. Note: A positive value indicates the tracked object is moving away from the FCW vehicle.
    xCenter: Center X axis position of the large, detected object that was last used to update the position of the tracked object.
    xCenterFiltered[#]: Last two filtered, estimated center X axis positions of the object.
        # = 0 is latest estimated position. This is the predicted position of the next sample based on the last input sample (xCenter).
        # = 1 is next to latest estimated position.
    xMax: The maximum X axis position of the object.
    xMin: The minimum X axis position of the object.
    xVel[#]: Last two filtered velocity estimates in the X axis direction of the object.
    Note: A positive value indicates the tracked object is moving away from the FCW vehicle.
        # = 0 is latest estimated velocity.
        # = 1 is next to latest estimated velocity.

-continued yCenter: Center Y axis position of the large, detected object that
was last used to update the position of the tracked object.
yCenterFiltered[#]: Last two filtered, estimated center Y axis
positions of the object.
    # = 0 is latest estimated position. This is the predicted
    position of the next sample based on the last input sample (yCenter).
    # = 1 is next to latest estimated position.
yLeft: The left most Y axis position of the object.
yRight: The right most Y axis position of the object.
yVel[#]: Last two filtered velocity estimates in the Y axis direction
of the object.
Note: A positive value indicates the tracked object is moving from
left to right.
    # = 0 is latest estimated velocity.
    # = 1 is next to latest estimated velocity.
} velInitFactor

Specifies the factor used in initializing the x velocity of a newly created object. The x velocity is initialized to (velInitFactor/16)*VehicleInterface.vehicleVelocity. This number can be changed from the Operator Interface Control object. Default value=16.

E. Vehicle Prediction and Scene Evaluation Heuristics

Figure 25:
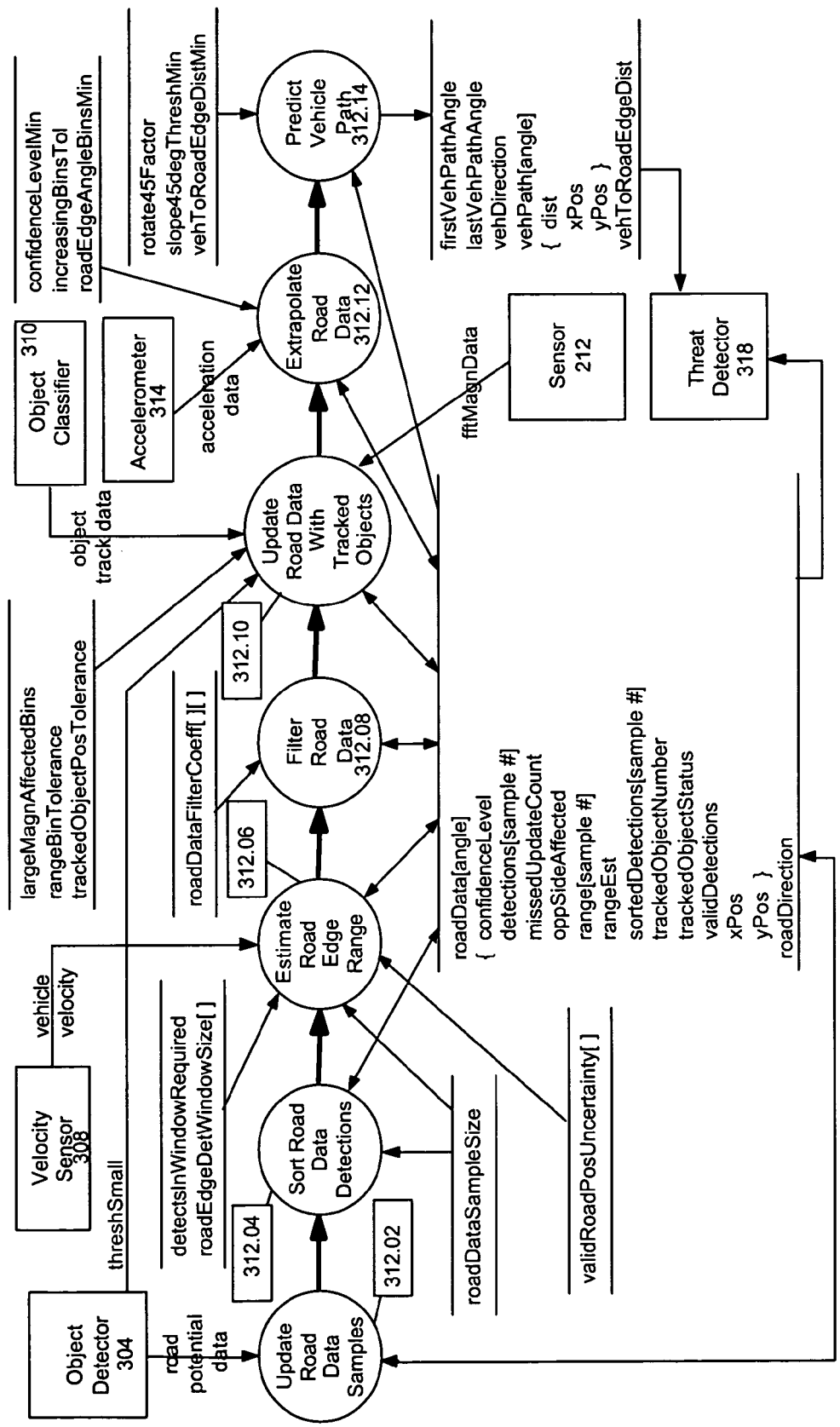

FIG. 25 is a data flow diagram illustrating on example of a vehicle prediction/scene evaluation heuristic. At 312.02, road data samples from the object detector 304 are updated. At 312.04, all road data detections are sorted in increasing range order. At 312.06, the range to the road edge in each angle bin is estimated based on the updated and sorted data from 312.02 and 312.04. All road data is then filtered at 312.08. At 312.10, road data is updated with tracked objects data. Road data is then extrapolated at 312.12, so that a vehicle path can be predicted at 312.14.

Some examples of functions and data items that can be used in the process flow are as follows:

EstimateRoadEdgeRange( )

Estimates the range to the road edge in each angle bin based on the last
roadDataSampleSize samples of road data.
{
Determine rangeWindowSize based on roadEdgeDetWindowSize[ ]
specified in Table E
Find the range to the road edge for each angle using
        roadData[angle].sortedDetections[sample#] based
on the following:
{
    Find the number of detections in an angle/range bin window that
    includes the number of range bins specified by rangeWindowSize (for
    each angle) and starts from the lowest range of roadData[angle].
    sortedDetections[sample#];
    Continue repeating the above process starting each time with the next
    highest range of roadData[angle].sortedDetections[sample#]
    until the sliding window covers the range bin specified by
    ObjectDetector.rangeBinMax;
    Find the angle/range bin window with the most detections and store
    the lowest range detection of that window as the
    latestDetectedRangeTemp;
    Determine the valid road position uncertainty of new road data
    based on the vehicle velocity as shown in Table C;
        Table C: Valid Position Uncertainty of New Road Data

| Vehicle Velocity | ValidRoadPosUncertainty |
|---|---|
| <10 meters/second (22.3 MPH) | 10 range bins |
| >=10 & <20 meters/second (44.7 MPH) | 20 range bins |
| >=20 | 40 range bins |

Note:
vehicle velocity comes from the VehicleInterface.
VelocitySensor.
Perform the following based on the number of detections found in the
angle/range bin window with the most detections:
{
    CASE: number of detections >= detectsInWindowRequired
    {
        Add latestDetectedRangeTemp as the latest sample in
        roadData[angle].range[sample#] while keeping the previous
        4 samples where angle corresponds to the angle/bin pair
        shown in Table E; if (latestDetectedRangeTemp is within
                roadData[angle].rangeEst ±
        validRoadPosUncertainty)
        {
            Increment roadData[angle].confidenceLevel;
            if (roadData[angle].confidenceLevel <
            confidenceLevelMin)
                roadData[angle].confidenceLevel =
                confidenceLevelMin;
            roadData[angle].missedUpdateCount = 0;
        }
        else // Fails validRoadPosUncertainty test.
        {
            roadData[angle].confidenceLevel =
            confidenceLevelMin;
        }
    }
    CASE: number of detections <detectsInWindowRequired
    and > 0
    {
        if (latestDetectedRangeTemp is within
                roadData[angle].rangeEst ±
    validRoadPosUncertainty)
    {
        Add latestDetectedRangeTemp as the latest sample in
        roadData[angle].range[sample#] while keeping
        the previous 4 samples where angle corresponds to the
        angle/bin pair shown in Table E;
        Increment roadData[angle].confidenceLevel;
        if (roadData[angle].confidenceLevel <
        confidenceLevelMin)
            roadData[angle].confidenceLevel =
            confidenceLevelMin;
        roadData[angle].missedUpdateCount = 0;
    }
    else // Fails validRoadPosUncertainty test and
    detectsInWindowRequired test.
    {
        Add the last sample of roadData[angle].
        range[sample#]as the latest sample in
        roadData[angle].range[sample#]while keeping
        the previous 4 samples where angle corresponds
        to the angle/bin pair shown in Table E;
        Decrement roadData[angle].confidenceLevel;
        Increment roadData[angle].missedUpdateCount;
    }
    }
    CASE: number of detections = 0
    {
        roadData[angle].confidenceLevel = 0;
        roadData[angle].validDetections = 0;
    }
}
}
}

ExtrapolateRoadData( )

Fills in missing road edge data points.
{
    Perform the following for angles 0 through 19 of roadData[angle]:
    {
        if (roadData[angle].trackedObjectStatus = NONE)
            roadData[19 – angle].oppSideAffected = FALSE;

-continued

```
            else
                roadData[19 − angle].oppSideAffected = TRUE;
    }
    Determine the following for angles of roadData[angle]that have a
    confidenceLevel >= confidenceLevelMin AND
    oppSideAffected = FALSE:
    {
        totalAngleBins = total angle bins that have roadData[angle].
            confidenceLevel >= confidenceLevelMin and roadData[angle].
            oppSideAffected = FALSE;
        leftToRightIncreasingBins = the number of times the
            roadData[ ].
            rangeEst increases when going from angle 0 to 19 (left to right);
        rightToLeftIncreasingBins = the number of times the
            roadData[ ].
            rangeEst increases when going from angle 19 to 0 (right to left);
    }
    if (totalAngleBins > roadEdgeAngleBinsMin)
    {
        Set roadDirection data item based on Table D;
```

Table D: Road Direction Logic

| Condition | roadDirection Result |
|---|---|
| AccelerometerDirection = LEFT_TO_RIGHT | LEFT_TO_RIGHT |
| AccelerometerDirection = RIGHT_TO_LEFT | RIGHT_TO_LEFT |
| AccelerometerDirection = STRAIGHT, LeftToRightIncreasingBins > (rightToLeftIncreasingBins + increasingBinsTol) | LEFT_TO_RIGHT |
| AccelerometerDirection = STRAIGHT, RightToLeftIncreasingBins > (leftToRightIncreasingBins + increasingBinsTol) | RIGHT_TO_LEFT |
| None of the above conditions is met | STRAIGHT |

Note:
Data item accelerometerDirection is from the "Accelerometer".

```
    }
    else
        Set roadDirection data item to NON_DETERMINED;
    Perform the following based on roadDirection:
    {
        CASE: roadDirection = LEFT_TO_RIGHT
        {
            Perform the following going from angle 0 to angle 19
            (left to right) for angles that have a roadData[angle].
            confidenceLevel >= confidenceLevelMin (e.g. valid
            rangeEst angles):
            {
                Modify roadData[angle].rangeEst of any angle
                that is decreasing in range so that rangeEst is
                equal to the preceding valid angle's rangeEst;
                Calculate and store roadData[angle].xPos and
                yPos for any angles that are modified;
            }
            Perform the following going from angle 0 to angle
            19 (left to right) for angles that do not have a
            roadData[angle].confidenceLevel >=
            confidenceLevelMin (e.g. invalid rangeEst angles):
            {
                Calculate and store roadData[angle].
                xPos and yPos so that a straight line is formed
                between valid rangeEst angles;
            }
        }
        CASE: roadDirection = RIGHT_TO_LEFT
        {
            Perform the following going from angle 19 to angle 0
            (right to left) for angles that have a roadData[angle].
            confidenceLevel >= confidenceLevelMin (e.g. valid
            rangeEst angles):
            {
                Modify roadData[angle].rangeEst of
                any angle that is decreasing in range so that
                rangeEst is equal to the preceding valid angle's
                rangeEst;
                Calculate and store roadData[angle].xPos
                and yPos for any angles that are modified;
            }
            Perform the following going from angle 19 to
            angle 0 (right to left) for angles that do not have
            a roadData[angle].confidenceLevel >=
            confidenceLevelMin (e.g. invalid rangeEst angles):
            {
                Calculate and store roadData[angle].xPos and yPos
                so that a straight line is formed between valid rangeEst
                angles;
            }
        }
        CASE: roadDirection = STRAIGHT
        {
            Perform the following going from angle 0 to angle 9 for
            angles that have a roadData[angle].confidence-
            Level >= confidenceLevelMin (e.g. valid rangeEst
            angles):
            {
                Set roadData[angle].confidenceLevel = 0 for
                any angle that is decreasing in range;
            }
            Perform the following going from angle 0 to angle 9
            for angles that do not have a roadData[angle].
            confidenceLevel >= confidenceLevelMin (e.g.
            invalid rangeEst angles):
            {
                Calculate and store roadData[angle].xPos and
                yPos so that a straight line is formed between valid
                rangeEst angles (confidenceLevel >= confidenceLevelMin);
            }
            Perform the following going from angle 19 to angle 10
            for angles that have a roadData[angle].
            confidenceLevel >= confidenceLevelMin (e.g.
            valid rangeEst angles):
            {
                Set roadData[angle].confidenceLevel = 0 for any
                angle that is decreasing in range;
            }
            Perform the following going from angle 19 to angle 10 for
            angles that do not have a roadData[angle].confidence-
            Level >= confidenceLevelMin (e.g. invalid rangeEst
            angles):
            {
                Calculate and store roadData[angle].xPos and yPos so
                that a straight line is formed between valid rangeEst
                angles (confidenceLevel >= confidenceLevelMin);
            }
        }
    }
}
```

FilterRoadData( )

Filters the road data.
```
{
    Perform the following for angles that have roadData[angle].
    missedUpdateCount = 0 based on roadData[angle].validDetections:
    {
        validDetections = 1:
        {
            roadData[angle].rangeEst = roadData[angle].range[n];
            // n = latest sample.
            // Note: Differences in resolution must be taken into
            account.
        }
        validDetections = 2:
        {
            yn = xn * h[2][0] + xn−1 * h[2][1]; *
            where:
                yn = roadData[angle].rangeEst,
                xn = roadData[angle].range[n], // n = latest sample,
                n − 1 = next to latest sample . . .
                h[i][j] = roadDataFilterCoeff[i][j] // i =
                confidenceLevel; j = 0 or 1.
            // Note: Differences in resolution must be taken into
```

-continued

```
        account.
        /
    }
    validDetections = 3:
    {
        yₙ = xₙ * h[3][0] + xₙ₋₁ * h[3][1] + xₙ₋₂ * h[3][2];
        where:
            yₙ = roadData[angle].rangeEst,
            xₙ = roadData[angle].range[n], // n =
            latest sample,
            n − 1 = next to latest sample . . .
            h[i][j] = roadDataFilterCoeff[i][j] // i =
            confidenceLevel; j = 0, 1, or 2.
            // Note:
    }
    validDetections = 4:
    {
        yₙ = xₙ * h[4][0] + xₙ₋₁ * h[4][1] + xₙ₋₂ *
        h[4][2] + x₋₃ * h[4][3];
        where:
            yₙ = roadData[angle].rangeEst,
            xₙ = roadData[angle].range[n], // n = latest
            sample, n − 1 = next to latest sample . . .
            h[i][j] = roadDataFilterCoeff[i][j] // i =
            confidenceLevel; j = 0, 1, 2, or 3.
            // Note: Differences in resolution must be taken
            into account.
    }
    validDetections >= 5:
    {
        yₙ = xₙ * h[5][0] + xₙ₋₁ * h[5][1] + xₙ₋₂ * h[5]<+ xₙ₋₃ *
        h[5][3] + xₙ₋₄ * h[5][4];
        where:
            yₙ = roadData[angle].rangeEst,
            xₙ = roadData[angle].range[n], // n = latest sample,
            n − 1 = next to latest sample . . .
            h[i][j] = roadDataFilterCoeff[i][j] // i =
            confidenceLevel limited to 5; j = 0, 1, 2, 3, or 4.
            // Note: Differences in resolution must be taken into
            account.
    }
    }
    Perform the following for the angles of roadData[angle]:
    /* Note: The following does not have to be performed for angles
    with roadData[angle].confidenceLevel = 0. */
    {
        roadData[angle].xPos = Equivalent X axis position of
        roadData[angle].rangeEst;
        roadData[angle].yPos = Equivalent Y axis position of
        roadData[angle].rangeEst;
    }
}
```

PredictVehiclePath ( )

Predicts the most likely path of the FCW vehicle.
```
{
    firstVehPathAngleLeftToRight = first angle with roadData[angle].
    confidenceLevel >= confidenceLevelMin when going from angle 0 to
    angle 19 (left to right);
    firstVehPathAngleRightToLeft = first angle with roadData[angle].
    confidenceLevel >= confidenceLevelMin when going from angle 19
    to angle 0 (right to left);
    Perform the following based on roadDirection:
    {
        roadDirection = LEFT_TO_RIGHT:
        {
            firstVehPathAngle = firstVehPathAngleLeftToRight;
            lastVehPathAngle = firstVehPathAngleRightToLeft;
            vehToRoadEdgeDist
                = maximum of (−roadData[firstVehPathAngle].yPos)
                and vehToRoadEdgeDistMin;
    Find vehPath[angle] for the first vehicle path angle (firstVehPathAngle):
    {
        vehPath[angle].yPos = roadData[angle].yPos + vehToRoadEdgeDist;
```

-continued

```
        vehPath [angle].xPos = roadData[angle].xPos;
    }
    Perform the following for each angle going from the
    firstVehPathAngle + 1 to lastVehPathAngle:
    {
        deltaX = roadData[angle].xPos − roadData[angle − 1].xPos;
        deltaY = roadData[angle].yPos − roadData[angle − 1].yPos;
        if (deltaY <= deltaX)
        {
            slope = deltaY / deltaX;
            if (slope < slope45degThreshMin)
            {
                vehPath[angle].yPos = roadData[angle].yPos +
                vehToRoadEdgeDist;
                vehPath[angle].xPos = roadData[angle].xPos;
            }
            else // slope >= slope45degThreshMin.
            {
                vehPath [angle].yPos = roadData[angle].yPos +
                    rotate45Factor *
                vehToRoadEdgeDist;
                vehPath[angle].xPos = roadData[angle].xPos −
                    rotate45Factor * vehToRoadEdgeDist;
            }
        }
        else // deltaY > deltaX.
        {
            slope = deltaX / deltaY;
            if (slope < slope45degThreshMin)
            {
                vehPath[angle].yPos = roadData[angle].yPos;
                vehPath[angle].xPos = roadData[angle].xPos −
                vehToRoadEdgeDist;
            }
            else // slope >= slope45degThreshMin.
            {
                vehPath [angle].yPos = roadData[angle].yPos +
                    rotate45Factor *
                vehToRoadEdgeDist;
                vehPath [angle].xPos = roadData[angle].xPos −
                    rotate45Factor *
                vehToRoadEdgeDist;
            }
        }
    }
    vehPath[firstVehPathAngle].dist =
                (vehPath[firstVehPathAngle].xPos² +
    vehPath[first VehPathAngle].yPos²)^(1/2);
    /* Note: dist = |(largest of xPos & yPos)| + ⅜ * |(smallest of xPos &
    yPos)| can be used as an approximation for better execution time. */
    Find vehPath[angle].dist for each successive angle starting with
    firstVehPathAngle + 1 and ending with lastVehPathAngle based on the
    following:
    {
        xDelta = vehPath [angle].xPos − vehPath[angle − 1].xPos;
        yDelta = vehPath [angle].yPos − vehPath[angle − 1].yPos;
        vehPath[angle].dist = vehPath[angle − 1].dist + (xDelta² +
        yDelta²)^(1/2);
        /* Note: dist = |(largest of xDelta & yDelta)| + ⅜ * |(smallest of
        xDelta & yDelta)| can be used as an approximation for better
        execution time. */
    }
    vehDirection = LEFT_TO_RIGHT;
}
roadDirection = RIGHT TO LEFT:
{
    firstVehPathAngle = firstVehPathAngleRightToLeft;
    lastVehPathAngle = firstVehPathAngleLeftToRight;
    vehToRoadEdgeDist =
                maximum of roadData[firstVehPathAngle].yPos and
    vehToRoadEdgeDistMin;
    Find vehPath[angle] for the first vehicle path angle (firstVehPathAngle):
    {
        vehPath[angle].yPos = roadData[angle].yPos −
        vehToRoadEdgeDist;
        vehPath[angle].xPos = roadData[angle].xPos;
    }
    Perform the following for each angle going from the
    firstVehPathAngle + 1 to lastVehPathAngle:
```

-continued

```
{
    deltaX = roadData[angle].xPos - roadData[angle - 1].xPos;
    deltaY = ABS(roadData[angle].yPos - roadData[angle -
        1].yPos);
    // ABS means take absolute value of.
    if (deltaY <= deltaX)
    {
        slope = deltaY / deltaX;
        if (slope < slope45degThreshMin)
        {
            vehPath[angle].yPos = roadData[angle].yPos -
                vehToRoadEdgeDist;
            vehPath[angle].xPos = roadData[angle].xPos;
        }
        else // slope >= slope45degThreshMin.
        {
            vehPath [angle].yPos = roadData[angle].yPos -
                rotate45Factor * vehToRoadEdgeDist;
            vehPath [angle].xPos = roadData[angle].xPos -
                rotate45Factor * vehToRoadEdgeDist;
        }
    }
    else // deltaY > deltaX.
    {
        slope = deltaX / deltaY;
        if (slope < slope45degThreshMin)
        {
            vehPath [angle].yPos = roadData[angle].yPos;
            vehPath[angle].xPos = roadData[angle].xPos -
                vehToRoadEdgeDist;
        }
        else // slope >= slope45degThreshMin.
        {
            vehPath [angle].yPos = roadData[angle].yPos -
                rotate45Factor * vehToRoadEdgeDist;
            vehPath [angle].xPos = roadData[angle].xPos -
                rotate45Factor * vehToRoadEdgeDist;
        }
    }
}
vehPath[firstVehPathAngle].dist =
    (vehPath[firstVehPathAngle].xPos² +
vehPath[firstVehPathAngle].yPos²)^(1/2);
/* Note: dist = (largest of xPos & yPos) + ⅜ * |(smallest of xPos &
yPos)| can be used as an approximation for better execution time. */
    Find vehPath[angle].dist for each successive angle starting with
    firstVehPathAngle + 1 and ending with lastVehPathAngle based
    on the following:
    {
        xDelta = vehPath[angle].xPos - vehPath[angle + 1].xPos;
        yDelta = vehPath [angle].yPos - vehPath[angle + 1].yPos;
        vehPath[angle].dist = vehPath[angle + 1].dist + (xDelta² +
            yDelta²)^(1/2);
        /* Note: dist = |(largest of xDelta & yDelta)| + ⅜ * |(smallest
        of xDelta & yDelta)| can be used as an approximation for better
        execution time. */
    }
    vehDirection = RIGHT_TO_LEFT;
}
roadDirection = STRAIGHT:
{
    // Note: lastVehPathAngle is not needed for a straight road.
    if ((-roadData[firstVehPathAngleLeftToRight].yPos) <
            roadData[firstVehPathAngleRightToLeft].yPos)
    {
        firstVehPathAngle = firstVehPathAngleLeftToRight;
        vehToRoadEdgeDist = maximum of (-roadData[first-
            VehPathAngle].yPos)
                and vehToRoadEdgeDistMin;
        vehDirection = STRAIGHT_ON_LEFT_EDGE;
    }
    else
    {
        firstVehPathAngle = firstVehPathAngleRightToLeft;
        vehToRoadEdgeDist = maximum of roadData[firstVehPath-
            Angle].yPos
                and vehToRoadEdgeDistMin;
        vehDirection = STRAIGHT_ON_RIGHT_EDGE;
    }
```

-continued

```
    if (vehDirection = STRAIGHT_ON_LEFT_EDGE)
    {
        Perform the following for each angle going from the
        firstVehPathAngle to angle 9:
        {
            vehPath[angle].yPos = roadData[angle].yPos +
                vehToRoadEdgeDist;
            vehPath[angle].xPos = roadData[angle].xPos;
            vehPath[angle].dist = (vehPath[angle].xPos² +
                vehPath[angle].yPos²)^(1/2);
            /* Note: dist = |(largest of xPos & yPos)| + ⅜ *
            |(smallest of xPos & yPos)| can be used as an
            approximation for better execution time. */
        }
    }
    else // vehDirection = STRAIGHT_ON_RIGHT_EDGE.
    {
        Perform the following for each angle going from the
        firstVehPathAngle to angle 10:
        {
            vehPath[angle].yPos = roadData[angle].yPos -
                vehToRoadEdgeDist;
            vehPath[angle].xPos = roadData[angle].xPos;
            vehPath[angle].dist = (vehPath[angle].xPos² +
                vehPath[angle].yPos²)^(1/2);
            /* Note: dist = |(largest of xPos & yPos)| + ⅜ *
            |(smallest of xPos & yPos)| can be used as an
            approximation for better execution time. */
        }
    }
}
roadDirection = NON_DETERMINED:
{
    vehDirection = NON_DETERMINED;
}
}
```

SortRoadDataDetections( )

Sorts roadData[angle].detections[sample#] in increasing range order.
```
{
    Perform the following for each angle:
    {
        Combine the roadData[angle].detections[sample#] from the
        following angle pairs: 0–1, 1–2, 2–3, 3–4, 4–5, 5–6, 6–7,
        7–8, 8–9, 9–10, 10–11, 11–12, 12–13, 13–14, 14–15, 15–16,
        16–17, 17–18, 18–19 and associate these combined detections
        with angles as shown in Table E;
        Store the first roadDataSampleSize samples of the combined
        detections found above in roadData[angle].sortedDetections-
        [sample#];
        Increment roadData[angle].validDetections for angles that
        have at least one detection;
        Sort the first roadDataSampleSize samples of
        roadData[angle].sortedDetections[sample#] in increasing
        range order;
    }
}
```

Table E: Angle Bin correspondence with Angle Pair

| Angle | Angle Pair |
|---|---|
| 0 | 0–1 |
| 1 | 0–1 |
| 2 | 1–2 |
| 3 | 2–3 |
| 4 | 3–4 |
| 5 | 4–5 |
| 6 | 5–6 |
| 7 | 6–7 |
| 8 | 7–8 |
| 9 | 8–9 |
| 10 | 9–10 |
| 11 | 10–11 |
| 12 | 11–12 |

| | |
|---|---|
| 13 | 12–13 |
| 14 | 13–14 |
| 15 | 14–15 |
| 16 | 15–16 |
| 17 | 16–17 |
| 18 | 17–18 |
| 19 | 18–19 |

Note:
The above table provides more resolution on the right edge because typically there are more road edge points on the right side of the road.
}

UpdateRoadDataSamples( )

Updates the roadData data item based on new data (roadPotentialData) from the Object Detector.
{
    Perform the following for each angle of the
    ObjectDetector.roadPotentialData[angle]data item based on
    crossingFound:
    {
        crossingFound = TRUE:
        {
            Add ObjectDetector.roadPotentialData[angle].range as the
            latest sample in roadData[angle].detections[sample#]
            while keeping the previous 19 samples;
        }
        crossingFound = FALSE:
        {
            Add ObjectDetector.rangeBinMax as the latest sample in
            roadData[angle].detections[sample#] while keeping
            the previous 19 samples;
        }
    }
}

UpdateRoadDataWithTrackedObjects( )

Updates roadData data item based on tracked object data.
{
    // Eliminate road edge data in the same angles as vehicles.
    Perform the following for all angles of tracked objects with
    ObjectTracker.trackData[#].typeClass = VEHICLE:
    {
        if (ObjectTracker.trackData[#].range[angle]is between left
        edge and right edge of road)
            roadData[angle].confidenceLevel = 0;
        // The following keeps from putting the road edge on the left
        edges of tracked objects.
    Find the angle closest to the left edge (angle 0) that has
            ObjectTracker.trackData[#].range[angle] != 0;
    Perform the following for each angle starting from the angle
    found above and going towards the left edge (angle 0):
    {
        Perform the following covering range bins
        ObjectTracker.trackData[#].range[angle]± rangeBinTolerance:
        {
            if (Baseband.fftMagnData[angle][bin] > ObjectDetector.
            threshSmall for any of the covered range bins)
                roadData[angle].confidenceLevel = 0;
        }
    }
    // The following keeps from putting the road edge on the right edges
    of tracked objects.
    Find the angle closest to the right edge (angle 19) that has
    ObjectTracker.trackData[#].range[angle]!= 0;
    Perform the following for each angle starting from the angle found
    above and going towards the right edge (angle 19):
    {
        Perform the following covering range bins
        ObjectTracker.trackData[#].range[angle]± rangeBinTolerance:
        {
            if (Baseband.fftMagnData[angle][bin] > ObjectDetector.
            threshSmall for any of the covered range bins)
                roadData[angle].confidenceLevel = 0;
        }
    }
}
Find roadData[angle]that is part of a tracked object by checking if all of
the following are true:
{
    roadData[ ].xPos >=
            ObjectTracker.trackData[ ].xMin −
    trackedObjectPosTolerance.xMin;
    roadData[ ].xPos <=
            ObjectTracker.trackData[ ].xMax +
    trackedObjectPosTolerance.xMax;
    roadData[ ].yPos >=
            ObjectTracker.trackData[ ].yLeft −
    trackedObjectPosTolerance.yLeft;
    roadData[ ].yPos <=
            ObjectTracker.trackData[ ].yRight +
    trackedObjectPosTolerance.yRight;
    Note: ObjectTracker.trackData needs to be updated data based on the
    same samples that the roadData came from before the above
    calculations are performed.
}
// Eliminate road edge data that is part of non-stationary tracked objects.
Perform the following for angles of roadData[angle]that meet the
following criteria:
    1) Part of a tracked object (found above),
    2) ObjectTracker.trackData[object#].range[angle] != 0,
    3) ObjectTracker.trackData[object#].movingClass != STATIONARY:
{
    roadData[angle].confidenceLevel = 0;
    roadData[angle].trackedObjectNumber = index number of
    tracked object;
    roadData[angle].trackedObjectStatus = MOVING;
}
// Eliminate road edge data that is amplitude affected by tracked objects.
    Perform the following for the angles of roadData[angle]
    that are not part of a tracked object but have a tracked object in
    the roadData angle that meets the following criteria:
        1. ObjectTracker.trackData[any object #].range[angle] −
        largeMagnAffectedBins) <= roadData[angle].rangeEst),
            // Note: Differences in resolution must be taken into
            account.
        2. ObjectTracker.trackData[any object #].range[angle] != 0,
        3. ObjectTracker.trackData[any object #].typeClass =
        VEHICLE.
    {
        roadData[angle].confidenceLevel = 0;
        roadData[angle].trackedObjectNumber = index number of
        tracked object;
        roadData[angle].trackedObjectStatus =
        AMPLITUDE_AFFECTED;
    }
// Use non-vehicle tracked objects as road edge data.
Perform the following for angles of tracked objects that meet the
following criteria:
    1) ObjectTracker.trackData[object#].range[angle]!= 0,
    2) ObjectTracker.trackData[object#].missedUpdateCount = 0,
    3) ObjectTracker.trackData[object#].typeClass =
        NON_VEHICLE,
    4) The closest tracked object in range for angles that have
        multiple tracked objects:
{
    roadData[angle].confidenceLevel = confidenceLevelMin;
    roadData[angle].rangeEst = ObjectTracker.
    trackData[object#].range[angle];
    roadData[angle].range[0] = ObjectTracker.trackData[object#].
    range[angle];
    roadData[angle].missedUpdateCount = 0;
} confidenceLevelMin:

Specifies the minimum confidenceLevel before roadData [angle].rangeEst is used to determine the road edge. This number can be changed from the Operator Interface Control object.

Default value=5.
    detectsInWindowRequired

Specifies the number of detections that are required in an angle/range bin detection window to have valid road data. This number can be changed from the Operator Interface Control object.

Default value=5.
    firstVehPathAngle:

Identifies the first angle that contains vehicle path data. Note: Use of this data item is dependent on the vehDirection.
    firstVehPathAngleLeftToRight:

Identifies the first angle that contains vehicle path data when going from angle 0 to angle 19 (left to right).
    firstVehPathAngleRightToLeft:

Identifies the first angle that contains vehicle path data when going from angle 19 to angle 0 (right to left).
    increasingBinsTol:

Specifies tolerance used in determining the road direction (see Table D). This number can be changed from the Operator Interface Control object.

Default value=2.
    largeMagnAffectedBins

Specifies the number of FFT bins closer in range that are affected by an amplitude that crossed the large threshold. This number can be changed from the Operator Interface Control object.

Default value=100.
    lastVehPathAngle

Identifies the last angle that contains vehicle path data. Note: Use of this data item is dependent on the vehDirection.
    rangeBinTolerance Specifies the range bin tolerance to use when looking for small threshold crossings in the UpdateRoadDataWithTrackedObject( ) function. This number can be changed from the Operator Interface Control object.

Default value=2.
    roadData[angle]

---

Indicates where the roadway is estimated to be located and data used in the estimation.
{
    confidenceLevel: Indicates the consecutive times that roadPotentialData[angle] from the Object Detector has been valid and not affected by tracked objects.
    detections[sample #]: The last 20 range samples from the Object Detector's roadPotentialData[angle].range data item. Resolution = ½ meter.
    missedUpdateCount: Indicates the number of consecutive times that the road data has not been updated.
    oppSideAffected: Indicates that the angle (19 − angle #) is being affected by a tracked object.
    range[sample #]: The last 5 range estimates from the EstimateRoadEdgeRange function. Resolution = ½ meter.

-continued rangeEst: The last estimated range of the road edge in a given angle after the FilterRoadData function. Minimum resolution = ⅛ meter.
    sortedDetections: roadData[angle].detections[sample #] sorted in increasing range order (e.g. sample 0 indicates the closest range with a detection).
    trackedObjectNumber: Index number to access ObjectTracker.
    trackData[object #] of the object affecting the estimation of the road edge.
    trackedObjectStatus: Indicates if a tracked object is either affecting estimation of the road edge or is a part of the road edge.
        Possible values:
            AMPLITUDE_AFFECTED: Indicates road edge estimate for this angle has been affected by a large FFT amplitude.
            MOVING: Indicates the road edge estimate for this angle has been affected by a moving, tracked object.
            NON_MOVING: Indicates the road edge estimate for this angle has been affected by a non-moving, tracked object that has not moved since being tracked.
            NONE: No tracked object affect on estimating the road edge in this angle.
            STATIONARY_VEHICLE: Indicates the road edge estimate for this angle has been affected by a stationary, tracked object that has previously moved since being tracked.
    validDetections: Indicates the number of valid detections in roadData[angle].sortedDetections.
    xPos: The last estimated X axis position of the road edge for a given angle.
    yPos: The last estimated Y axis position of the road edge for a given angle.
}

--- roadDataFilterCoeff[ ]

---

Specifies coefficients used in filtering road data. These numbers can be changed from the Operator Interface Control object.
{
    roadDataFilterCoeff[2][0] = 47/64,
    roadDataFilterCoeff[2][1] = 17/64,
    roadDataFilterCoeff[3][0] = 42/64,
    roadDataFilterCoeff[3][1] = 16/64,
    roadDataFilterCoeff[3][2] = 6/64,
    roadDataFilterCoeff[4][0] = 41/64,
    roadDataFilterCoeff[4][1] = 15/64,
    roadDataFilterCoeff[4][2] = 6/64,
    roadDataiFilterCoef[4][3] = 2/64,
    roadDataFilterCoeff[5][0] = 41/64,
    roadDataFilterCoeff[5][1] = 15/64,
    roadDataFilterCoeff[5][2] = 5/64,
    roadDataFilterCoeff[5][3] = 2/64,
    roadDataFilterCoeff[5][4] = 1/64.
Note: roadDataFilterCoeff[0][X] and roadDataFilterCoeff[1][X] are not used.
} roadDataSampleSize

Specifies the number of road data samples to use from roadData[angle].range[sample#]. This number can be changed from the Operator Interface Control object.

Default value=8.
    roadDirection

Indicates the last estimated direction the roadway is going.

The possible values are:
    LEFT_TO_RIGHT: The roadway is curving left to right.
    NON_DETERMINED: The road direction is not currently determined.
    RIGHT_TO_LEFT: The roadway is curving right to left.
    STRAIGHT: The roadway is going straight.
    roadEdgeAngleBinsMin Specifies the minimum number of valid angle bins necessary to define the road edge. This number can be changed from the Operator Interface Control object.

Default value=2.

roadEdgeDetWindowSize[ ]

Specifies the range bin window size for estimating the range to the road edge. The value is dependent on the FCW vehicle velocity. These numbers can be changed from the Operator Interface Control object. See Table F for default values.

TABLE F roadEdgeDetWindowSize[ ] Default Values

| RoadEdgeDetWindowSize | Number of Range Bins | Vehicle Velocity |
|---|---|---|
| [0] | 9 | <10 meters/second (22.3 MPH) |
| [1] | 18 | >=10 & <20 meters/second (44.7 MPH) |
| [2] | 36 | >=20 meters/second (44.7 MPH) | rotate45Factor

Specifies the multiplication factor to be used for adjusting the vehToRoadEdgeDist in the X-axis and Y-axis directions when a 45 degree angle between roadData[angle] and vehPath[angle] data points is used. This number can be changed from the Operator Interface Control object.

Default value=0.707.

slope45degThreshMin

Specifies the minimum required roadData[angle] slope before a 45 degree angle is used for the distance between the roadData[angle] and vehPath[angle] data points. This number can be changed from the Operator Interface Control object.

Default value=0.25.

trackedObjectPosTolerance

Specifies the position tolerance to put around a tracked object when updating road data. This parameter can be changed from the Operator Interface Control object.
{
   xMax: X axis position tolerance when checking against the maximum allowable X position.
   xMin: X axis position tolerance when checking against the minimum allowable X position.
   yLeft: Y axis position tolerance when checking against the left most Y position.
   yRight: Y axis position tolerance when checking against the right most Y position.
} validRoadPosUncertainty[ ]

Specifies the number of range bins of uncertainty of valid new road data versus vehicle velocity. This number can be changed from the Operator Interface Control object.

See Table C for the default values of this data item.

vehDirection

Indicates the last estimated direction the vehicle is going:

The possible values are:

LEFT_TO_RIGHT: The path of the FCW vehicle is estimated to be going from left to right.

NON_DETERMINED: The path of the FCW vehicle is not currently determined.

RIGHT_TO_LEFT: The path of the FCW vehicle is estimated to be going from the right to the left.

STRAIGHT_ON_LEFT_EDGE: The path of the FCW vehicle is estimated to be straight on the left edge of the road.

STRAIGHT_ON_RIGHT_EDGE: The path of the FCW vehicle is estimated to be straight on the right edge of the road.

vehPath[angle]

Indicates the predicted path of the host vehicle 102.
{
   dist: Distance from the host vehicle to this point when following the predicted path of the host vehicle.
   xPos: X axis position of the predicted host vehicle path for a given angle,
   yPos: Y axis position of the predicted host vehicle path for a given angle.
} vehToRoadEdgeDist

Identifies the last used value of distance between the center of the vehicle and the road edge.

vehToRoadEdgeDistMin

Specifies the center of the vehicle in the Y axis direction to the road edge distance that is to be used as a minimum in predicting the vehicle path. This number can be changed from the Operator Interface Control object.

Default value=3 meters.

F. Threat Assessment Heuristics

Figure 26:
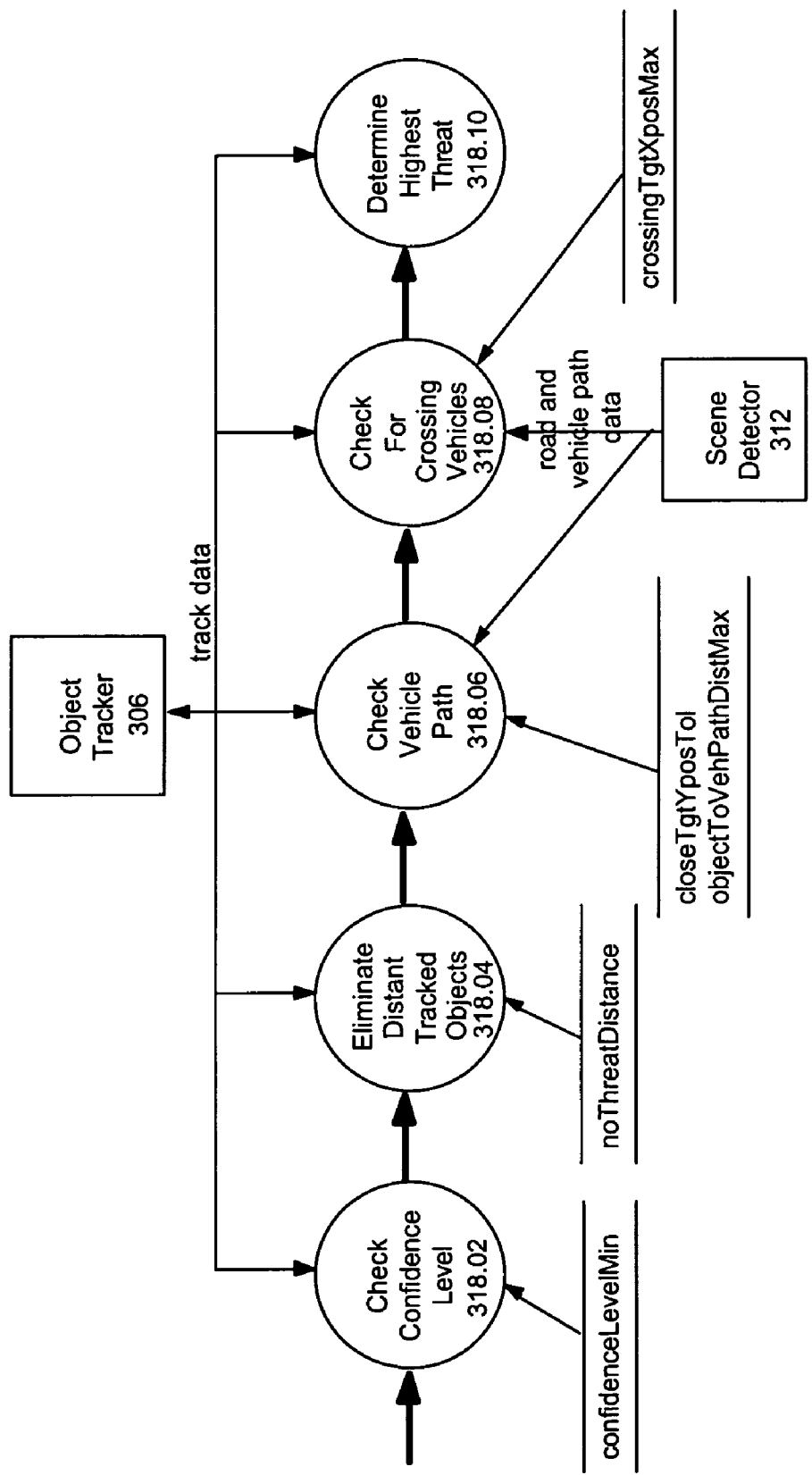
FIG. 26 is a data flow diagram for a vehicle predictor and scene detector heuristic that can be incorporated into the invention.

FIG. 26 is a data flow diagram illustrating an example of a threat assessment heuristic. At 318.02, the system 100 checks to see if the tracked object confident level is large enough that the tracked object constitutes a possible threat. Distant tracked objects can be removed at 318.04 so that the system 100 can focus on the closest, and thus most likely, threats. At 318.06, the system 100 can check the path of the host vehicle so that at 318.08, a check for crossing vehicles can be made. At 318.10, the system determines which threat is the greatest potential threat. This does not mean that the feedback subsystem 400 will invoke a response based on such a threat. The greatest possible threat at any particular time will generally not merit a response by the feedback subsystem 400.

Some examples of functions and data items that can be used in the process flow are as follows:

CheckConfidenceLevel( )

Checks if tracked object confidence level is large enough to qualify as a possible threat.
{
  Perform the following for all tracked objects:
  {
    if(ObjectTracker.trackData[ ].confidenceLevel < confidenceLevelMin)
      ObjectTracker.trackData[ ].threatStatus = NO_THREAT;
    else
      ObjectTracker.trackData[ ].threatStatus = POSSIBLE_THREAT;
  }
}

CheckForCrossingVehicles( )

Checks if tracked objects that are possible threats are crossing vehicles that
will not be on the predicted vehicle path when the FCW vehicle arrives.
{
  Perform the following for all tracked objects with
  ObjectTracker.trackData[ ].threatStatus = POSSIBLE_THREAT and
  ObjectTracker.trackData[ ].movingClass = OVERTAKING and
  ObjectTracker.trackData[ ].xCenter <= crossingTgtXposMax:
  {
    Calculate the vehicle time to a possible collision with the tracked
    object assuming the velocities stay the same and the tracked object stays
    on the predicted vehicle path based on the following:
    {
      collisionTime
          =    ObjectTracker.trackData[    ].distVehPath    /
      ObjectTracker.trackData[ ].vel;
    }
    Calculate the predicted position of the tracked object after the amount of
    time stored in collisionTime assuming it moves in the same direction
    it has been:
    {
      xPosPredicted = ObjectTracker.trackData[ ].xCenterFiltered[0]
                      +    ObjectTracker.trackData[ ].xVel[0] *
      collisionTime;
      yPosPredicted = ObjectTracker.trackData[ ].yCenterFiltered[0]
                      +    ObjectTracker.trackData[ ].yVel[0] *
      collisionTime;
    }
    Perform the same process used in the function CheckVehiclePath to
    determine if xPosPredicted and yPosPredicted indicate the vehicle will
    still be on the vehicle path;
    if (xPosPredicted and yPosPredicted are not on the vehicle path
    as determined above)
        ObjectTracker.trackData[ ].threatStatus = NO_THREAT;
  }
}

CheckVehiclePath( )

Checks if tracked object is on predicted vehicle path.
{
  if (SceneDetector.vehDirection = NON_DETERMINED)
    ObjectTracker.trackData[ ].threatStatus = NO_THREAT;
  Perform the following for all tracked objects with
  ObjectTracker.trackData[ ].threatStatus = POSSIBLE_THREAT:
  {
    firstGreaterXposAngle = the first angle starting with
    SceneDetector.firstVehiclePathAngle and checking each successively
    greater angle index until
              ObjectTracker.trackData[    ].xCenter    >
    SceneDetector.vehPath[angle].xPos;
    if (firstGreaterXposAngle is found)
    {
      objectToVehPathDist = the smallest of the distance between the
      center of the tracked object (ObjectTracker.trackData[ ].xCenter &
      .yCenter) and the following vehicle path points:
          SceneDetector.vehPath[firstGreaterXposAngle-1].xPos & .yPos,
          SceneDetector.vehPath[firstGreaterXposAngle].xPos & . yPos,
          SceneDetector.vehPath[firstGreaterXposAngle+1].xPos & .yPos;
      /* Note: dist = |(largest of xDist & yDist| + 3/8 * |(smallest of
      xDist & yDist)| can be used as an approximation for better execution
      time. */
    objectsNearestVehPathAngle = angle corresponding to
    objectToVehPathDist found above;
    Perform the following based on SceneDetector.vehDirection:
    {
      Case of SceneDetector.vehDirection = LEFT_TO_RIGHT
                          or STRAIGHT_ON_LEFT_EDGE:
      {
          if ((objectToVehPathDist > objectToVehPathDistMax)
              OR (ObjectTracker.trackData[ ].yCenter
                  <
          SceneDetector.roadData[objectsNearestVehPathAngle].yPos))
          {
            ObjectTracker.trackData[ ].threatStatus = NO_THREAT;
          }
          else
          {
            ObjectTracker.trackData[ ].distVehPath
                =
            SceneDetector.vehPath[objectsNearestVehPathAngle].dist;
          }
      }
      Case of SceneDetector.vehDirection = RIGHT_TO_LEFT
                          or
          STRAIGHT_ON_RIGHT_EDGE:
      {
          if ((objectToVehPathDist > objectToVehPathDistMax)
              OR (ObjectTracker.trackData[ ].yCenter
                  >
          SceneDetector.roadData[objectsNearestVehPathAngle].yPos))
          {
            ObjectTracker.trackData[ ].threatStatus = NO_THREAT;
          }
          else
          {
            ObjectTracker.trackData[ ].distVehPath
                =
            SceneDetector.vehPath[objectsNearestVehPathAngle].dist;
          }
      }
    }
    else // firstGreaterXposAngle not found (object is closer than any
    vehicle path point).
    {
      if (ObjectTracker.trackData[ ].yCenter is within ± closeTgtYposTol)
        ObjectTracker.trackData[ ].distVehPath = ObjectTracker.trackData[ ].distStraight;
      else
        ObjectTracker.trackData[ ].threatStatus = NO_THREAT;
    }
  }
}

DetermineHighestThreat( )

Determines the highest threat tracked object.
{
  Perform the following for all tracked objects with
          ObjectTracker.trackData[ ].threatStatus =
          POSSIBLE_THREAT:
  {
    Calculate the FCW vehicle time to a possible collision with the tracked
    object assuming the velocities stay the same and the tracked object stays
    on the predicted vehicle path based on the following:
    {
      collisionTime
          =    ObjectTracker.trackData[    ].distVehPath    /
      ObjectTracker.trackData[ ].vel;
    }
    Set ObjectTracker.trackData[ ].threatStatus = HIGHEST_THREAT
    for the tracked object with the smallest collisionTime;
  }
}

EliminateDistantTrackedObjects( )

Eliminates tracked objects as a threat possibility that are obviously far
enough away.
{
  Perform the following for all tracked objects with
          ObjectTracker.trackData[ ].threatStatus =

-continued

```
    POSSIBLE_THREAT:
    {
        if (ObjectTracker.trackData[ ].distStraight >= noThreatDistance)
            ObjectTracker.trackData[ ].threatStatus = NO_THREAT;
    }
}
``` closeTgtYposTol

Specifies the Y-axis position tolerance for a tracked object to be considered a possible threat if the xCenter of the tracked object is less than any of the vehicle path points. This number can be changed from the Operator Interface Control object.

Default value=3 meters.
    confidenceLevelMin

Specifies the minimum ObjectTracker.trackData[ ].confidenceLevel required to consider a tracked object as a possible threat. This number can be changed from the Operator Interface Control object.

Default value=5.
    crossingTgtXposMax

Specifies the maximum X-axis position to check if a tracked object is a crossing vehicle. This number can be changed from the Operator Interface Control object.

Default value=100 meters.
    noThreatDistance

Specifies the straight-line distance that is considered to be no possible threat for a collision or need for a warning. This number can be changed from the Operator Interface Control object.

Default value=90 meters (approximately 2.5 seconds*80 miles/hour).
    objectToVehPathDistMax Specifies the maximum distance between the center of a tracked object and the vehicle path in order to consider that the tracked object is on the vehicle path. This number can be changed from the Operator Interface Control object.

Default value=7 meters.

G. Collision Detection Heuristics

Figure 27:
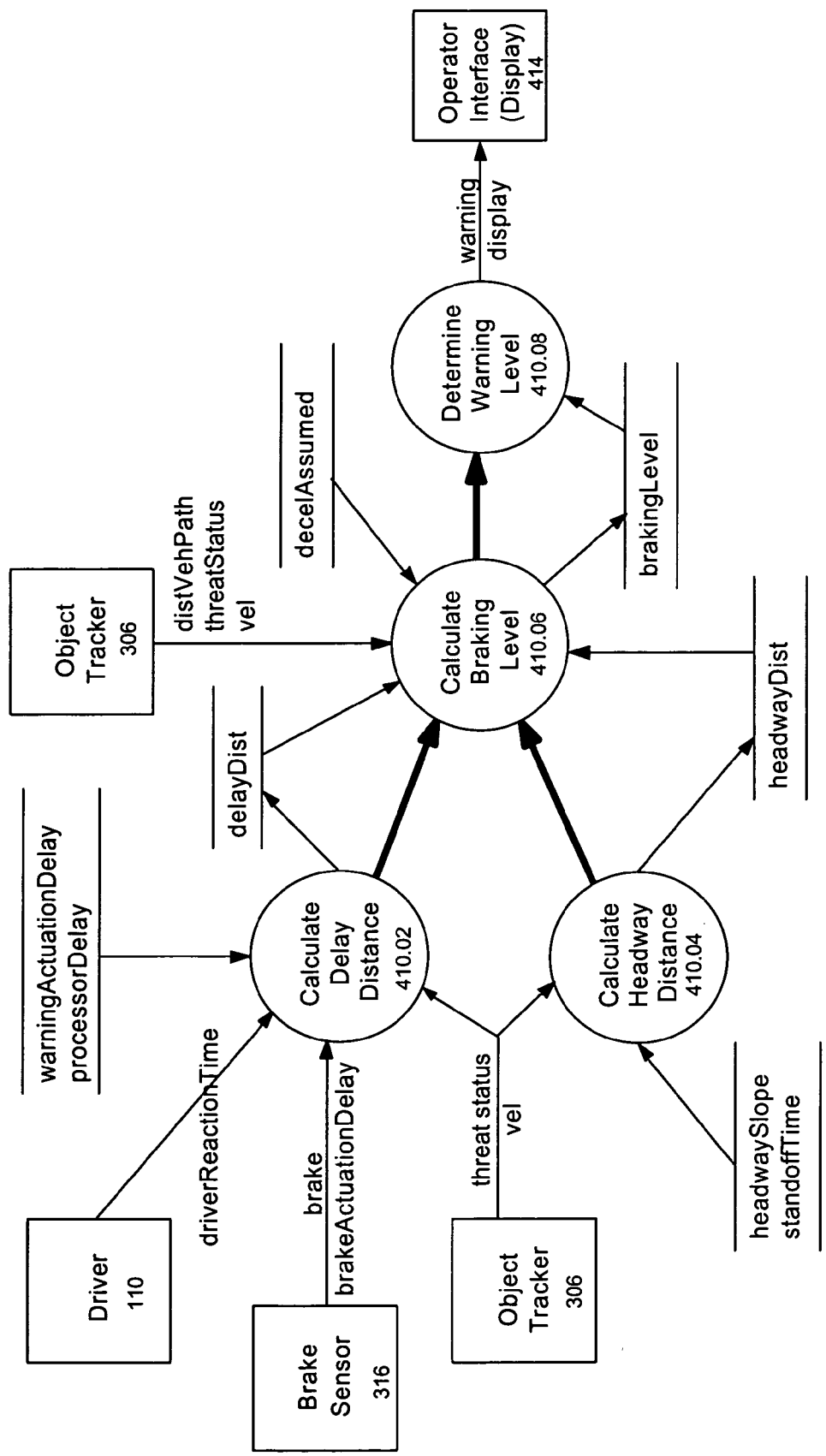
FIG. 27 is a data flow diagram for threat assessment heuristic that can be incorporated into the invention.

FIG. 27 is a data flow diagram illustrating an example of a collision detection heuristic. At 410.02, the delay distance is calculated. At 410.04, the headway distance is calculated. At 410.06, the breaking level required to avoid collision is calculated. Based on the delay distance at 410.02, the headway distance at 410.04, and/or the breaking level at 410.06, a warning is invoked at 410.08, or a vehicle-based response is generated by the feedback subsystem 400.

Some examples of functions and data items that can be used in the process flow are as follows:

CalculateBrakingLevel( )

Calculates the required braking level of the host vehicle 102.
```
{
    Perform the following for the tracked object with
    ObjectTracker.trackData[ ].threatStatus = HIGHEST_THREAT:
    {
        decelDistAssumed = ObjectTracker.trackData[ ].vel²/(2.0 *
            decelAssumed * g);
        brakingDist = delayDist + headwayDist +
            ObjectTracker.trackData[ ].distVehPath;
        if (brakingDist != 0)
            brakingLevel = -decelDistAssumed/brakingDist;
        else
            brakingLevel = -1.0;
    }
}
```

CalculateDelayDistance( )

Calculates the amount of distance change between the FCW vehicle and highest threat tracked object based on various delays in response.
```
{
    Perform the following for the tracked object with
    ObjectTracker.trackData[ ].threatStatus = HIGHEST_THREAT:
    {
        if (VehicleInterface.BrakeSensor.brake = OFF)
            delayTime = Driver.driverReactionTime +
                BrakeSensor.brakeActuationDelay
                                    + warningActuationDelay +
                processorDelay;
        else
            delayTime = warningActuationDelay + processorDelay;
        delayDist = delayTime * ObjectTracker.trackData[ ].vel;
    }
}
```

CalculateHeadwayDistance( )

Calculates the amount of desired coupled headway distance between the FCW vehicle and highest threat tracked object. Coupled headway is the condition when the driver of the FCW vehicle is following the vehicle directly in front at near zero relative speed and is controlling the speed of the FCW vehicle in response to the actions of the vehicle in front.
```
{
    Perform the following for the tracked object with
    ObjectTracker.trackData[ ].threatStatus = HIGHEST_THREAT:
    {
        headwayTime = headwaySlope * ObjectTracker.trackData[ ].vel +
            standoffTime;
        headwayDist = headwayTime * ObjectTracker.trackData[ ].vel;
    }
}
```

DetermineWarningLevel( )

Determines the warning level to display to the driver based on the calculated braking level required.
```
{
    Determine the warning display based on Table G;
```

Table G: Warning Display vs. Braking Level

| Warning Display | brakingLevel |
|---|---|
| 1st Green Bar | > −0.09 and <= 0.0 |
| 2nd Green Bar | > −0.135 and <= −0.09 |
| 3rd Green Bar | > −0.18 and <= −0.135 |
| 1st Amber Bar | > −0.225 and <= −0.18 |
| 2nd Amber Bar | > −0.27 and <= −0.225 |
| 3rd Amber Bar | > −0.315 and <= −0.27 |
| 1st Red Bar | > −0.36 and <= −0.315 |
| 2nd Red Bar | > −0.405 and <= −0.36 |
| 3rd Red Bar | > −0.45 and <= −0.405 |
| Blue Indicator | <= −0.45 |

```
}
``` brakingLevel

The calculated braking level of the host vehicle relative to a reasonable assumed braking level that is necessary to avoid a collision.

decelAssumed

Specifies an assumed reasonable deceleration as a multiplier of g (9.8 meters/second$^2$). This number can be changed from the Operator Interface Control object.

Default value=1.

delayDist

The amount of distance change between the FCW vehicle and the highest threat tracked object based on various delays in response.

g

Deceleration level=9.8 meters/second$^2$.

headwayDist

The distance between vehicles necessary to maintain a reasonable buffer under routine driving conditions.

headwaySlope

Specifies the slope of the coupled headway time. This number can be changed from the Operator Interface Control object.

Default value=0.01 second$^2$/meter.

processorDelay

Specifies the update rate of the processing system. It is primarily made up of baseband processing and RADAR data processing times. This number can be changed from the Operator Interface Control object.

Default value=0.11 seconds.

standoffTime

Specifies the constant term of the coupled headway time. This number can be changed from the Operator Interface Control object.

Default value=0.5 seconds.

warningActuationDelay

Specifies the time required for the processor output to become an identifiable stimulus to the driver. This number can be changed from the Operator Interface Control object.

Default value=0.1 seconds.

H. Head-On Detection Heuristics

Figure 28:
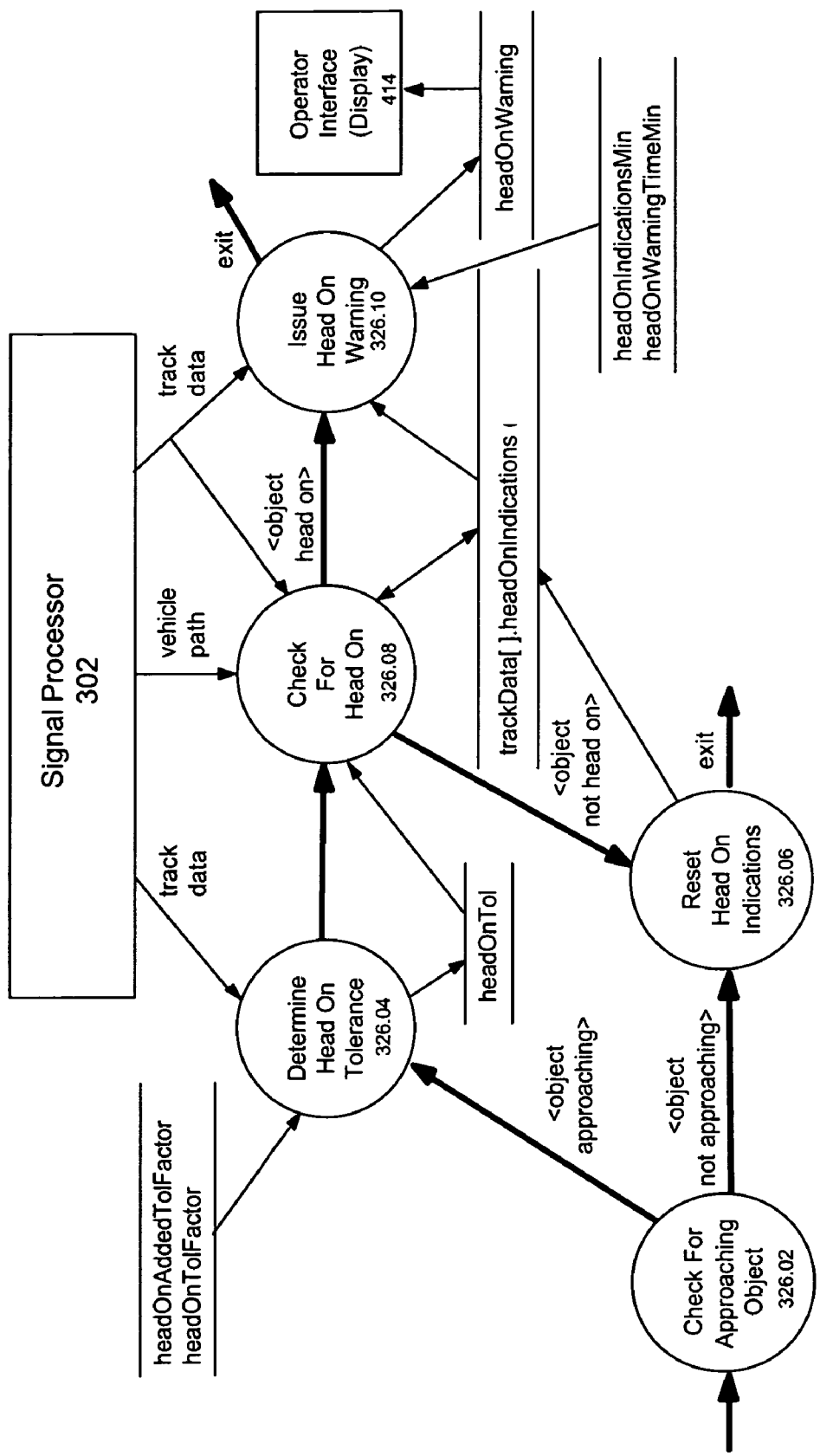
FIG. 28 is a data flow diagram for one example of a head-on detection heuristics.

FIG. 28 is a data flow diagram illustrating an example of a head-on detection heuristic.

Some examples of functions and data items that can be used in the process flow are as follows:

CheckForApproachingObject( )

```
{
  object # = tracked object under consideration;
  if (ObjectTracker.trackData[object #].movingClass = APPROACHING)
  {
    Exit to <object approaching> in FIG. 28;
  }
  else
  {
    Exit to <object not approaching> in FIG. 28;
  }
}
```

CheckForHeadOn( )

Checks if a head on vehicle is present.
```
{
  pathAngle = trackData[object #].angleCenter;
  if (trackData[object #].yRight >
  SceneDetector.vehPath[pathAngle].yPos + headOnTol)
  {
    ++ trackData[object #].headOnIndications;
    Exit to <object head on> in FIG. 28;
  }
  else
  {
    Exit to <object not head on> in FIG. 28;
  }
}
```

DetermineHeadOnTolerance( )

Determines the tolerance to be used in identifying a head on vehicle.
```
{
  headOnTolTemp = (headOnTolFactor/2048) *
  trackData[object #].distStraight;
  headOnTol = headOnTolTemp +
  ((headOnAddedTolFactor/2048) * headOnTolTemp);
}
```

IssueHeadOnWarning( )

Issues a head on warning to the operator interface when a head on collision is imminent.
```
{
  distance = ObjectTracker.trackData[object #].distStraight;
  velocity = ObjectTracker.trackData[object #].vel;
  collisionTime = distance/velocity;
  if ((any tracked object has
    ObjectTracker.trackData[object #].headOnIndications >=
    headOnIndicationsMin)
    AND (collisionTime <= headOnWarningTimeMin))
    headOnWarning = TRUE;
  else//None of the tracked objects pass the above test.
    headOnWarning = FALSE;
}
```

ResetHeadOnIndications( )

Resets the number of head on indications for a tracked object.
```
{
  ObjectTracker.trackData[object #].headOnIndications = 0;
}
``` headOnAddedTolFactor

Specifies the factor used when determining the amount to add to headOnTol. This number can be changed from the Operator Interface Control object.

Default value=205.

Note: This number is divided by 2048 before using.

headOnIndicationsMin

Specifies the minimum number of head on indications required to issue a head on warning. This number can be changed from the Operator Interface Control object.

Default value=2.

headOnTol

The tolerance used in deciding if an object is on a head on collision course with the host vehicle 102.

headOnTolFactor

Specifies the factor used to multiply distance by when determining the headOnTol. This number can be changed from the Operator Interface Control object.

Default value=29. Approx. (2048*0.8 deg*$\pi$rad)/180 deg/ rad.

Note: This number is divided by 2048 before using.

headOnWarning

Indicates if a head on warning is to be issued to the driver.

Possible values: TRUE or FALSE.

headOnWarningTimeMin

Specifies the minimum warning time for a head on warning. This number can be changed from the Operator Interface Control object.

Default value=2 seconds.

V. Alternative Embodiments

As described above, the invention is not limited for forward-looking radar applications, adaptive cruise control modules, or even automotive applications. The system 100 can be incorporated for use with respect to potentially any vehicle 102. Different situations will call for different heuristics, but the system 100 contemplates improvements in sensor technology, increased empirical data with respect to users, increased computer technology in vehicles, increased data sharing between vehicles, and other advancements that will be incorporated into future heuristics used by the system 100. It is to be understood that the above described embodiments are merely illustrative of one embodiment of the principles of the present invention. Other embodiments can be devised by those skilled in the art without departing from the scope of the invention.

What is claimed is:

1. A collision avoidance system for a vehicle, comprising:
   a sensor subsystem, wherein said sensor subsystem provides for the capture of sensor data from a radar measurement external to the vehicle;
   an identification technology for storing internal attributes associated with a user of the vehicle;
   a threat analysis subsystem, wherein said threat analysis subsystem provides for generating a threat assessment from said sensor data and a selected internal attribute from said identification technology; and
   a feedback subsystem for processing said threat assessment and generating a feedback response from said threat assessment.

2. The system of claim 1, further comprising an accident information transmittal module, wherein said accident information transmittal module transmits an accident report after an accident.

3. The system of claim 1, further comprising an information sharing module and a target vehicle, wherein said information sharing module receives data from said target vehicle.

4. The system of claim 1, further comprising an information sharing module and a target vehicle, wherein said information sharing module transmits data to said target vehicle.

5. The system of claim 1, said threat assessment subsystem further including a plurality of modes, said plurality of modes comprising a headway maintenance mode and a speed maintenance mode.

6. The system of claim 5, further comprising an operator control mode.

7. The system of claim 1, wherein said threat assessment is a braking level and wherein said selected internal attribute is a predefined braking preference threshold, and wherein said feedback is determined by whether said braking level exceeds said predefined braking preference threshold.

8. The system of claim 1, further comprising a simulation component, wherein said selected internal attribute is set with said simulation component.

9. The system of claim 1, wherein said feedback subsystem provides for generating said feedback response from said selected internal attribute.

10. The system of claim 1, wherein said selected internal attribute is a user-specific attribute.

11. The system of claim 10, wherein said user-specific attribute is a selection-based attribute.

12. The system of claim 10, wherein said user-specific attribute is a history-based attribute.

13. The system of claim 10, wherein said user-specific attribute is a condition-based attribute.

14. The system of claim 1, wherein said identification technology comprises a smart card.

15. The system of claim 1, wherein said sensor data is a radar measurement from only one radar.

16. The system of claim 15, wherein said radar measurement is a forward looking radar measurement.

17. The system of claim 1, wherein said feedback response is a haptic warning.

18. The system of claim 1, wherein said feedback response is an automatic reduction in the speed of the vehicle.

19. The system of claim 1, wherein said feedback response is a virtual tow.

20. The system of claim 1, wherein said feedback response comprises an audio warning and a chance in speed.

21. The system of claim 20, wherein said feedback response further comprises a haptic warning.

22. The system of claim 1, wherein said feedback response comprises a plurality of warnings of varying severity.

23. The system of claim 1, wherein said feedback response is a following-too-close warning.

24. The system of claim 1, wherein said threat analysis subsystem includes a headway maintenance mode.

25. The system of claim 1, wherein said threat analysis subsystem includes a speed maintenance mode.

26. The system of claim 1, wherein said feedback subsystem is capable of being disabled by a driver interface in the vehicle.

27. The system of claim 1, wherein said sensor subsystem generates an attentiveness level and wherein said threat assessment subsystem generates said threat assessment with said attentiveness level.

28. The system of claim 1, wherein said sensor subsystem generates an impairment level and wherein said threat assessment subsystem generates said threat assessment with said impairment level.

29. The system of claim 1, wherein said sensor subsystem includes a path-prediction module and a scene detector module.

30. The system of claim 1, wherein said sensor subsystem includes a stationary-object processing module.

31. The system of claim 1, further comprising a nuisance rate and a predetermined nuisance rate goal, wherein said predetermined nuisance rate goal is greater than said nuisance rate.

32. The system of claim 1, wherein said selected internal attribute comprises a user-based reaction time.

33. The system of claim 1, wherein said threat analysis subsystem includes a roadway environment attribute, and wherein said threat analysis subsystem generates said threat assessment with said roadway environment attribute.

34. The system of claim 33, wherein said roadway environment attribute is a change in grade, and wherein said change in grade does not cause a false alarm.

35. The system of claim 33, wherein said roadway environment attribute is a road surface condition, and wherein said road surface condition does not cause a false alarm.

36. The system of claim 33, wherein said roadway environment attribute is a surface type, and wherein said surface type does not cause a false alarm.

37. A collision avoidance system for a vehicle, comprising:
 a sensor module for capturing sensor data;
 an object detection module for identifying an object with said sensor data;
 an object tracker module for generating tracking information relating to said object;
 means for storing at least one user-based attribute associated with a user of the vehicle; and
 a threat detector module for generating a threat assessment from said tracking information and said at least one user-based attribute.

38. The system of claim 37, wherein said user-based internal attribute is a braking level preference threshold, and wherein said threat detector module compares said braking level preference threshold to a braking level required to avoid a collision, before generating said threat assessment.

39. The system of claim 38, wherein said breaking level preference threshold is a selection-based attribute.

40. The system of claim 38, wherein said breaking level preference threshold is a history-based attribute.

41. The system of claim 37, wherein said user-based attribute is a response time threshold, and wherein said threat detector module compares said response time threshold to a response time require to avoid a collision, before generating said threat assessment.

42. The system of claim 41, wherein said response time threshold is a history-based attribute.

43. The system of claim 37, further comprising a plurality of modes including a headway maintenance mode and a speed maintenance mode, wherein said threat assessment depends on a mode in said plurality of modes.

44. The system of claim 37, further comprising a heuristic for generating said threat assessment.

45. The system of claim 44, wherein said heuristic is an azimuth angle scene detection heuristic.

46. The system of claim 44, wherein said heuristic is a yaw rate scene detection heuristic.

47. The system of claim 44, wherein said heuristic is a radius of curvature scene detection heuristic.

48. A method of building automotive collision avoidance systems, comprising the steps of:
 setting a user-specific brake level preference threshold for use with the automotive collision avoidance system; and
 programming a computer for use in the automotive collision avoidance system to initiate feedback when avoidance of a collision would require a brake level greater than the user-specific brake preference threshold.

49. The method of claim 48, wherein setting the user-specific brake level preference threshold comprises applying a statistical analysis to normative data.

50. The method of claim 48, wherein the user-specific brake level preference is set with a user-based attribute.

51. The method of claim 48, wherein the user-specific brake level preference is determined by a selection-based attribute.

52. The method of claim 48, wherein the user-specific brake level preference is determined by a history-based attribute.

53. The method of claim 48, wherein initiating feedback includes generating a haptic warning.

54. The method of claim 48, wherein initiating feedback includes automatically reducing the speed of the vehicle.

55. A method of building automotive collision avoidance systems, comprising the steps of:
 setting a user-specific response time threshold for use with the automotive collision avoidance system; and
 programming a computer in the automotive collision avoidance system to initiate feedback when avoidance of a collision would require a response time greater than the user-specific response time threshold.

56. The method of claim 48, wherein the user-specific response time threshold is a history-based attribute.

57. The system of claim 1, wherein said internal attribute is not derived from said sensor data.

58. The system of claim 1, further comprising a plurality of internal attributes, wherein said plurality of internal attributes includes said at least one user-based attribute and at least one vehicle-based attribute.

59. The system of claim 1, wherein said threat assessment is a collision assessment.

60. A collision avoidance system for a vehicle, comprising:
 a sensor subsystem, wherein said sensor subsystem provides for the capture of sensor data;
 a threat analysis subsystem, wherein said threat analysis subsystem provides for generating a threat assessment from said sensor data and at least one internal attribute, said at least one internal attribute being history based; and
 a feedback subsystem, wherein said feedback subsystem provides for generating a feedback response from said threat assessment.

61. The system of claim 60, wherein said history-based internal attribute comprises a braking level preference attribute determined from data representative of a braking history.

62. The system of claim 60, wherein said history-based internal attribute comprises a user-based reaction time determined from data representative of a reaction time history.

63. The system of claim 60, wherein said history-based internal attribute comprises a user condition determined from data representative of historical user driving actions.

* * * * *